United States Patent
Tsai et al.

(10) Patent No.: US 11,864,031 B2
(45) Date of Patent: Jan. 2, 2024

(54) METHOD AND APPARATUS FOR BEAM FAILURE HANDLING IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/360,490

(22) Filed: Mar. 21, 2019

(65) Prior Publication Data

US 2019/0297537 A1 Sep. 26, 2019

Related U.S. Application Data

(60) Provisional application No. 62/646,658, filed on Mar. 22, 2018, provisional application No. 62/646,642, filed on Mar. 22, 2018.

(51) Int. Cl.

| | |
|---|---|
| H04W 36/14 | (2009.01) |
| H04B 17/318 | (2015.01) |
| H04L 43/16 | (2022.01) |
| H04W 24/10 | (2009.01) |
| H04W 48/04 | (2009.01) |
| H04B 17/373 | (2015.01) |
| H04W 36/00 | (2009.01) |
| H04W 76/27 | (2018.01) |
| H04W 74/08 | (2009.01) |
| H04W 36/30 | (2009.01) |
| H04W 72/23 | (2023.01) |

(52) U.S. Cl.
CPC ... *H04W 36/0016* (2013.01); *H04W 36/0077* (2013.01); *H04W 36/0085* (2018.08); *H04W 36/30* (2013.01); *H04W 72/23* (2023.01); *H04W 74/0833* (2013.01); *H04W 76/27* (2018.02)

(58) Field of Classification Search
CPC ......... H04W 36/0016; H04W 74/0833; H04W 72/046; H04W 36/30; H04W 36/0085; H04W 72/1268; H04W 72/1273; H04W 74/008; H04W 74/04; H04W 36/0058; H04B 7/0695; H04B 7/088; H04L 43/16
USPC .................................................. 370/331, 252
See application file for complete search history.

(56) References Cited

U.S. PATENT DOCUMENTS

| | | | |
|---|---|---|---|
| 9,942,808 B2 | 4/2018 | Cai et al. | |
| 10,004,009 B2 | 6/2018 | Wu | |
| 11,284,439 B2 * | 3/2022 | Yi | .......... H04W 74/008 |
| 2008/0008212 A1 * | 1/2008 | Wang | .......... H04L 1/24 |
| | | | 370/503 |

(Continued)

FOREIGN PATENT DOCUMENTS

| | | |
|---|---|---|
| CN | 107371210 A | 11/2017 |
| WO | WO2018093939 A1 | 5/2018 |

*Primary Examiner* — Wutchung Chu
*Assistant Examiner* — Jason A Harley
(74) *Attorney, Agent, or Firm* — Cooper Legal Group LLC

(57) ABSTRACT

A method and apparatus are disclosed. In an example from the perspective of a User Equipment (UE), a signal to configure the UE to perform a Random Access Channel-less (RACH-less) handover to a second cell may be received in a first cell. The signal may comprise an uplink (UL) grant to be used in the second cell. The UL grant may be associated with a downlink (DL) signal. Whether to use the UL grant in the second cell may be determined based upon whether the DL signal is qualified.

20 Claims, 39 Drawing Sheets

(56) References Cited

U.S. PATENT DOCUMENTS

| | | | | |
|---|---|---|---|---|
| 2012/0258721 | A1* | 10/2012 | Kwon | H04L 5/001 455/450 |
| 2012/0302240 | A1* | 11/2012 | Tamaki | H04W 72/121 455/436 |
| 2012/0320805 | A1* | 12/2012 | Yang | H04L 1/1861 370/280 |
| 2013/0010716 | A1* | 1/2013 | Dinan | H04W 76/15 370/329 |
| 2013/0182653 | A1* | 7/2013 | Earnshaw | H04L 1/1822 370/329 |
| 2014/0161086 | A1* | 6/2014 | Tamura | H04W 72/14 370/329 |
| 2014/0247733 | A1* | 9/2014 | Yang | H04W 24/02 370/252 |
| 2014/0328329 | A1* | 11/2014 | Novlan | H04W 56/0015 370/336 |
| 2016/0366687 | A1* | 12/2016 | Guo | H04W 72/046 |
| 2018/0213457 | A1* | 7/2018 | Tang | H04W 36/0083 |
| 2018/0270895 | A1* | 9/2018 | Park | H04W 8/18 |
| 2019/0037458 | A1* | 1/2019 | Kadiri | H04W 36/04 |
| 2019/0082449 | A1* | 3/2019 | Kim | H04W 52/16 |
| 2019/0208436 | A1* | 7/2019 | Zhou | H04L 1/1819 |
| 2019/0357264 | A1* | 11/2019 | Yi | H04L 1/1819 |
| 2020/0022043 | A1* | 1/2020 | Pelletier | H04W 36/0085 |
| 2020/0045596 | A1* | 2/2020 | Liu | H04W 36/0072 |
| 2020/0314812 | A1* | 10/2020 | Xu | H04W 36/0072 |

\* cited by examiner

700 ⟶

```
-- ASN1START

MobilityControlInfo ::=     SEQUENCE {
    targetPhysCellId                PhysCellId,
    carrierFreq                     CarrierFreqEUTRA                    OPTIONAL,   -- Cond HO-
toEUTRA2
    carrierBandwidth                CarrierBandwidthEUTRA               OPTIONAL,   -- Cond HO-
toEUTRA
    additionalSpectrumEmission      AdditionalSpectrumEmission          OPTIONAL,   -- Cond HO-
toEUTRA
    t304                            ENUMERATED {
                                        ms50, ms100, ms150, ms200, ms500, ms1000,
                                        ms2000, ms10000-v1310},
    newUE-Identity                  C-RNTI,
    radioResourceConfigCommon       RadioResourceConfigCommon,
    rach-ConfigDedicated            RACH-ConfigDedicated                OPTIONAL,   -- Need OP
    ...,
    [[ carrierFreq-v9e0             CarrierFreqEUTRA-v9e0               OPTIONAL    -- Need ON
    ]],
    [[ drb-ContinueROHC-r11         ENUMERATED {true}                   OPTIONAL    -- Cond HO
    ]],
    [[ mobilityControlInfoV2X-r14   MobilityControlInfoV2X-r14          OPTIONAL,   -- Need ON
       handoverWithoutWT-Change-r14 ENUMERATED {keepLWA-Config, sendEndMarker} OPTIONAL,   --
Cond HO
       makeBeforeBreak-r14          ENUMERATED {true}                   OPTIONAL,   -- Need OR
       rach-Skip-r14                RACH-Skip-r14                       OPTIONAL,   -- Need OR
       sameSFN-Indication-r14       ENUMERATED {true}                   OPTIONAL    -- Cond HO-
SFNsynced
    ]],
    [[
       mib-RepetitionStatus-r14     BOOLEAN                             OPTIONAL,   -- Need OR
       schedulingInfoSIB1-BR-r14    INTEGER (0..31)                     OPTIONAL    -- Cond HO-
SFNsynced
    ]]
}

MobilityControlInfo-v1010 ::=   SEQUENCE {
    additionalSpectrumEmission-v1010    AdditionalSpectrumEmission-v1010   OPTIONAL    -- Need ON
}

MobilityControlInfoSCG-r12 ::=  SEQUENCE {
    t307-r12                        ENUMERATED {
                                        ms50, ms100, ms150, ms200, ms500, ms1000,
                                        ms2000, spare1},
    ue-IdentitySCG-r12              C-RNTI                              OPTIONAL,   -- Cond SCGEst,
    rach-ConfigDedicated-r12        RACH-ConfigDedicated                OPTIONAL,   -- Need OP
    cipheringAlgorithmSCG-r12       CipheringAlgorithm-r12              OPTIONAL,   -- Need ON
    ...,
    [[ makeBeforeBreakSCG-r14       ENUMERATED {true}                   OPTIONAL,   -- Need OR
       rach-SkipSCG-r14             RACH-Skip-r14                       OPTIONAL    -- Need OR
    ]]
}

MobilityControlInfoV2X-r14 ::=  SEQUENCE {
    v2x-CommTxPoolExceptional-r14   SL-CommResourcePoolV2X-r14          OPTIONAL,   -- Need OR
    v2x-CommRxPool-r14              SL-CommRxPoolListV2X-r14            OPTIONAL,   -- Need OR
    v2x-CommSyncConfig-r14          SL-SyncConfigListV2X-r14            OPTIONAL,   -- Need OR
    cbr-MobilityTxConfigList-r14    SL-CBR-CommonTxConfigList-r14       OPTIONAL    -- Need OR
}

CarrierBandwidthEUTRA ::=       SEQUENCE {
    dl-Bandwidth                    ENUMERATED {
                                        n6, n15, n25, n50, n75, n100, spare10,
                                        spare9, spare8, spare7, spare6, spare5,
                                        spare4, spare3, spare2, spare1},
    ul-Bandwidth                    ENUMERATED {
                                        n6, n15, n25, n50, n75, n100, spare10,
                                        spare9, spare8, spare7, spare6, spare5,
                                        spare4, spare3, spare2, spare1} OPTIONAL   -- Need OP
}
```

```
CarrierFreqEUTRA ::=           SEQUENCE {
    dl-CarrierFreq                 ARFCN-ValueEUTRA,
    ul-CarrierFreq                 ARFCN-ValueEUTRA           OPTIONAL    -- Cond FDD
}

CarrierFreqEUTRA-v9e0 ::=      SEQUENCE {
    dl-CarrierFreq-v9e0            ARFCN-ValueEUTRA-r9,
    ul-CarrierFreq-v9e0            ARFCN-ValueEUTRA-r9        OPTIONAL    -- Cond FDD
}

RACH-Skip-r14 ::=              SEQUENCE {
    targetTA-r14                   CHOICE {
        ta0-r14                        NULL,
        mcg-PTAG-r14                   NULL,
        scg-PTAG-r14                   NULL,
        mcg-STAG-r14                   STAG-Id-r11,
        scg-STAG-r14                   STAG-Id-r11
    },
    ul-ConfigInfo-r14              SEQUENCE {
        numberOfConfUL-Processes-r14   INTEGER (1..8),
        ul-SchedInterval-r14           ENUMERATED {sf2, sf5, sf10},
        ul-StartSubframe-r14           INTEGER (0..9),
        ul-Grant-r14                   BIT STRING (SIZE (16))
    }                                                         OPTIONAL    -- Need OR
}

-- ASN1STOP
```

```
MobilityParameters-r14 ::=     SEQUENCE {
    makeBeforeBreak-r14            ENUMERATED {supported}     OPTIONAL,
    rach-Less-r14                  ENUMERATED {supported}     OPTIONAL
}
```

| Component/Step | Description | Time (ms) |
|---|---|---|
| 7 | RRC Connection Reconfiguration Incl. *mobilityControlInfo* | 15 |
| 8 | SN Status Transfer | 0 |
| 9.1 | Target cell search | 0 |
| 9.2 | UE processing time for RF/baseband re-tuning, security update | 20 |
| 9.3 | Delay to acquire first available PRACH in target eNB | 0.5/2.5 |
| 9.4 | PRACH preamble transmission | 1 |
| 10 | UL Allocation + TA for UE | 3/5 |
| 11 | UE sends RRC Connection Reconfiguration Complete | 6 |
|  | Minimum/Typical Total delay [ms] | 45.5/49.5 |

| Component/ Step | Description | Time (ms) |
|---|---|---|
| 7 | RRC Connection Reconfiguration Incl. *mobilityControlInfo* | 0 |
| 8 | SN Status Transfer | 0 |
| 9.1 | Target cell search | 0 |
| 9.2 | UE processing time for RF/baseband re-tuning, security update | 0 |
| 9.3 | Delay to acquire first available PRACH in target eNB | 0 |
| 9.4 | PRACH preamble transmission | 0 |
| 10 | UL Allocation + TA for UE | 0 |
| 11 | UE sends RRC Connection Reconfiguration Complete | 0 |
| | Minimum/Typical Total delay [ms] | 0 |

| R | Serving Cell ID | BWP ID | Oct 1 |
| CORESET ID | TCI State ID | | Oct 2 |

METHOD AND APPARATUS FOR BEAM FAILURE HANDLING IN A WIRELESS COMMUNICATION SYSTEM

CROSS-REFERENCE TO RELATED APPLICATIONS

The present Application claims the benefit of U.S. Provisional Patent Application Ser. No. 62/646,642 filed on Mar. 22, 2018, the entire disclosure of which is incorporated herein in its entirety by reference. The present Application also claims the benefit of U.S. Provisional Patent Application Ser. No. 62/646,658 filed on Mar. 22, 2018, the entire disclosure of which is incorporated herein in its entirety by reference.

FIELD

This disclosure generally relates to wireless communication networks, and more particularly, to a method and apparatus for beam failure handling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), a signal to configure the UE to perform a Random Access Channel-less (RACH-less) handover to a second cell may be received in a first cell. The signal may comprise an uplink (UL) grant to be used in the second cell. The UL grant may be associated with a downlink (DL) signal. Whether to use the UL grant in the second cell may be determined based upon whether the DL signal is qualified.

In an example from the perspective of a UE, a signal to configure the UE to perform an RACH-less handover to a second cell may be received in a first cell. The signal may comprise a configuration of the second cell. The configuration may be indicative of a beam to be used by the UE to monitor a channel of the second cell. An action may be performed if the beam is not qualified.

In an example from the perspective of a UE, a signal to configure the UE to perform an RACH-less handover to a second cell may be received in a first cell. The signal may comprise a configuration of the second cell. A channel of the second cell may be monitored to receive a UL grant. A measurement result may be transmitted via the UL grant to the second cell.

BRIEF DESCRIPTION OF THE DRAWINGS

FIG. 7A illustrates a first portion of an exemplary MobilityControlInfo information element.

FIG. 7B illustrates a second portion of an exemplary MobilityControlInfo information element.

FIG. 8 illustrates an exemplary UE-EUTRA-Capability information element.

FIG. 9 illustrates a table associated with exemplary radio access latency components during handover.

FIG. 11 illustrates a table associated with second exemplary radio access latency components during Make-Before-Break and/or Random Access Channel-less (RACH-less) handover.

FIG. 13 illustrates a diagram of an exemplary Transmission Configuration Indicator (TCI) State indication.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3rd Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.0.0, "Evolved Universal Terrestrial Radio Access (E-UTRA) and Evolved Universal Terrestrial Radio Access Network (E-UTRAN)", Overall description, Stage 2; 3GPP TS 36.321 V15.0.0, "Evolved Universal Terrestrial Radio Access (E-UTRA)", Medium Access Control (MAC) protocol specification; 3GPP TS 36.331 V15.0.1, "Evolved Universal Terrestrial Radio Access (E-UTRA)", Radio Resource Control (RRC), Protocol specification; R2-1802401 "Report of the email discussion on the 0 ms handover interruption time requirement from IMT2020", ZTE Corporation; R2-1803854 "General corrections on TS 38.321"; R2-162366, "Beam Forming Impacts", Nokia and Alcatel-Lucent; R2-163716, "Discussion on terminology of beamforming based high frequency NR", Samsung; R2-162709, "Beam support in NR", Intel; 3GPP RAN2#94 meeting minute; 3GPP TR 38.802 V14.1.0, "Study on New Radio Access Technology Physical Layer Aspects"; 3GPP TS 38.300 V15.0.0, NR, "NR and NG-RAN Overall Description", Stage 2; R2-1803796, "Introduction of MAC CEs for NR MIMO". The standards and documents listed above are hereby expressly incorporated by reference in their entirety.

Figure 1:
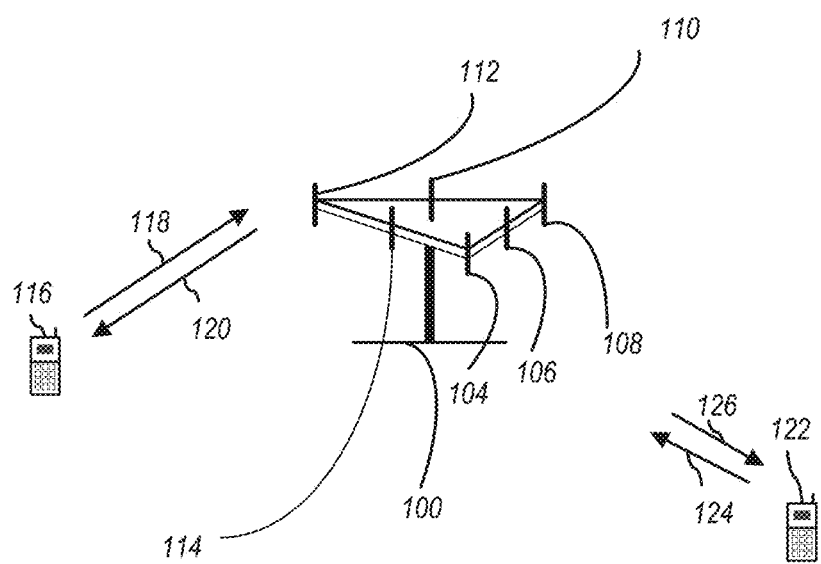
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
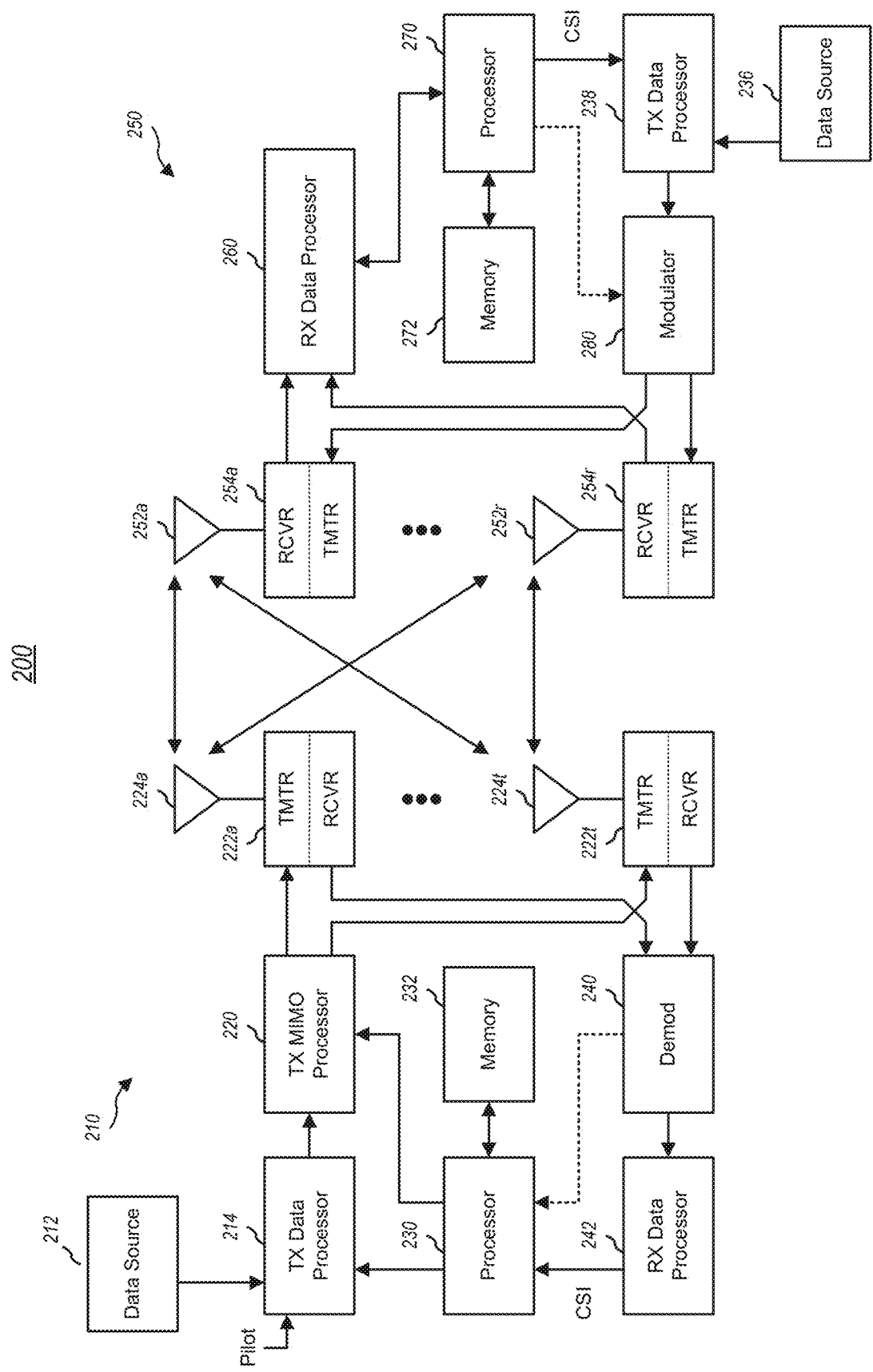
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
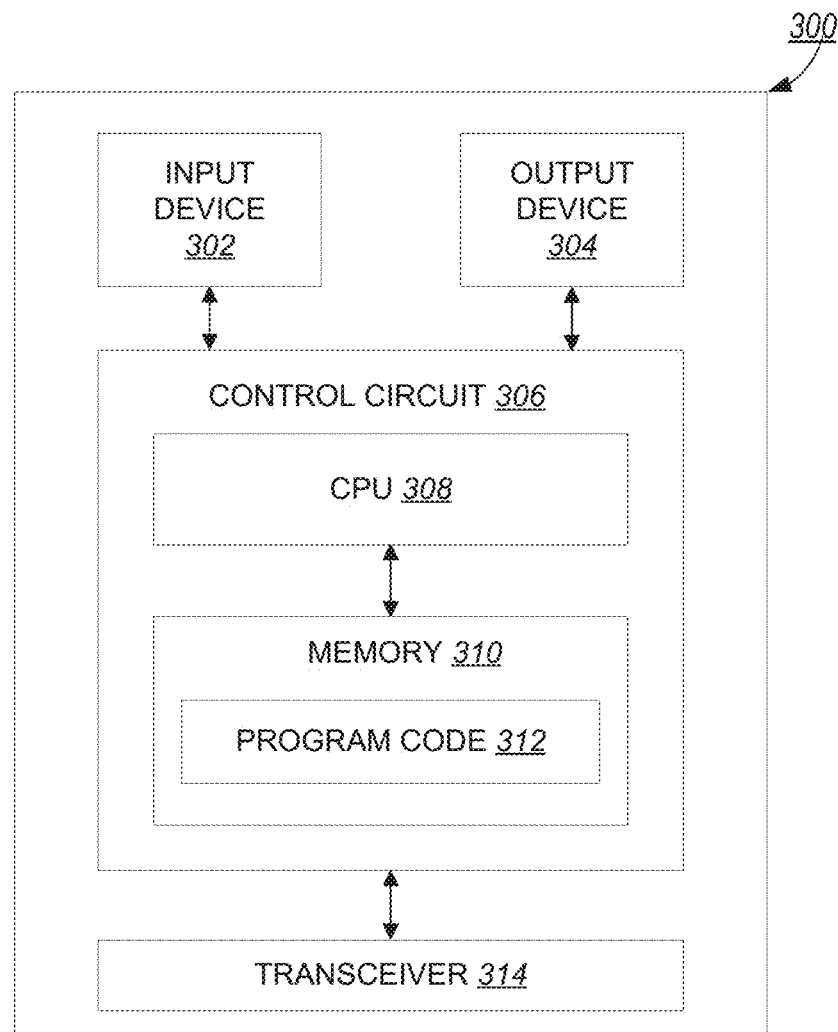
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
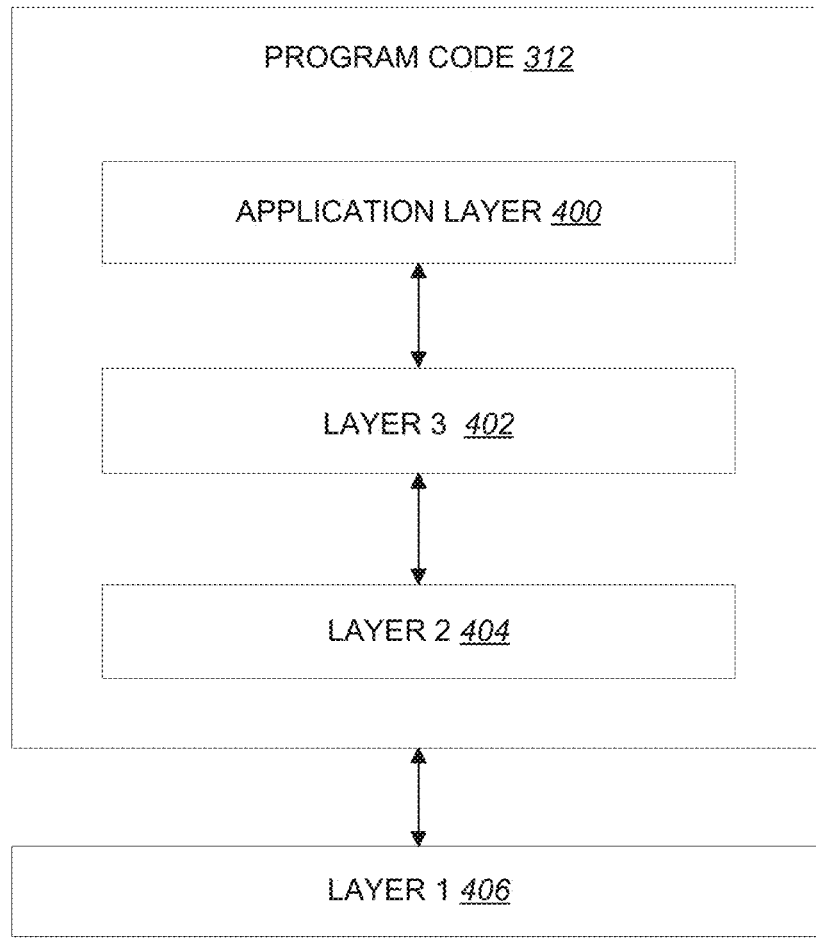
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.300 V15.0.0, provides information associated with one or more Random Access Channel-less (RACH-less) mechanisms and/or one or more RACH-less procedures (e.g., handover (HO) procedure, Control Plane (C-Plane) handling and change of Secondary eNB (SeNB). It may be appreciated that eNB may refer to Evolved Universal Mobile Telecommunications System (UMTS) Terrestrial Radio Access Network (E-UTRAN) NodeB. RACH-less HO and/or change of SeNB may be associated with skipping (and/or not performing) one or more random access procedures during HO and/or during change of SeNB. With RACH-less HO, only timing adjustment indication, NTA=0 and/or reuse NTA from a source eNB, are allowed. NTA denotes a parameter defined in 3GPP TS 36.213 and 3GPP TS 36.211. In some examples, NTA may be an indication of a timing offset between uplink and downlink radio frames.

An intra E-UTRAN HO of a UE in an RRC_CONNECTED state (e.g., connected state) is a UE-assisted network controlled HO. HO preparation signaling in E-UTRAN may be associated with various characteristics. For example, part of an HO command may come from a target eNB and may be transparently forwarded to the UE by the source eNB. To prepare the HO, the source eNB passes necessary information to the target eNB (e.g., the necessary information may comprise E-UTRAN Radio Access Bearer (E-RAB) attributes and/or Radio Resource Control (RRC) context). For example, when Carrier Aggregation (CA) is configured and/or to enable Secondary Cell (SCell) selection in the target eNB, the source eNB may provide a list of cells (e.g., best cells), where cells of the list of cells may be ordered in the list of cells in decreasing (and/or increasing) order of radio quality. Optionally, the list of cells may be indicative of measurement results of the cells. When Dual Connectivity (DC) is configured, a source Master eNB (MeNB) may provide a Secondary Cell Group (SCG) configuration and/or a Master Cell Group (MCG) configuration to a target MeNB.

In some examples, the source eNB and/or the UE may keep some context (e.g., Cell Radio Network Temporary Identifier (C-RNTI)) to enable the return of the UE in case of HO failure. If RACH-less HO is not configured, the UE may access a target cell via RACH following a contention-free procedure using a dedicated RACH preamble and/or following a contention-based procedure if dedicated RACH preambles are not available. The UE may use the dedicated preamble until the HO procedure is finished (e.g., successfully finished and/or unsuccessfully finished).

If RACH-less HO is configured, the UE may access the target cell via an uplink grant pre-allocated to the UE in an RRC message. If the UE does not receive the (pre-allocated)

uplink grant in the RRC message from the source eNB, the UE may monitor a Physical Downlink Control Channel (PDCCH) of the target cell. If the access towards the target cell (using RACH and/or RACH-less procedure) is not successful within a certain time (window), the UE may initiate radio link failure recovery using a suitable cell. Robust Header Compression (ROHC) context may not be transferred at HO. Alternatively and/or additionally, ROHC context may be kept at HO within the same eNB.

In some examples, a preparation and/or an execution phase of the HO procedure may be performed without Evolved Packet Core (EPC) involvement (e.g., preparation message may be exchanged directly between eNBs). The release of resources at a source side during an HO completion phase may be triggered by the eNB. In cases where a Relay Node (RN) is involved, a Donor eNB (DeNB) associated with the RN may relay (appropriate) S1 messages between the RN and a Mobility Management Entity (MME) (e.g., S1-based HO). Alternatively and/or additionally, the DeNB may relay X2 messages between the RN and the target eNB (X2-based HO). The DeNB may be explicitly aware of the UE attached to the RN due to one or more S1 proxy functionalities and/or one or more X2 proxy functionalities.

Figure 5:
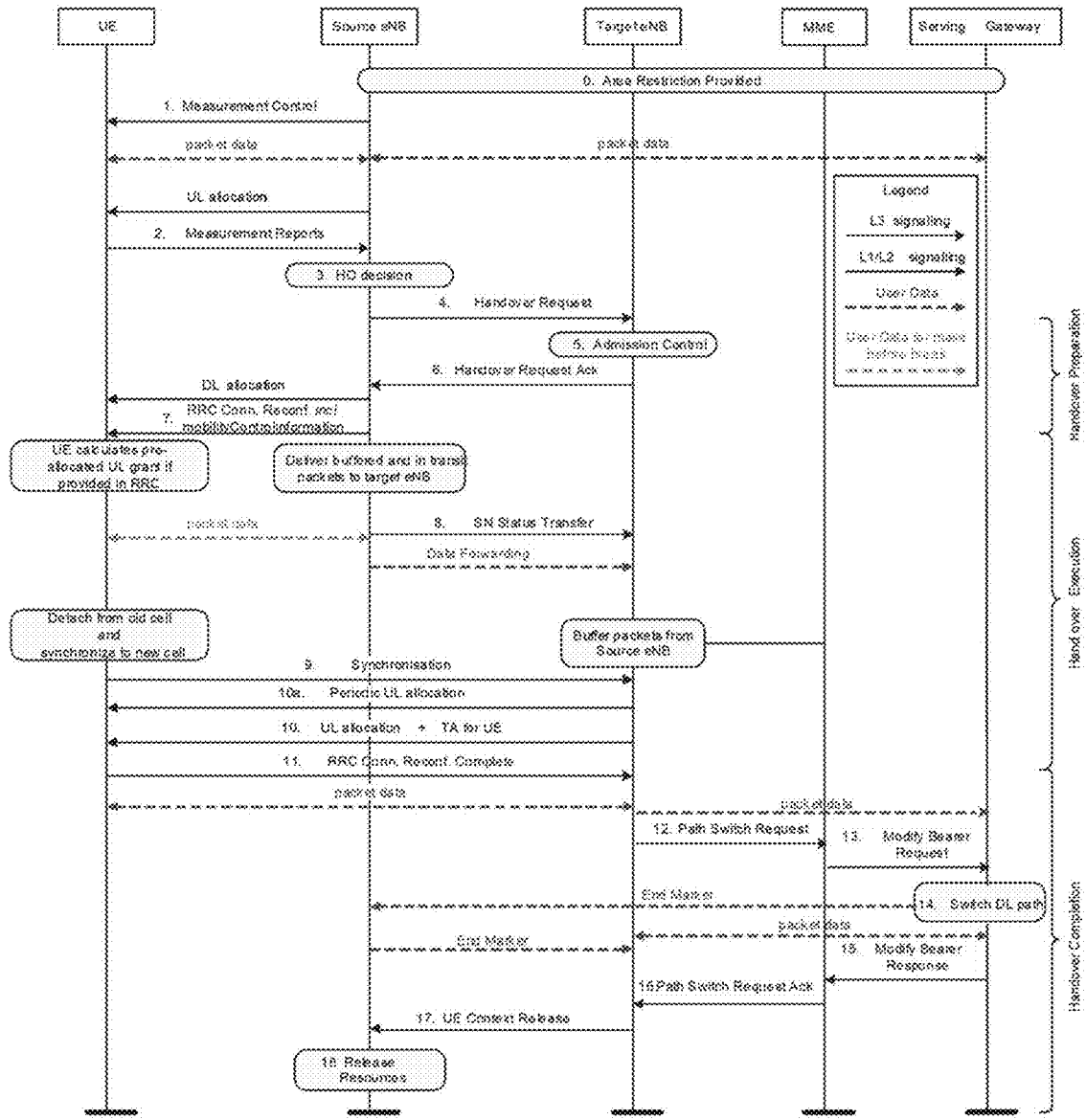
FIG. 5 illustrates an exemplary handover scenario.

FIG. 5 illustrates an exemplary HO scenario 500. For example, in the exemplary HO scenario 500, an MME and/or a Serving Gateway do not change. At "0. Area Restriction Provided", UE context within the source eNB comprises information associated with roaming and/or access restrictions which may be provided at connection establishment and/or at a previous Timing Alignment (also known as Timing Advance) (TA) update. At "1. Measurement Control", the source eNB configures the UE measurement procedures according to the information associated with roaming and/or access restrictions (e.g., and available multiple frequency band information). Measurements provided by the source eNB may assist the function controlling the UE's connection mobility. At "2. Measurement Reports", a measurement report (e.g., a MEASUREMENT REPORT) may be triggered and/or sent to the source eNB. At "3. HO decision", the source eNB may make a decision based upon the measurement report and/or Radio Resource Management (RRM) information to hand off to the UE.

At "4. Handover Request", the source eNB may issue a HANDOVER REQUEST message to the target eNB passing necessary information to prepare the HO at the target side (e.g., UE X2 signaling context reference at source eNB, UE S1 EPC signaling context reference, target cell ID, eNB key (KeNB), RRC context comprising the C-RNTI of the UE in the source eNB, AS-configuration, E-RAB context, and/or physical layer identification (ID) of the source cell and/or short Message Authentication Code (MAC-I) for possible Radio Link Failure (RLF) recovery). UE X2/UE S1 signaling references may enable the target eNB to address the source eNB and the EPC. The E-RAB context may include (necessary) Radio Network Layer (RNL) and/or Transport Network Layer (TNL) addressing information and/or Quality of Service (QoS) profiles of the E-RABs.

At "5. Admission Control", Admission Control may be performed by the target eNB dependent on received E-RAB QoS information to increase a likelihood of a successful HO, if resources can be granted by target eNB. The target eNB configures required resources according to the received E-RAB QoS information and reserves a C-RNTI and optionally an RACH preamble. The AS-configuration to be used in the target cell can either be specified independently (i.e. an "establishment") or as a delta compared to the AS-configuration used in the source cell (i.e. a "reconfiguration").

At "6. Handover Request Ack", the target eNB prepares HO with L1/L2 and/or sends a HANDOVER REQUEST ACKNOWLEDGE message to the source eNB. The HANDOVER REQUEST ACKNOWLEDGE message includes a transparent container to be sent to the UE as an RRC message to perform the HO. The container may comprise a new C-RNTI, one or more target eNB security algorithm identifiers for selected security algorithms, a dedicated RACH preamble, and/or some other parameters (e.g., access parameters, System Information Blocks (SIBs), etc.). If RACH-less HO is configured, the container may include a timing adjustment indication and optionally a pre-allocated uplink grant. The HANDOVER REQUEST ACKNOWLEDGE message may also include RNL/TNL information for forwarding tunnels (if necessary). Responsive to the source eNB receiving the HANDOVER REQUEST ACKNOWLEDGE message and/or responsive to transmission of an HO command being initiated in downlink, data forwarding may be initiated.

In some examples, one or more of steps 7 through 16 may reduce data loss during HO. At "7. RRC Conn. Reconf, incl. mobilityControlinformation", the target eNB may generate an RRC message associated with performing the HO (e.g., the RRC message may comprise an instruction to perform operations associated with the HO). The RRC message may be an RRCConnectionReconfiguration message including mobilityControlInformation data. The RRC message may be sent by the source eNB to the UE. The source eNB may perform necessary integrity protection and/or ciphering of the RRC message.

The UE may receive the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. If RACH-less HO is configured, the RRCConnectionReconfiguration message may include a timing adjustment indication and optionally a pre-allocated uplink grant for accessing the target eNB. If a pre-allocated uplink grant is not included, the UE may monitor PDCCH of the target eNB to receive an uplink grant. The UE does not need to delay HO execution for delivering the Hybrid Automatic Repeat Request (HARQ)/ Automatic Repeat Request (ARQ) responses to the source eNB.

If Make-Before-Break HO is configured, the connection to the source cell is maintained after reception of the RRCConnectionReconfiguration message with the mobilityControlInformation data before the UE executes initial uplink transmission to the target cell. Alternatively and/or additionally, if Make-Before-Break HO is configured, the source eNB may decide when to stop transmitting to the UE. Alternatively and/or additionally, the UE may be configured with Make-Before-Break HO and RACH-less HO, simultaneously.

At "8. SN Status Transfer", the source eNB may send an SN STATUS TRANSFER message to the target eNB to convey uplink Packet Data Convergence Protocol (PDCP) Sequence Number (SN) receiver status and/or downlink PDCP SN transmitter status of E-RABs for which PDCP status preservation applies (i.e. for Radio Link Control (RLC) Acknowledgment Mode (AM)). The uplink PDCP SN receiver status may comprise at least the PDCP SN of a first missing uplink (UL) Service Data Unit (SDU) and/or may comprise a bit map of the receiver status of out of sequence UL SDUs that the UE needs to retransmit in the target cell, if there are any such SDUs. The downlink PDCP SN transmitter status indicates a next PDCP SN that the target eNB shall assign to new SDUs, not having a PDCP SN yet. The source eNB may omit sending this message if none of the E-RABs of the UE shall be treated with PDCP status preservation.

At "9. Synchronisation", if RACH-less HO is not configured, after receiving the RRCConnectionReconfiguration message including the mobilityControlInformation, the UE may perform synchronization to the target eNB and/or may access the target cell via RACH, following a contention-free procedure if a dedicated RACH preamble is indicated in the mobilityControlInformation, or following a contention-based procedure if no dedicated preamble is indicated in the mobilityControlInformation. The UE may derivce target eNB specific keys and configures (selected) security algorithms to be used in the target cell. Alternatively and/or additionally, if RACH-less HO is configured, the UE performs synchronization to the target eNB. The UE may derive target eNB specific keys and/or may configure the (selected) security algorithms to be used in the target cell. Alternatively and/or additionally, if RACH-less HO is configured, the UE may performs synchronization to the target eNB. The UE may derive target eNB specific keys and may configure the (selected) security algorithms to be used in the target cell At "10. UL allocation+TA for UE", if RACH-less HO is not configured, the target eNB may respond with UL allocation and/or timing advance. At "10a. Periodic UL allocation", if RACH-less HO is configured and/or the UE did not get the periodic pre-allocated uplink grant in the RRCConnectionReconfiguration message including the mobilityControlInfo, the UE may receive an uplink grant via the PDCCH of the target cell. The UE may use the first available uplink grant after synchronization to the target cell.

At "11. RRC Conn. Reconf. Complete", when the RACH-less HO is not configured and/or the UE has successfully accessed the target cell, the UE sends the RRCConnectionReconfigurationComplete message (C-RNTI) to confirm the HO, along with an uplink Buffer Status Report, whenever possible, to the target eNB, which indicates that the HO procedure is completed for the UE. The target eNB verifies the C-RNTI sent in the RRCConnectionReconfiguration-Complete message. The target eNB may begin sending data to the UE. Alternatively and/or additionally, when the RACH-less HO is configured, after the UE has received uplink grant, the UE sends the RRCConnectionReconfigurationComplete message (C-RNTI) to confirm the HO, along with an uplink Buffer Status Report, whenever possible, to the target eNB. The target eNB verifies the C-RNTI sent in the RRCConnectionReconfigurationComplete message. The target eNB may begin sending data to the UE. The HO procedure may be completed for the UE when the UE receives the UE contention resolution identity Medium Access Control (MAC) control element (CE) from the target eNB.

At "12. Path Switch Request", the target eNB may send a PATH SWITCH REQUEST message to the MME indicative of the UE changing cells. At "13. Modify Bearer Request", the MME may send a MODIFY BEARER REQUEST message to the Serving Gateway. At "14. Switch DL path", the Serving Gateway may switch a downlink data path to the target side. The Swerving Gateway may send one or more "end marker" packets on the old path to the source eNB and then can release any U-plane/TNL resources towards the source eNB. At "15. Modify Bearer Response" the Serving Gateway may send a MODIFY BEARER RESPONSE message to the MME. At "16. Path Switch Request Ack", the MME may confirm a PATH SWITCH REQUEST message with a PATCH SWITCH REQUEST ACKNOWLEDGE message. At "17. UE Context Release", by sending a UE CONTEXT RELEASE message, the target eNB informs success of HO to source eNB and/or triggers release of resources by the source eNB. The target eNB may send this message after the PATH SWITCH REQUEST ACKNOWLEDGE message is received from the MME. At "18. Release Resources", responsive to reception of the UE CONTEXT RELEASE message, the source eNB may release radio and C-plane related resources associated with the UE context. Ongoing data forwarding may continue.

When an X2 HO is used involving Home eNBs (HeNBs) and/or when a source HeNB is connected to an HeNB Gateway (HeNB GW), a UE CONTEXT RELEASE REQUEST message including an explicit GW Context Release Indication may be sent by the source HeNB, in order to indicate that the HeNB GW may release of all the resources related to the UE context.

Figure 6:
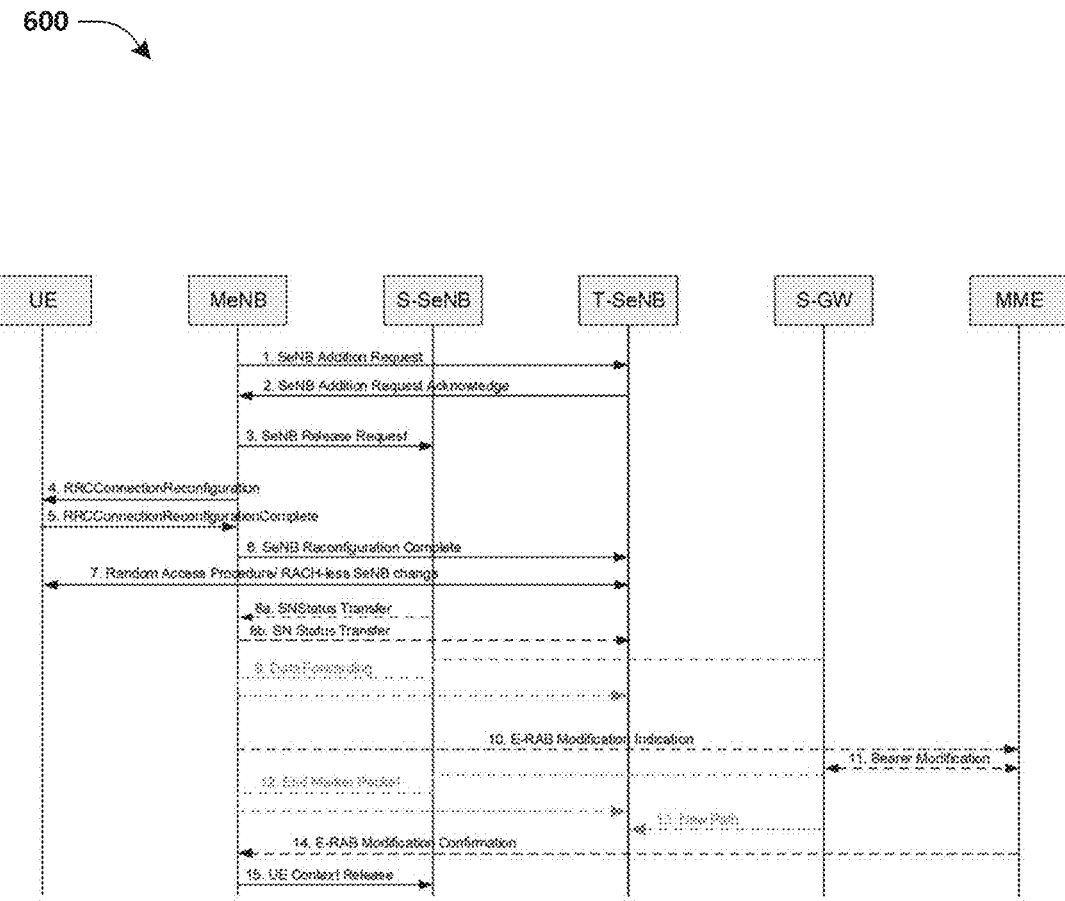
FIG. 6 illustrates an exemplary scenario associated with a change of Secondary evolved Node B (SeNB).

In some examples, a change of SeNB may be initiated by an MeNB and/or may be used to transfer a UE context from a source SeNB to a target SeNB and to change an SCG configuration in the UE from one SeNB to another. FIG. 6 illustrates an exemplary scenario 600 associated with the change of SeNB. At "1. SeNB Addition Request" and/or "2. SeNB Addition Request Acknowledge", the MeNB may initiate the change of SeNB by requesting the target SeNB to allocate resources for the UE by means of the SeNB Addition Preparation procedure. The MeNB may include an SCG configuration of an old SeNB in the SeNB Addition Request. If forwarding is needed, the target SeNB may provide forwarding addresses to the MeNB. If RACH-less SeNB Change is configured, the target SeNB includes timing adjustment indication, and optionally a preallocated uplink grant, in a container.

At "3. SeNB Release Request", if allocation of target SeNB resources is successful, the MeNB may initiate release of source SeNB resources towards the UE and the source SeNB. In case Make-Before-Break SeNB change is configured, the source SeNB may decide when to stop transmitting to the UE. If data forwarding is needed, the MeNB may provide data forwarding addresses to the source SeNB. Either direct data forwarding or indirect data forwarding is used for an SCG bearer. Only indirect data forwarding is used for Split bearer. Reception of the SeNB Release Request message triggers the source SeNB to stop providing user data to the UE and, if applicable, to start data forwarding.

At "4. RRCConnectionReconfiguration" and/or "5. RRCConnectionReconfigurationComplete", the MeNB may trigger the UE to apply the new configuration. The MeNB may indicate the new configuration in the RRCConnectionReconfiguration message towards the UE. In case the UE is unable to comply with (at least part of) the configuration included in the RRCConnectionReconfiguration message, the UE performs the reconfiguration failure procedure. If Make-Before-Break SeNB change is configured, the connection to the source SeNB is maintained after reception of RRCConnectionReconfiguration message with mobility-ControlInfoSCG before the UE executes initial uplink transmission to the target cell. The UE may be configured with Make-Before-Break SeNB change and RACH-less SeNB change, simultaneously.

At "6. SeNB Reconfiguration Complete", if the RRC connection reconfiguration procedure is successful, the MeNB informs the target SeNB. At "7. Random Access Procedure/RACH-less SeNB change", the UE synchronizes to the target SeNB. If RACH-less SeNB Change is configured, the preallocated uplink grant may be included in the RRCConnectionReconfiguration message. If the preallocated uplink grant is not included, the UE should monitor a PDCCH of the target SeNB for uplink grant. The SeNB Change procedure is completed for the UE when the UE receives the UE contention resolution identity.

At "8a. SN Status Transfer", "8b. SN Status Transfer" and/or "9. Data Forwarding", if applicable, data forwarding from the source SeNB takes place. The data forwarding may be initiated as early as the source SeNB receives the SeNB Release Request message from the MeNB. At one or more of the steps 10 through 14, if one (or more) of the bearer contexts was configured with the SCG bearer option at the source SeNB, a path update is triggered by the MeNB. At "15. UE Context Release", upon reception of the UE Context Release message, the source SeNB may release one or more radio and C-plane related resources associated with the UE context. Any ongoing data forwarding may continue.

When the preallocated uplink grant is configured by RRC, the following information is provided in ul-ConfigInfo: Uplink Scheduling interval ul-SchedInterval, starting subframe ul-StartSubframe of the preallocated uplink grant, the uplink grant ul-Grant and/or a number of HARQ process for the preallocated uplink grant numberOfConfUL-Processes. When a preallocated uplink grant configuration is released by RRC, a corresponding preallocated uplink grant may be discarded. When Enhanced Interference Mitigation and Traffic Adaptation (eIMTA) is configured for a Special Cell (SpCell), if a preallocated grant occurs in a subframe that can be reconfigured through eIMTA L1 signalling, then UE behavior may be left unspecified.

If ul-ConfigInfo is configured, a MAC entity may consider sequentially that an $N^{th}$ grant occurs in a subframe for which: subframe=[N*ul-SchedInterval+ul-StartSubframe] modulo 10. Alternatively and/or additionally, for Time Division Duplex (TDD), the MAC entity is configured with ul-SchedInterval shorter than 10 subframes, the $N^{th}$ grant shall be ignored if the $N^{th}$ grant occurs in a downlink subframe or a special subframe. Retransmissions for uplink transmissions using the pre-allocated uplink grant can continue after clearing the pre-allocated uplink grant.

3GPP TS 36.331 V15.0.0 provides information associated with one or more RACH-less (e.g., RACH skip) mechanisms. In DC, an SCG can be established, reconfigured and/or released by using an RRCConnectionReconfiguration message with or without a mobilityControlInfo. In case Random Access to a Primary Secondary Cell (PSCell) or initial Physical Uplink Shared Channel (PUSCH) transmission to the PSCell if rach-SkipSCG is configured is required upon SCG reconfiguration, E-UTRAN employs the SCG change procedure (i.e. an RRCConnectionReconfiguration message including the mobilityControlInfoSCG). The PSCell can only be changed using the SCG change procedure and/or by release and/or addition of the PSCell.

After receiving an HO message, the UE may attempt to access a target Primary Cell (PCell) at a first available RACH occasion according to Random Access resource selection defined in 3GPP TS 36.321 V15.0.0, i.e. the HO is asynchronous, and/or at the first available PUSCH occasion if RACH-Skip is configured. Consequently, when allocating a dedicated preamble for the random access in the target PCell, Evolved UMTS Terrestrial Radio Access (E-UTRA) shall ensure the first available PUSCH occasion is available from the first RACH occasion the UE may use. The first available PUSCH occasion is provided by ul-ConfigInfo, if configured, otherwise UE shall monitor the PDCCH of a target eNB. Upon successful completion of the HO, the UE sends a message used to confirm the HO.

FIGS. 7A-7B illustrate an exemplary MobilityControlInfo information element 700. Alternatively and/or additionally, an rach-Skip field associated with the exemplary MobilityControlInfo information element 700 may indicate whether random access procedure for the target PCell is skipped. Alternatively and/or additionally, an rach-SkipSCG field associated with the exemplary MobilityControlInfo information element 700 may indicate whether random access procedure for the target PSCell is skipped. Alternatively and/or additionally, a targetTA field associated with the exemplary MobilityControlInfo information element 700 may refer to the timing adjustment indication, (described in 3GPP TS 36.213, indicating the NTA value which the UE shall use for the target Primary Timing Advance Group (PTAG) of HO or the target Secondary Timing Advance Group (STAG) of SCG change. ta0 corresponds to NTA=0. mcg-PTAG corresponds to the latest NTA value of the PTAG associated with MCG. scg-PTAG corresponds to the latest NTA value of the PTAG associated with SCG. mcg-STAG corresponds to the latest NTA value of a MCG STAG indicated by the STAG-Id. scg-STAG corresponds to the latest NTA value of a SCG STAG indicated by the STAG-Id.

FIG. 8 illustrates an exemplary UE-EUTRA-Capability information element 800. In some examples, an rach-less field associated with the exemplary UE-EUTRA-Capability information element 800 may indicate whether the UE supports RACH-less HO, and/or whether the UE which indicates dc-Parameters supports RACH-less SeNB change.

3GPP R2-1802401 provides information associated with one or more HO mechanisms (e.g., 0 ms HO associated with Radio Access Technology (RAT) and/or New RAT (NR)). In a typical LTE HO, the UE may stop communication with the source cell upon receiving an HO command. So, from the perspective of service transmission, the data disruption starts from the receiving of the HO command until the UE transmits/receives the first packet to/from the target cell. A service interruption time in HO (i.e. the HO interruption) is defined as a duration between the time when UE stops transmission/reception with the source eNB and a time when the target eNB resumes transmission/reception with the UE. FIG. 9 illustrates a table 900 associated with exemplary radio access latency components during HO. An exemplary total HO interruption in an exemplary LTE HO may be between 45.5 and 49.5 ms (milliseconds) (and/or a different value).

Figure 10:
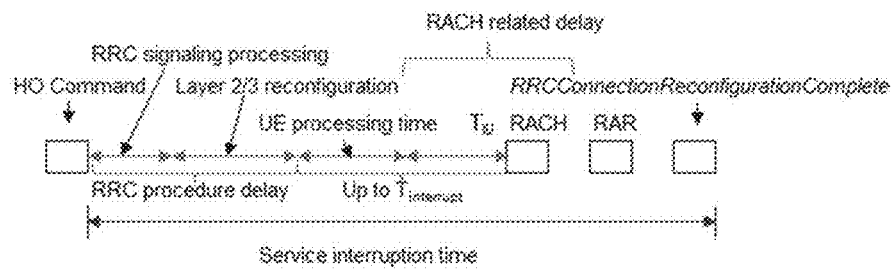
FIG. 10 illustrates components of interruption time for handover in an exemplary handover.

FIG. 10 illustrates components 1000 of interruption time for HO in an exemplary LTE HO. A WI on further mobility enhancements in LTE was established in LTE R14. Make-Before-Break (MBB) and/or RACH-less HO were introduced to reduce HO interruption time. With the adoption of MBB, the connection to the source cell is maintained with the reception of the HO command until the UE executes initial uplink transmission/reception to/from the target cell. So the latency of RRC procedure delay is considered to be 0 ms in MBB. The UE re-establishes user plane immediately before the UE turns to target cell and by proper software design re-establishment of the user plane could be done in parallel with data transmission/reception in the source side i.e. re-establishment of the user plane could take 0 ms also. The UE processing time during the HO (TUE_process) could be reduced down to 5 ms within R14 time frame. In theory UE processing time could be 0 ms too for intra-frequency case at least, if the source and the target cell are completely synchronized with same bandwidth and thus no RF tuning is needed. The current 5 ms value was decided as a relaxed requirement to simplify the UE RF design, so that maybe some note could be added to clarify how/under which conditions 0 ms could be achieved. Furthermore, with the adoption of RACH-less HO, the UE could access the target cell via the uplink grant pre-allocated in the HO command, so the processing time in steps 9.3, 9.4 and 10 could be skipped. The RRC Connection Reconfiguration Complete will be ready and sent within the pre-allocated uplink grant, therefore processing time could be reduced.

FIG. 11 illustrates a second table 1100 associated with second exemplary radio access latency components during MBB and/or RACH-less HO. The MBB and RACH-less HO optimizations can be configured to the UE simultaneously. The total HO interruption in LTE can be reduced down to 0 ms.

For the intra-frequency case, under the assumption of a dual Reception (RX) UE (with independent Radio Frequency (RF) chains), with the combination of MBB and RACH-less HO, the HO interruption time in LTE can be reduced down to 0 ms (in the scenarios where RACH-less HO is applicable, i.e. no/negligible UE TA difference between the source and the target cell).

For the intra-frequency case, under the assumption of a dual RX UE (with independent RF chains), with the combination of MBB and RACH-less HO, the HO interruption time in NR can be reduced down to 0 ms (in the scenarios where RACH-less HO is certainly applicable, i.e. the lower frequency case with no/negligible UE TA difference between the source and the target cell).

For the inter-frequency case, under the assumption that the UE can simultaneously transmit/receive in the source and in the target cells, with the combination of MBB and RACH-less HO, the HO interruption time in both LTE and NR can be reduced down to 0 ms (in the scenarios where RACH-less HO is applicable).

3GPP R2-1803854 provides information associated with a random access procedure, beam failure detection and/or a recovery request procedure in NR MAC. The random access procedure may be initiated by a PDCCH order, by a MAC entity and/or by an RRC (in association with events in accordance with 3GPP TS 38.300 v15.0.0). In a MAC entity, merely one (or more) random access procedure may be performed at a time. A random access procedure on an SCell, other than PSCell, may be initiated merely by a PDCCH order with an ra-PreambleIndex different than 0b000000.

If the MAC entity receives a request for a different random access procedure while another is already ongoing in the MAC entity, it may be up to UE implementation whether to continue with the ongoing procedure or start with the new procedure (e.g. for a System Information (SI) request).

In some examples, the MAC entity may perform one or more operations associated with the Random Access Resource selection procedure. In some examples, a first condition may be met if the Random Access procedure was initiated for beam failure recovery, if contention-free Random Access Resources for beam failure recovery request associated with Synchronization Signal Blocks (SSBs) and/or Channel State Information based Reference Signals (CSI-RSs) have been (explicitly) provided by RRC and/or if at least one of the SSBs with Synchronization Signal (SS)-Reference Received Signal Power (RSRP) above rsrp-ThresholdSSB amongst the associated SSBs or the CSI-RSs with Channel State Information (CSI)-RSRP above csirs-Threshold amongst the associated CSI-RSs is available. In some examples, if the first condition is met, an SSB with an SS-RSRP above rsrp-ThresholdSSB amongst the associated SSBs or a CSI-RS with CSI-RSRP above csirs-Threshold amongst the associated CSI-RSs may be selected and/or the PREAMBLE_INDEX may be set to an ra-PreambleIndex corresponding to the selected SSB or CSI-RS from the set of Random Access Preambles for beam failure recovery request.

Alternatively and/or additionally, a second condition may be met if the ra-PreambleIndex has been explicitly provided by either an PDCCH or the RRC, if the ra-PreambleIndex is not 0b000000 and/or if one or more contention-free Random Access Resources associated with SSBs or CSI-RS have not been explicitly provided by the RRC. In some examples, if the first condition is not met and/or if the second condition is met, the PREAMBLE_INDEX may be set to the (signaled) ra-PreambleIndex.

Alternatively and/or additionally, a third condition may be met if contention-free Random Access Resources associated with SSBs have been explicitly provided by the RRC and/or at least one SSB with SS-RSRP above rsrp-ThresholdSSB amongst the associated SSBs is available. In some examples, if the first condition and/or the second condition are not met, and/or if the third condition is met, an SSB with SS-RSRP above rsrp-ThresholdSSB may be selected from amongst the associated SSBs and/or the PREAMBLE_INDEX may be set to a ra-PreambleIndex corresponding to the (selected) SSB.

Alternatively and/or additionally, a fourth condition may be met if contention-free Random Access Resources associated with CSI-RSs have been explicitly provided by the RRC and/or at least one CSI-RS with CSI-RSRP above csirs-Threshold amongst the associated CSI-RSs is available. In some examples, if the first condition, the second condition and/or the third condition are not met, and/or if the fourth condition is met, a CSI-RS with CSI-RSRP above csirs-Threshold may be selected from amongst the associated CSI-RSs and/or the PREAMBLE_INDEX may be set to a ra-PreambleIndex corresponding to the (selected) CSI-RS.

Alternatively and/or additionally, if the first condition, the second condition, the third condition and/or the fourth condition are not met and/or if at least one SSB with SS-RSRP above rsrp-ThresholdSSB is available, an SSB with SS-RSRP above rsrp-ThresholdSSB may be selected. Alternatively and/or additionally, if the first condition, the second condition, the third condition and/or the fourth condition are not met and/or if at least one of the SSBs with SS-RSRP above rsrp-ThresholdSSB is not available, any SSB may be selected.

A fifth condition may be met if a potential Msg3 size (e.g., UL data available for transmission plus MAC header and, where required, MAC CEs) is greater than ra-Msg3SizeGroupA and/or a pathloss is less than PCMAX (of the Serving Cell performing the Random Access Procedure)—preambleReceivedTargetPower—deltaPreambleMsg3—messagePowerOffsetGroupB. Alternatively and/or additionally, if the first condition, the second condition, the third condition and/or the fourth condition are not met and/or if Msg3 has not been transmitted (yet), and/or if the fifth condition is met, the Random Access Preambles group B may be selected. Alternatively and/or additionally, if the first condition, the second condition, the third condition, the fourth condition and/or the fifth condition are not met and/or if Msg3 has not been transmitted (yet), the Random Access Preambles group B may be selected.

Alternatively and/or additionally, if the first condition, the second condition, the third condition and/or the fourth condition are not met and/or if Msg3 has been transmitted a (same) group of Random Access Preambles that was used for a Random Access Preamble transmission attempt corresponding to a first transmission of Msg3 may be selected. Alternatively and/or additionally, if the first condition, the second condition, the third condition and/or the fourth condition are not met and/or if an association between Random Access Preambles and/or SSBs is configured, an ra-PreambleIndex may be selected randomly (with equal probability) from Random Access Preambles associated with a selected SSB and a selected group. Alternatively and/or additionally, if the first condition, the second condition, the third condition and/or the fourth condition are not met and/or if an association between Random Access Preambles and/or SSBs is not configured, a ra-PreambleIndex may be selected randomly (with equal probability) from the Random Access Preambles within the selected group. Alternatively and/or additionally, if the first condition, the second condition, the third condition and/or the fourth condition are not met, the PREAMBLE_INDEX may be set to the (selected) ra-PreambleIndex.

Alternatively and/or additionally, a sixth condition may be met if an SSB is selected (in one or more of the above steps) and/or an association between Physical Random Access Channel (PRACH) occasions and SSBs is configured. For example, if the sixth condition is met, a next available PRACH occasion may be determined based upon PRACH occasions corresponding to the selected SSB permitted by the restrictions given by the ra-ssb-OccasionMaskIndex if configured (e.g., the MAC entity may take into account a possible occurrence of measurement gaps when determining the next available PRACH occasion corresponding to the selected SSB).

Alternatively and/or additionally, a seventh condition may be met if CSI-RS is selected (in one or more of the above steps) and/or an association between PRACH occasions and CSI-RSs is configured. For example, if the sixth condition is not met and/or the seventh condition is met, a next available PRACH occasion may be determined based upon the PRACH occasions in ra-OccasionList corresponding to the selected CSI-RS (e.g., the MAC entity may take into account the possible occurrence of measurement gaps when determining the next available PRACH occasion corresponding to the selected CSI-RS).

Alternatively and/or additionally, if the sixth condition and/or the seventh condition are not met, a next available PRACH occasion may be determined (e.g., the MAC entity may take into account the possible occurrence of measurement gaps when determining the next available PRACH occasion).

In some examples, a Random Access Preamble transmission procedure may be performed. In some examples, the MAC entity may perform one or more operations associated with the Random Access Preamble transmission procedure. For example, if the PREAMBLE_TRANSMISSION_COUNTER is greater than one, if a notification of suspending power ramping counter has not been received from lower layers and/or if a selected SSB is not changed (e.g., if the selected SSB is the same as an SSB used in a previous Random Access Preamble transmission), the PREAMBLE_POWER_RAMPING_COUNTER may be incremented (by 1).

Alternatively and/or additionally, the PREAMBLE_RECEIVED_TARGET_POWER may be set to preambleReceivedTargetPower+DELTA_PREAMBLE+(PREAMBLE_POWER_RAMPING_COUNTER−1)×preamblePowerRampingStep.

In some examples, excluding contention-free Random Access Preamble for beam failure recovery request, a Random Access Radio Network Temporary Identifier (RA-RNTI) associated with a PRACH occasion in which the Random Access Preamble is transmitted may be computed. Alternatively and/or additionally, a physical layer may be instructed to transmit the Random Access Preamble using a selected PRACH, the (corresponding) RA-RNTI (if available), the PREAMBLE_INDEX and/or the PREAMBLE_RECEIVED_TARGET_POWER.

In some examples, once the Random Access Preamble has been transmitted (and/or regardless of a possible occurrence of a measurement gap), the MAC entity may perform one or more operations associated with Random Access Response reception. In some examples, an eighth condition may be met if the contention-free Random Access Preamble for beam failure recovery request was transmitted by the MAC entity. In some examples, if the eighth condition is met, the ra-ResponseWindow configured in BeamFailureRecoveryConfig at the first PDCCH occasion (as specified in 3GPP TS 38.213) from the end of the Random Access Preamble transmission may be started and/or the PDCCH of the SpCell may be monitored for a response to beam failure recovery request identified by the C-RNTI while the ra-ResponseWindow is running.

In some examples, if the eighth condition is not met, the ra-ResponseWindow configured in RACH-ConfigCommon at the first PDCCH occasion (as specified in TS 38.213) from the end of the Random Access Preamble transmission may be started and/or the PDCCH of the SpCell may be monitored for Random Access Response(s) identified by the RA-RNTI while the ra-ResponseWindow is running.

Alternatively and/or additionally, a ninth condition may be met if a notification of a reception of a PDCCH transmission is received from lower layers, if the PDCCH transmission is addressed to the C-RNTI and/or if the contention-free Random Access Preamble for beam failure recovery request was transmitted by the MAC entity. In some examples, if the ninth condition is met, the Random Access procedure may be considered to be successfully completed.

Alternatively and/or additionally, a tenth condition may be met if the ninth condition is not met and/or if a downlink assignment has been received on the PDCCH for the RA-RNTI and/or a received transmission block (TB) is successfully decoded. In some examples, if the tenth condition is met and/or if the Random Access Response comprises a Backoff Indicator subheader, the PREAMBLE_BACKOFF may be set to a value of a BI field of the Backoff Indicator subheader. Alternatively and/or additionally, if the tenth condition is met and/or the Random Access Response does not comprise a Backoff Indicator subheader, the PREAMBLE_BACKOFF may be set to 0 ms.

Alternatively and/or additionally, if the tenth condition is met and/or if the Random Access Response contains a Random Access Preamble identifier corresponding to a transmitted PREAMBLE_INDEX, Random Access Response reception may be considered successful. Alternatively and/or additionally, an eleventh condition may be met if the tenth condition is met and/or if the Random Access Response reception is considered successful. In some examples, if the eleventh condition is met and/or if the Random Access Response (only) includes a Random Access Preamble identifier (RAPID), the Random Access procedure may be considered to be successfully completed and/or reception of an acknowledgement for the SI request may be indicated to upper layers.

Alternatively and/or additionally, if the eleventh condition is met and/or if the Random Access Response does not (only) include a RAPID, one or more operations may be performed for the Serving Cell where the Random Access Preamble was transmitted, wherein the one or more operations may comprise one or more of: process a received Timing Advance Command; indicate a preambleReceivedTargetPower and an amount of power ramping applied to a latest Random Access Preamble transmission to lower layers (e.g., (PREAMBLE_POWER_RAMPING_COUNTER−1)×preamblePowerRampingStep); if the Serving Cell for the Random Access procedure is a Sounding Reference Signal (SRS)-only SCell, ignore a received UL grant; if the Serving Cell for the Random Access procedure is a not an SRS-only SCell, process the received UL grant value and/or indicate the received UL grant value to the lower layers.

Alternatively and/or additionally, if the eleventh condition is met and/or if the Random Access Preamble was not selected by the MAC entity among the contention-based Random Access Preamble, the Random Access procedure may be considered to be successfully completed.

Alternatively and/or additionally, if the eleventh condition is met and/or if the Random Access Preamble was selected by the MAC entity among the contention-based Random Access Preamble, the TEMPORARY_C-RNTI may be set to the value received in the Random Access Response. Alternatively and/or additionally, if the eleventh condition is met, if the Random Access Preamble was selected by the MAC entity among the contention-based Random Access Preamble, if the Random Access Response is a first successfully received Random Access Response within the Random Access procedure and/or if a transmission is not being made for a Common Control Channel (CCCH) (e.g., a logical channel), it may be indicated to a Multiplexing and assembly entity to include a C-RNTI MAC CE in a subsequent uplink transmission. Alternatively and/or additionally, if the eleventh condition is met, if the Random Access Preamble was selected by the MAC entity among the contention-based Random Access Preamble and/or if the Random Access Response is a first successfully received Random Access Response within the Random Access procedure, obtain a MAC Packet Data Unit (PDU) to transmit from the Multiplexing and assembly entity and store the MAC PDU in the Msg3 buffer.

Alternatively and/or additionally, a twelfth condition is met if the ResponseWindow configured in RACH-ConfigCommon expires, and/or if the Random Access Response containing Random Access Preamble identifiers that matches the transmitted PREAMBLE_INDEX has not been received. Alternatively and/or additionally, a thirteenth condition is met if the ra-ResponseWindow configured in BeamFailureRecoveryConfig expires and/or if the PDCCH addressed to the C-RNTI has not been received.

In some examples, if the twelfth condition and/or the thirteenth condition are met, the Random Access Response reception may be considered to be not successful. Alternatively and/or additionally, if the twelfth condition and/or the thirteenth condition are met, PREAMBLE_TRANSMISSION_COUNTER may be incremented by 1. Alternatively and/or additionally, if the twelfth condition and/or the thirteenth condition are met, if PREAMBLE_TRANSMISSION_COUNTER=preambleTxMax+1 and/or if the Random Access Preamble is transmitted on the SpCell, a Random Access problem may be indicated to upper layers. Alternatively and/or additionally, if the twelfth condition and/or the thirteenth condition are met, if PREAMBLE_TRANSMISSION_COUNTER=preambleTxMax+1 and/or if the Random Access Preamble is transmitted on an SCell, the Random Access procedure may be considered to be unsuccessfully completed.

In some examples, if the twelfth condition and/or the thirteenth condition are met, and/or if the Random Access Preamble was selected by MAC among the contention-based Random Access Preamble in the Random Access procedure, a random backoff time may be selected according to a uniform distribution between 0 and the PREAMBLE_BACKOFF, and/or a subsequent Random Access Preamble transmission may be delayed by the random backoff time. Alternatively and/or additionally, if the twelfth condition and/or the thirteenth condition are met, a Random Access Resource selection procedure may be performed.

In some examples, the MAC entity may stop ra-ResponseWindow (and/or monitoring for Random Access Response(s)) after successful reception of a Random Access Response containing Random Access Preamble identifiers that matches the transmitted PREAMBLE_INDEX. In some examples, HARQ operation is not applicable to the Random Access Response transmission.

Contention Resolution may be based upon either a C-RNTI on a PDCCH of the SpCell and/or UE Contention Resolution Identity on a Downlink Shared Channel (DL-SCH). In some examples, once a Msg3 is transmitted, the MAC entity may perform one or more operations associated with Contention Resolution. For example, an ra-ContentionResolutionTimer may be started and/or the ra-ContentionResolutionTimer may be restarted at each HARQ retransmission. Alternatively and/or additionally, the PDCCH may be monitored while the ra-ContentionResolutionTimer is running regardless of a possible occurrence of a measurement gap.

In some examples, a fourteenth condition may be met if a notification of a reception of a PDCCH transmission is received from lower layers. Alternatively and/or additionally, a fifteenth condition may be met if the C-RNTI MAC CE was included in Msg3. Alternatively and/or additionally, if the fourteenth condition and/or the fifteenth condition are met, and/or if the Random Access procedure was initiated by the MAC sublayer itself and/or by the RRC sublayer and/or the PDCCH transmission is addressed to the C-RNTI and contains a UL grant for a new transmission, if the Random Access procedure was initiated by a PDCCH order and/or the PDCCH transmission is addressed to the C-RNTI, and/or if the Random Access procedure was initiated for beam failure recovery and/or the PDCCH transmission is addressed to the C-RNTI, the Contention Resolution may be considered to be successful, ra-ContentionResolutionTimer may be stopped, TEMPORARY_C-RNTI may be discarded and/or the Random Access procedure may be considered to be successfully completed.

Alternatively and/or additionally, a sixteenth condition may be met if a CCCH SDU was included in Msg3 and/or the PDCCH transmission is addressed to the TEMPORARY_C-RNTI. In some examples, if the fourteenth condition and/or the sixteenth condition are met and/or the fifteenth condition is not met, and/or if the MAC PDU is successfully decoded, the ra-ContentionResolutionTimer may be stopped. Alternatively and/or additionally, if the fourteenth condition and/or the sixteenth condition are met and/or the fifteenth condition is not met, and/or if the MAC PDU is successfully decoded and/or if the MAC PDU contains a UE Contention Resolution Identity MAC CE and/or the UE Contention Resolution Identity in the MAC CE matches the CCCH SDU transmitted in Msg3, the Contention Resolution may be considered to be successful and/or the disassembly and/or demultiplexing of the MAC PDU may be finished, the C-RNTI may be set to a value of the TEMPORARY_C-RNTI, the TEMPORARY_C-RNTI may be discarded and/or the Random Access procedure may be considered to be successfully completed.

Alternatively and/or additionally, if the fourteenth condition and/or the sixteenth condition are met and/or the fifteenth condition is not met, and/or if the MAC PDU is not successfully decoded, the TEMPORARY_C-RNTI may be discarded, the Contention Resolution may be considered to be not successful and/or the successfully decoded MAC PDU may be discarded.

Alternatively and/or additionally, if the ra-Contention-ResolutionTimer expires, the TEMPORARY_C-RNTI may be discarded and/or the Contention Resolution may be considered to be not successful. Alternatively and/or additionally, if the Contention Resolution is considered to be not successful one or more operations may be performed which may comprise one or more of: flush a HARQ buffer used for transmission of the MAC PDU in the Msg3 buffer; increment PREAMBLE_TRANSMISSION_COUNTER by 1; if PREAMBLE_TRANSMISSION_COUNTER=preambleTxMax+1, indicate a Random Access problem to upper layers; select a random backoff time according to a uniform distribution between 0 and the PREAMBLE_BACKOFF; delay a subsequent Random Access Preamble transmission by the backoff time; perform a Random Access Resource selection procedure.

In some examples, upon completion of the Random Access procedure, the MAC entity may discard explicitly signaled contention-free Random Access Resources except contention-free Random Access Resources for beam failure recovery request, if any, and/or flush the HARQ buffer used for transmission of the MAC PDU in the Msg3 buffer.

In some examples, a beam failure recovery procedure is used for indicating to a serving gNB of a new SSB or CSI-RS when beam failure is detected on the serving SSB(s)/CSI-RS(s). Beam failure is detected by counting beam failure instance indications from the lower layers to the MAC entity. An RRC may configure one or more of the following parameters in the BeamFailureRecoveryConfig for a Beam Failure Detection and Recovery procedure: beamFailureInstanceMaxCount for beam failure detection; beamFailureDetectionTimer for beam failure detection; preamblePowerRampingStep: preamblePowerRampingStep for beam failure recovery; preambleReceivedTargetPower: preambleReceivedTargetPower for beam failure recovery; preambleTxMax: preambleTxMax for beam failure recovery; ra-ResponseWindow which may be a time window for monitoring response(s) for beam failure recovery using a contention-free Random Access Preamble.

Alternatively and/or additionally, a UE variable used for a beam failure detection procedure may comprise BFI_COUNTER, which may be associated with a counter for beam failure instance indication.

In some examples, the MAC entity may perform one or more operations associated with the Beam Failure Detection and Recovery procedure. For example, if a beam failure instance indication has been received from lower layers and/or if the beamFailureDetectionTimer is not running, the BFI_COUNTER may be set to 0 and/or the beamFailureDetectionTimer may be started. Alternatively and/or additionally, if the beam failure instance indication has been received from lower layers and/or if the beamFailureDetectionTimer is running, the beamFailureDetectionTimer may be restarted. Alternatively and/or additionally, if the beam failure instance indication has been received from lower layers, the BFI_COUNTER may be incremented by 1. Alternatively and/or additionally, if the beam failure instance indication has been received from lower layers and/or if BFI_COUNTER=beamFailureInstanceMaxCount+1, a Random Access procedure may be initiated on an SpCell by applying parameters configured in BeamFailureRecoveryConfig (unless otherwise specified). Alternatively and/or additionally, if the beamFailureDetectionTimer expires, the BFI_COUNTER may be set to 0. Alternatively and/or additionally, if the Random Access procedure is successfully completed, the Beam Failure Recovery procedure may be considered successfully completed In 3GPP TS 38.300 v15.0.0, information associated with RRM measurements (e.g., beam measurement) is provided. In RRC_CONNECTED, the UE measures multiple beams (at least one) of a cell and measurements results (power values) are averaged to derive a cell quality. In doing so, the UE is configured to consider a subset of detected beams: the N best beams above an absolute threshold. Filtering takes place at two different levels: at the physical layer to derive beam quality and at RRC level to derive cell quality from multiple beams. Cell quality from beam measurements is derived in the same way for one or more serving cells and for one or more non-serving cells. Measurement reports may comprise measurement results of the X best beams if the UE is configured to do so by the gNB.

Figure 12:
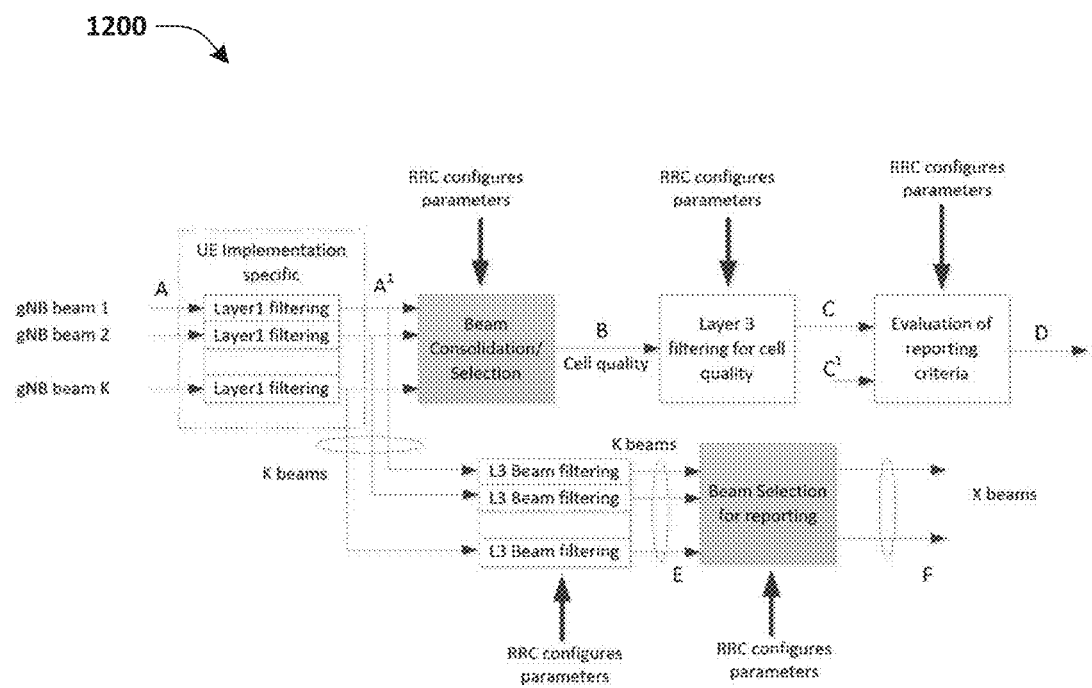
FIG. 12 illustrates a high-level diagram of an exemplary measurement model.

FIG. 12 illustrates a high-level diagram 1200 of an exemplary measurement model. One or more signals A may correspond to measurements (beam specific samples) internal to the physical layer. Layer 1 filtering may correspond to internal layer 1 filtering of the inputs measured at point A. Exact filtering is implementation dependent. How the measurements are actually executed in the physical layer by an implementation (inputs A and Layer 1 filtering) in not constrained by the standard. One or more signals $A^1$ may correspond to measurements (i.e. beam specific measurements) reported by layer 1 to layer 3 after layer 1 filtering. Beam Consolidation/Selection may correspond to beam specific measurements being consolidated to derive cell quality if N>1, else when N=1 the best beam measurement is selected to derive cell quality. Behavior of the Beam Consolidation/Selection is standardized and/or the configuration of this module is provided by RRC signaling. Reporting period at B equals one measurement period at $A^1$.

One or more signals B may correspond to a measurement (i.e. cell quality) derived from beam-specific measurements reported to layer 3 after beam consolidation/selection. Layer 3 filtering for cell quality may correspond to performing filtering on the measurements associated with the one or more signals B. Behavior of the Layer 3 filters is standardized and the configuration of the layer 3 filters is provided by RRC signaling. Filtering reporting period associated with one or more signals C equals one measurement period associated with the one or more signals B. One or more signals C may correspond to a measurement after processing in the layer 3 filter. A reporting rate associated with the one or more signals C may identical to a reporting rate associated with the one or more signals B. This measurement is used as an input for one or more evaluations of reporting criteria.

Evaluation of reporting criteria may correspond to checking whether actual measurement reporting associated with one or more signals D is necessary. The evaluation can be based on more than one flow of measurements at a reference point associated with the one or more signals C (e.g., to compare between different measurements). This is illustrated by the one or more signals C and/or one or more signals C1. The UE shall evaluate reporting criteria each time a new measurement result is reported (e.g., using the one or more signals C and/or the one or more signals C1). The reporting criteria are standardized and the configuration is provided by RRC signaling (e.g., UE measurements).

One or more signals D may be associated with a measurement report information (e.g., message) sent on the radio interface. L3 Beam filtering may be associated with filtering performed on the measurements (i.e. beam specific measurements) associated with the one or more signals $A^1$. Behavior of beam filters is standardized and the configuration of the beam filters is provided by RRC signaling. Filtering reporting period associated with one or more signals E equals one measurement period associated with the one or more signals $A^1$. The one or more signals E may be associated with a measurement (i.e. beam-specific measurement) after processing in the beam filters. A reporting rate associated with the one or more signals E equals is identical to a reporting rate associated with the one or more signals $A^1$. This measurement is used as input for selecting the X measurements to be reported.

Beam Selection for beam reporting is associated with selecting the X measurements from the measurements provided at point E. The behavior of the beam selection is standardized and the configuration of this module is provided by RRC signaling. One or more signals F may be associated with beam measurement information included in a measurement report (sent) on the radio interface.

Layer 1 filtering introduces a certain level of measurement averaging. How and when the UE performs required measurements is implementation specific to the point that the one or more signals B fulfils performance requirements set in 3GPP TS 38.133. Layer 3 filtering for cell quality and related parameters used are specified in 3GPP TS 38.331 and does not introduce any delay in the sample availability between B and C. Measurement associated with the one or more signals C and/or the one or more signals C1 is used in event evaluation. L3 Beam filtering and related parameters used are specified in 3GPP TS 38.331 and do not introduce any delay in sample availability between the one or more signals E and the one or more signals F.

Measurement reports may include the measurement identity of the associated measurement configuration that triggered the reporting. Alternatively and/or additionally, cell and beam measurement quantities to be included in measurement reports are configured by the network. Alternatively and/or additionally, the number of non-serving cells to be reported can be limited through configuration by the network. Alternatively and/or additionally, cells belonging to a blacklist configured by the network are not used in event evaluation and reporting, and conversely when a whitelist is configured by the network, only the cells belonging to the whitelist are used in event evaluation and reporting. Alternatively and/or additionally, beam measurements to be included in measurement reports are configured by the network (e.g., beam identifier only, measurement result and beam identifier, or no beam reporting).

3GPP R2-1803796 provides information associated with MAC CEs for NR MIMO. In some examples, a network may indicate a Transmission Configuration Indicator (TCI) state for PDCCH reception for a control resource set (CORESET) of a Serving Cell by sending the TCI State Indication for UE-specific PDCCH MAC CE. If a MAC entity receives a TCI State Indication for UE-specific PDCCH MAC CE on a Serving Cell, the MAC entity may indicate to lower layers, information associated with the TCI State Indication for UE-specific PDCCH MAC CE.

FIG. 13 illustrates a diagram 1300 of an exemplary TCI State indication for UE-specific PDCCH MAC CE. A Serving Cell ID field indicates an identity of the Serving Cell for which the MAC CE applies. A length of the Serving Cell ID field is 5 bits. A BWP ID field contains a BWP-Id of a downlink bandwidth part for which the MAC CE applies. A length of the BWP ID field is 2 bits. A CORESET ID field indicates a Control Resource Set identified with ControlResourceSetId, for which the TCI State is being indicated. The length of the CORESET ID field is 2 bits. A TCI State ID field indicates the TCI state identified by TCI-StateId applicable to the Control Resource Set identified by CORESET ID field. The length of the CORESET ID field is 6 bits. An R field corresponds to a Reserved bit, set to "0".

Figure 14:
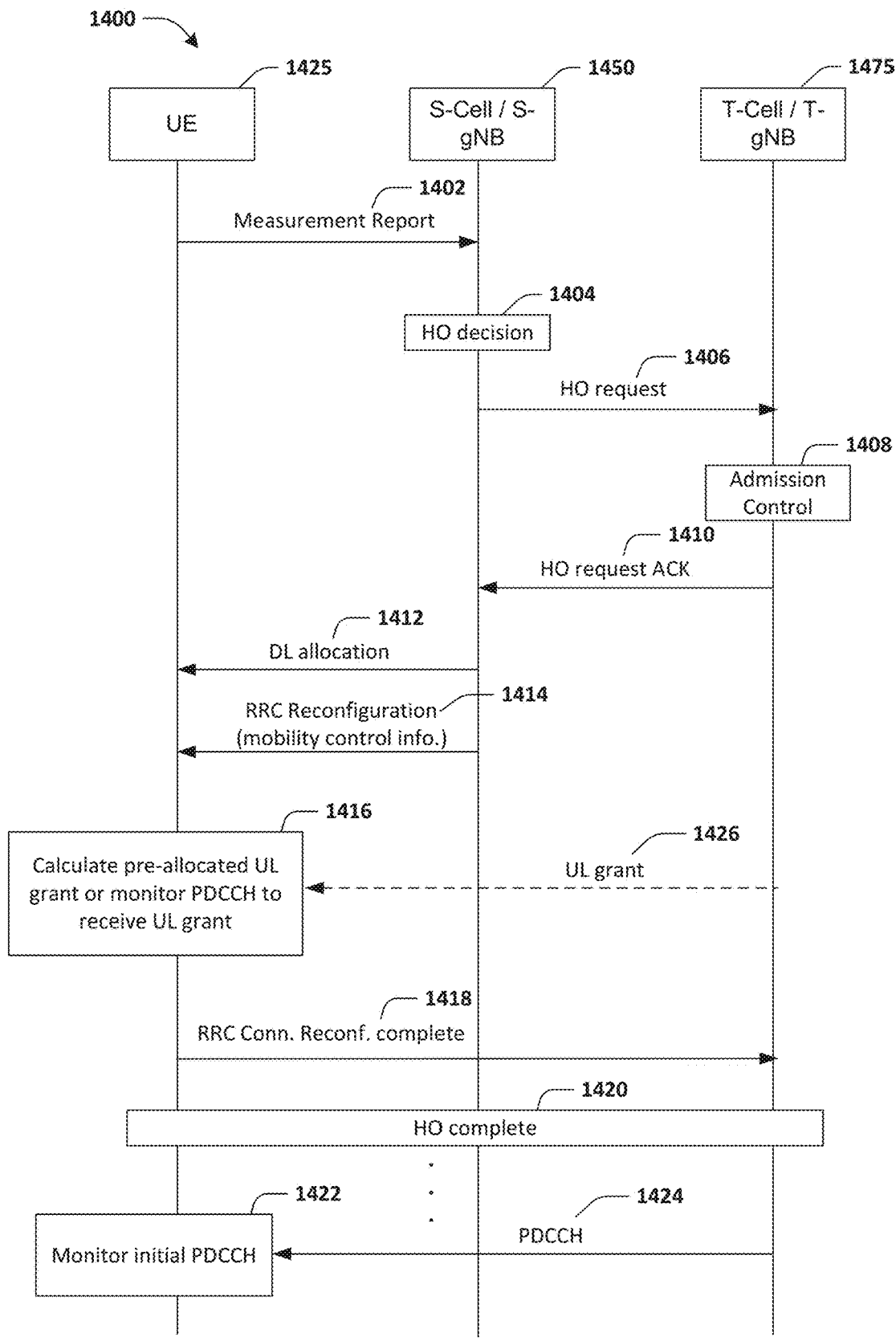
FIG. 14 illustrates examples of a system for performing an RACH-less handover procedure.

FIG. 14 illustrates examples of a system 1400 for performing an RACH-less HO procedure. In some examples, a measurement procedure associated with a UE 1425 may be configured using a source cell, S-Cell 1450 (and/or a source gNB, S-gNB). Alternatively and/or additionally, the UE 1425 may be configured to perform the RACH-less HO procedure using an RRC parameter (e.g., an rach-Less RRC parameter, an rach-Skip RRC parameter, etc.).

In some examples, the UE 1425 may trigger (and/or generate) a measurement report 1402. The measurement report 1402 may be transmitted to the S-Cell 1450. The measurement report 1402 may comprise one or more beam measurement results associated with a target cell, T-Cell 1475 (and/or a target gNB, T-gNB). For example, the measurement report 1402 may comprise one or more of a beam identifier, a SSB identifier, a CSI-RS identifier, an SSB measurement result, a CSI-RS measurement result, a TCI state, etc.

In some examples, the S-Cell 1450 may make an HO decision 1404 based upon the measurement report 1402 and/or RRM information. In some examples, the HO decision 1404 may correspond to a decision to perform an HO. Alternatively and/or additionally, the HO decision 1404 may correspond to a decision not to perform an HO.

In some examples, the S-Cell 1450 may issue (e.g., transmit) an HO request message 1406 (e.g., a HandoverPreparationInformation message) to the T-Cell 1475. For example, the HO request message 1406 may be generated by the S-Cell 1450 based upon the HO decision 1404 and/or the measurement report 1402. Alternatively and/or additionally, the HO request message 1406 may comprise information associated with (preparation of) the T-Cell 1475 performing an HO. Alternatively and/or additionally, the HO request message 1406 may comprise one or more second beam measurement results associated with the T-Cell 1475 and/or the UE 1425. In some examples, the one or more second beam measurement results may be the same as the one or more beam measurement results. Alternatively and/or additionally, the one or more second beam measurement results may be different than the one or more beam measurement results.

In some examples, the T-Cell 1475 may perform admission control 1408. For example, the admission control 1408 may be performed by configuring one or more RACH resources and/or by reserving a C-RNTI and/or an RACH preamble for the UE 1425.

In some examples, the T-Cell 1475 may prepare the HO with L1/L2 (responsive to receiving the HO request 1406 and/or performing the admission control 1408). Alternatively and/or additionally, the T-Cell 1475 may transmit an HO request ACK (HO ACK) 1410 (e.g., a HandoverCommand message) to the S-Cell 1450. In some examples, the HO ACK 1410 may comprise a timing adjustment indication (e.g., a TA indication) and/or one or more pre-allocated UL grants. The one or more pre-allocated UL grants may be associated with one or more beams.

In some examples, the T-Cell 1475 may generate an RRC reconfiguration message. Alternatively and/or additionally, the RRC reconfiguration message may comprise mobility control information associated with performing the HO. Alternatively and/or additionally, the HO ACK 1410 may comprise the RRC reconfiguration message. In some examples, the one or more pre-allocated UL grants may be one or more periodic UL resources.

In some examples, the S-Cell 1450 may transmit a downlink (DL) allocation message 1412 to the UE 1425. For example, the DL allocation message 1412 may be associated with allocating DL data to the UE. In some examples, the DL data may be allocated to the UE to transmit a second RRC reconfiguration message 1414 to the UE 1425.

In some examples, the second RRC reconfiguration message 1414 may be the same as the RRC reconfiguration message (comprised within the HO ACK 1410). Alternatively and/or additionally, the second RRC reconfiguration message 1414 may be different than the RRC reconfiguration message. In some examples, the second RRC reconfiguration message 1414 may be transmitted, by the S-Cell 1450, to the UE 1425.

In some examples, one or more HO parameters (e.g., a reconfigurationWithSync parameter) may be transmitted to the UE 1425, by the S-Cell 1450, in association with the second RRC reconfiguration message 1414. For example, the one or more HO parameters and/or the second RRC reconfiguration message 1414 may be comprised within a (single) message transmitted to the UE 1425. Alternatively and/or additionally, the one or HO parameters and/or the second RRC reconfiguration message 1414 may be transmitted to the UE 1425 separately.

In some examples, the one or more HO parameters and/or the second RRC reconfiguration message 1414 may comprise a command to perform the HO (e.g., an HO command). Alternatively and/or additionally, the one or more HO parameters may comprise one or more of a new C-RNTI, one or more target gNB security algorithm identifiers, a dedicated RACH preamble, one or more target gNB SIBs, etc. Alternatively and/or additionally, the second RRC reconfiguration message 1414 may comprise the timing adjustment indication (and/or a second timing adjustment indication) and/or the one or more pre-allocated UL grants (and/or one or more second pre-allocated UL grants) for accessing the T-Cell 1475.

In some examples, the UE 1425 may perform one or more operations 1416 associated with determining one or more UL grants associated with the T-Cell 1475. In some examples, if the one or more pre-allocated UL grants (and/or the one or more second pre-allocated UL grants) for accessing the T-Cell 1475 are comprised within the second RRC reconfiguration message 1414, the one or more operations 1416 may comprise calculating the one or more pre-allocated UL grants (and/or the one or more second pre-allocated UL grants) based upon the second RRC reconfiguration message 1414. For example, if the one or more pre-allocated UL grants (and/or the one or more second pre-allocated UL grants) for accessing the T-Cell 1475 are comprised within the second RRC reconfiguration message 1414, the one or more pre-allocated UL grants (and/or the one or more second pre-allocated UL grants) may be calculated based upon the second RRC reconfiguration message 1414.

Alternatively and/or additionally, if the one or more pre-allocated UL grants (and/or the one or more second pre-allocated UL grants) are not comprised within the second RRC reconfiguration message 1414, the one or more operations 1416 may comprise monitoring a PDCCH of the T-Cell 1475 to receive one or more UL grants 1426 from the T-Cell 1475. For example, if the one or more pre-allocated UL grants (and/or the one or more second pre-allocated UL grants) are not comprised within the second RRC reconfiguration message 1414, the UE 1425 may monitor the PDCCH of the T-Cell 1475 and/or the one or more UL grants 1426 may be received from the T-Cell 1475.

In some examples, the UE 1425 may transmit an RRC reconfiguration complete message 1418 (e.g., an HO complete message) to the T-Cell 1475 using the one or more pre-allocated UL grants (and/or the one or more second pre-allocated UL grants) and/or using the one or more UL grants 1426.

For example, if the one or more pre-allocated UL grants (and/or the one or more second pre-allocated UL grants) for accessing the T-Cell 1475 are comprised within the second RRC reconfiguration message 1414, the RRC reconfiguration complete message 1418 may be transmitted to the T-Cell 1475 using the one or more pre-allocated UL grants (and/or the one or more second pre-allocated UL grants). Alternatively and/or additionally, if the one or more pre-allocated UL grants (and/or the one or more second pre-allocated UL grants) are not comprised within the second RRC reconfiguration message 1414, the RRC reconfiguration complete message 1418 may be transmitted to the T-Cell 1475 using the one or more UL grants 1426 received via PDCCH monitoring. In some examples, the RRC reconfiguration complete message 1418 may be associated with an HO confirmation corresponding to the HO.

In some examples, one or more HO complete operations 1420 may be performed. For example, the one or more HO complete operations 1420 may comprise the T-Cell 1475 verifying a C-RNTI (e.g., the new C-RNTI, a C-RNTI different than the new C-RNTI, etc.) comprised within the RRC reconfiguration complete message 1418. In some examples, the HO procedure may be completed (for the UE 1425) responsive to the one or more HO complete operations 1420 being performed.

In some examples, responsive to completion of the one or more HO complete operations 1420, the UE may monitor 1422 a (initial) PDCCH 1424 for DL and/or UL data scheduling. For example, information associated with DL and/or UL data scheduling may be received via the monitoring 1422 the PDCHH 1424.

Alternatively and/or additionally, responsive to completion of the one or more HO complete operations 1420, the UE 1425 may transmit data to the T-Cell 1475 and/or the T-Cell 1475 may receive the data from the UE 1425. Alternatively and/or additionally, responsive to completion of the one or more HO complete operations 1420, the T-Cell 1475 may transmit data to the UE 1425 and/or the UE may receive the data from the T-Cell 1475.

Figure 15:
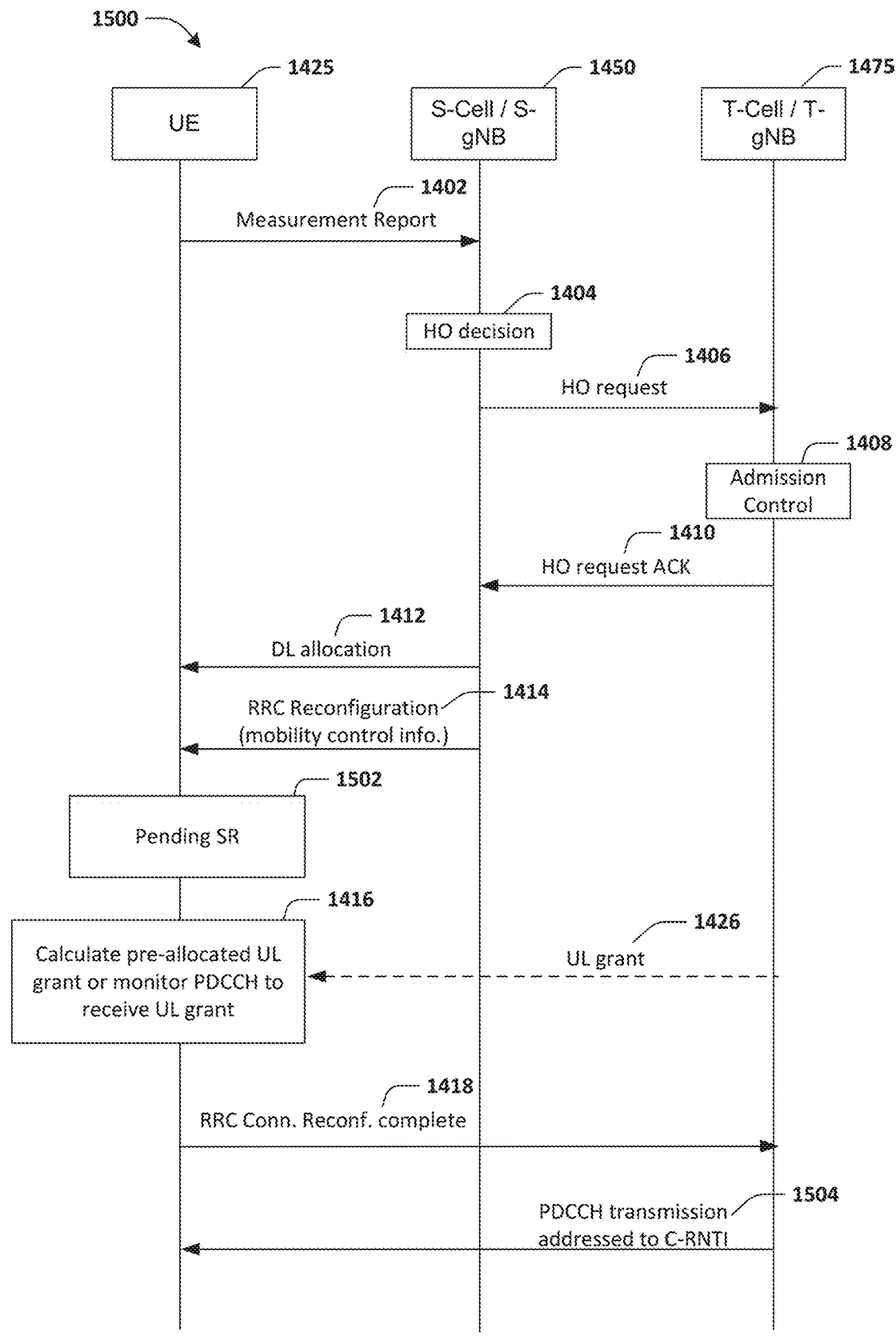
FIG. 15 illustrates examples of a system for performing an RACH-less handover procedure.

FIG. 15 illustrates examples of a system 1500 for performing the RACH-less HO procedure using the UE 1425, the S-Cell 1450 and/or the T-Cell 1475. In some examples, the UE 1425 may not initiate a random access procedure due to a pending scheduling request 1502. For example, the UE 1425 may access the T-Cell 1475 using the one or more pre-allocated UL grants (and/or the one or more second pre-allocated UL grants) in order to perform the (RACH-less) HO (if the one or more pre-allocated UL grants (and/or the one or more second pre-allocated UL grants) for accessing the T-Cell 1475 are comprised within the second RRC reconfiguration message 1414).

Alternatively and/or additionally, the UE may monitor the PDCCH of the T-Cell 1475 to receive (e.g., acquire) the one or more UL grants 1426 (if the one or more pre-allocated UL grants (and/or the one or more second pre-allocated UL grants) for accessing the T-Cell 1475 are not comprised within the second RRC reconfiguration message 1414).

The UE 1425 may transmit the RRC reconfiguration complete message 1418 (e.g., the HO complete message) via the one or more pre-allocated UL grants (and/or the one or more second pre-allocated UL grants) comprised within the second RRC reconfiguration message 1414 and/or via the one or more UL grants 1426 received via PDCCH monitoring.

In some examples, a PDCCH transmission 1504 may be transmitted by the T-Cell 1475 to the UE 1425. For example, the PDCCH transmission 1504 may be associated with the one or more HO complete operations 1420 and/or may be performed to verify a C-RNTI (e.g., the new C-RNTI, a C-RNTI different than the new C-RNTI, etc.) comprised within the RRC reconfiguration complete message 1418. In some examples, the HO procedure may be complete responsive to the PDCCH transmission 1504 being transmitted to the UE 1425.

It may be appreciated that the RACH-less HO procedure may result in high HO performance with 0 ms interruption, lower latency, higher efficiency and/or higher reliability than other HO procedures.

In NR, beamforming may be utilized to increase antenna gain. Accordingly, beam management may be necessary for a network and/or the UE 1425 to determine one or more beams available for UL data transmission and/or DL data transmission. As illustrated in FIG. 14, the UE 1425 may provide the measurement report 1402, comprising the one or more beam measurement results, to the S-Cell 1450. The S-Cell 1450 may make the HO decision 1404 based upon the measurement report 1402 (and/or the RRM information). In some examples, if the HO decision 1404 is a decision to perform an HO (e.g., if the S-Cell 1450 decides to perform an HO based upon the measurement report 1402 and/or the RRM information), the S-Cell 1450 may provide the measurement report 1402 to the T-Cell 1475 via the HO request message 1406. For example, the measurement report 1402 may be included in the HO request message 1406 transmitted by the S-Cell 1450 to the T-Cell 1475.

The T-Cell 1475 may pre-allocate one or more pre-allocated UL grants associated with one or more DL signals (e.g., SSB and/or CSI-RS) of the T-Cell 1475 based upon the one or more beam measurement results. The one or more DL signals may be associated with one or more beams. Alternatively and/or additionally, the T-Cell 1475 may provide the one or more pre-allocated UL grants (and/or an association between the one or more pre-allocated UL grants and one or more identifications (e.g., IDs) of the one or more DL signals) to the S-Cell 1450 (via the HO ACK 1410). Alternatively and/or additionally, the S-Cell 1450 may provide the one or more pre-allocated UL grants (and/or the association between the one or more pre-allocated UL grants and the one or more identifications (e.g., IDs) of the one or more DL signals) to the UE 1425 (via the DL allocation message 1412 and/or the second RRC reconfiguration message 1414).

In some examples, (it may be assumed that) the UE 1425 (and/or a different UE) may be configured to perform RACH-less HO and/or the UE 1425 is configured with one or more pre-allocated UL grants. For example, the UE 1425 may receive the one or more pre-allocated UL grants via the DL allocation message 1412 and/or the second RRC reconfiguration message 1414. The UE 1425 may (then) select a qualified DL signal of the T-Cell 1475 (based upon the one or more pre-allocated UL grants). In some examples, the qualified DL signal may be associated with the one or more pre-allocated UL grants. Alternatively and/or additionally, the qualified DL signal may be associated with a quality that is above a threshold (e.g., a threshold quality) and/or the qualified DL signal may be associated with an RSRP that is above a threshold RSRP. Alternatively and/or additionally, one or more beams may be determined based upon (and/or derived from) based upon the qualified DL signal (and/or the one or more pre-allocated UL grants). For example, the one or more beams may be used for transmission of the RRC reconfiguration complete message 1418.

In some examples, a DL signal may be (determined to be) qualified if a quality associated with the DL signal is above the threshold and/or if an RSRP associated with the DL signal is above the threshold RSRP. Alternatively and/or additionally, a DL signal may be (determined to be) unqualified if a quality associated with the DL signal is lower than the threshold and/or if an RSRP associated with the DL signal is lower than the threshold RSRP.

Figure 16:
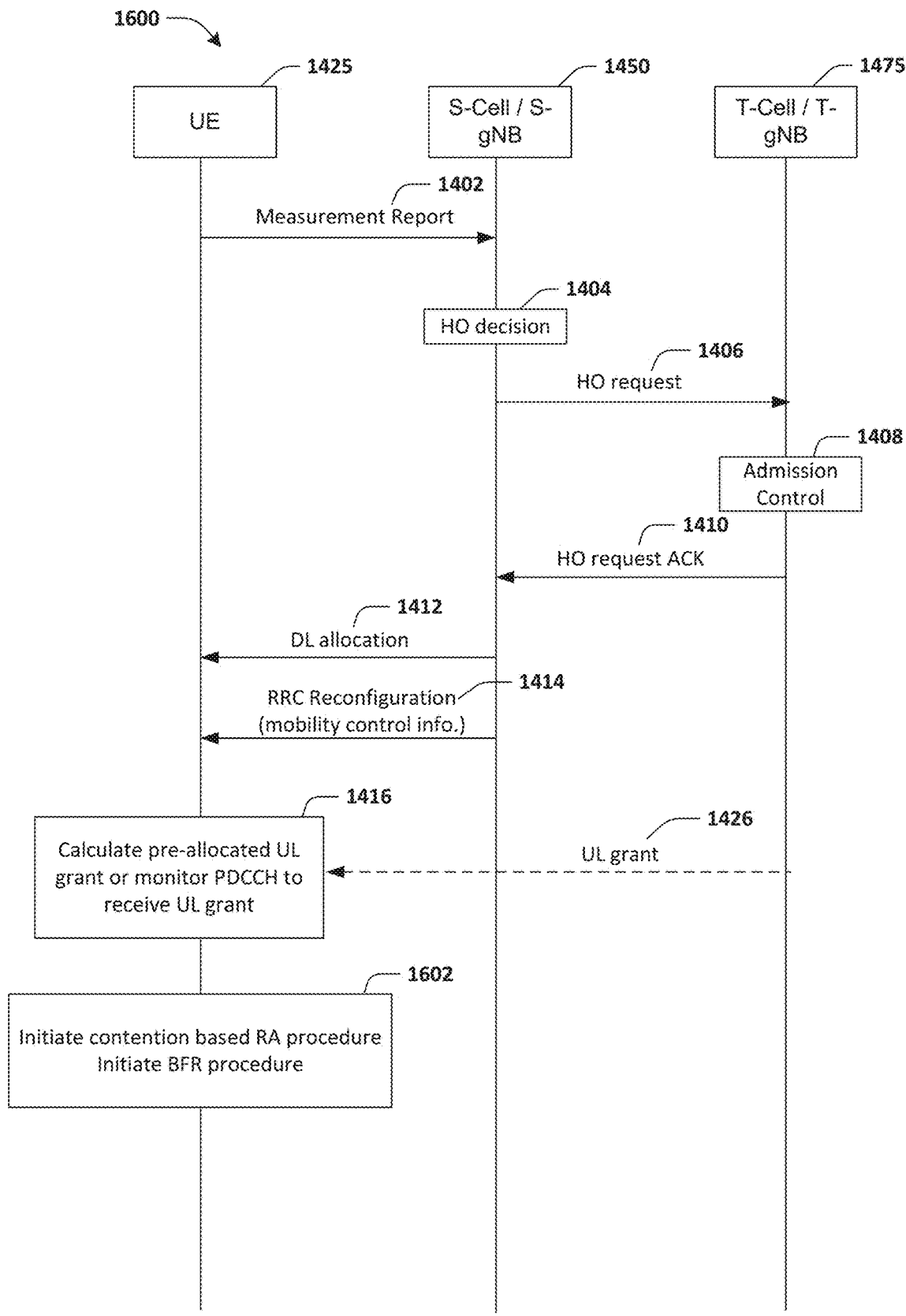
FIG. 16 illustrates examples of a system for performing an RACH-less handover procedure.

FIG. 16 illustrates examples of a system 1600 for performing the RACH-less HO procedure using the UE 1425, the S-Cell 1450 and/or the T-Cell 1475. In some examples, it may be determined that a qualified DL signal, associated with the one or more pre-allocated UL grants, is not available. For example, it may be determined that one or more DL signals (and/or every DL signal) associated with the one or more pre-allocated UL grants may not be associated with a quality that is above a threshold (associated with qualified DL signals) and/or that the one or more DL signals (and/or every DL signal) associated with the one or more pre-allocated UL grants may not be associated with an RSRP that is above a threshold RSRP (associated with qualified DL signals). Accordingly, the UE 1425 may be unable to select a (suitable) DL signal to derive (and/or determine) one or more beams for transmission of the RRC reconfiguration complete message 1418 (using the one or more pre-allocated UL grants, for example). Accordingly, the UE 1425 may be unable to (successfully) transmit the RRC reconfiguration complete message 1418 (e.g., the HO complete message) to the T-Cell 1475. Accordingly, the RACH-less HO may fail (and/or may not be successfully completed).

Various techniques are presented in the present disclosure for prevention of unsuccessful transmission of the RRC reconfiguration complete message 1418 (e.g., the HO complete message) by the UE 2025 (to the T-Cell 1475) and/or prevention of unsuccessful establishment of a beam pair link. For example, during the RACH-less HO, one or more qualified beams configured with the one or more pre-allocated UL grants may be determined (and/or selected) for transmission of the RRC reconfiguration complete message 1418 (e.g., the HO complete message) by the UE 2025 (to the T-Cell 1475). Alternatively and/or additionally, if the UE does not find (any available) qualified beams configured with the one or more pre-allocated UL grants (because most and/or all qualified beams configured with the one or more pre-allocated UL grants may be unqualified beams (e.g., may not be qualified beams), for example), the UE 2025 may perform one or more operations 1602. For example, the one or more operations 1602 may comprise initiating a contention based random access procedure and/or initiating a beam failure recovery procedure.

In some examples, a beam may be (determined to be) qualified if a quality associated with the beam is above the threshold and/or if an RSRP associated with the beam is above the threshold RSRP. Alternatively and/or additionally a beam may be (determined to be) unqualified if a quality associated with the beam is lower than the threshold and/or if an RSRP associated with the beam is lower than the threshold RSRP.

In a first embodiment, a contention based random access procedure (also known as a CB RA procedure) may be initiated in a target cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may initiate the contention based random access procedure. For example, the UE may initiate the contention based random access procedure responsive to the one or more DL signals not comprising a DL signal (and/or any DL signals) associated with a quality that is above a threshold (and/or associated with an RSRP that is above a threshold RSRP). The UE may select a suitable beam associated with one or more common RACH resources during the contention based random access procedure (e.g., the one or more common RACH resources may be configured in RACH-ConfigCommon and/or RACH-ConfigCommon may be indicative of the one or more common RACH resources).

Alternatively and/or additionally, the UE may initiate the contention based random access procedure when (e.g., prior to, while and/or after) the UE is configured for an RACH-less HO. Alternatively and/or additionally, the UE may initiate the contention based random access procedure when (e.g., prior to, while and/or after) the RACH-less HO is being performed.

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single DL signal (e.g., an SSB resource and/or a CSI-RS resource). Alternatively and/or additionally, a quality associated with the single DL signal may not be above (and/or may be below) a threshold and/or an RSRP associated with the single DL signal may not be above (and/or may be below) a threshold RSRP. Alternatively and/or addition- ally, responsive to the quality associated with the single DL signal not being above the threshold and/or responsive to the RSRP associated with the single DL signal not being above the threshold RSRP, the UE may initiate the contention based random access procedure.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the contention based random access procedure.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the contention based random access procedure.

In some examples, if the UE initiates the contention based random access procedure (and/or responsive to the UE initiating the contention based random access procedure), the one or more (periodically) pre-allocated UL grants may be discarded (by the UE). Alternatively and/or additionally, if the UE initiates the contention based random access procedure (and/or responsive to the UE initiating the contention based random access procedure), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the contention based random access procedure (and/or responsive to the UE initiating the contention based random access procedure), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In a second embodiment, a contention free random access procedure (also known as a CF RA procedure) may be initiated in a target cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may initiate the contention free random access procedure. For example, the UE may initiate the contention free random access procedure responsive to the one or more DL signals not comprising a DL signal (and/or any DL signals) associated with a quality that is above a threshold (and/or associated with an RSRP that is above a threshold RSRP). The UE may select a suitable DL signal associated with one or more dedicated RACH resources during the contention free random access procedure (e.g., the one or more dedicated RACH resources may be configured in the RRC configuration message (and/or a different RRC configuration message) and/or the RRC configuration message (and/or the different RRC configuration message) may be indicative of the one or more dedicated RACH resources). Alternatively and/or additionally, the one or more dedicated RACH resources may be configured in RACH-ConfigDedicated (e.g., RACH-ConfigDedicated may be indicative of the one or more dedicated RACH resources).

Alternatively and/or additionally, the network may (need to) provide the UE with the one or more dedicated RACH resources when configuring the UE to perform an RACH-less HO.

Alternatively and/or additionally, the UE may initiate the contention free random access procedure when (e.g., prior to, while and/or after) the UE is configured for the RACH-less HO. Alternatively and/or additionally, the UE may initiate the contention free random access procedure when (e.g., prior to, while and/or after) the RACH-less HO is being performed.

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single DL signal (e.g., an SSB resource and/or a CSI-RS resource). Alternatively and/or additionally, a quality associated with the single DL signal may not be above (and/or may be below) a threshold and/or an RSRP associated with the single DL signal may not be above (and/or may be below) a threshold RSRP. Alternatively and/or additionally, responsive to the quality associated with the single DL signal not being above the threshold and/or responsive to the RSRP associated with the single DL signal not being above the threshold RSRP, the UE may initiate the contention free random access procedure.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the contention free random access procedure.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the contention free random access procedure.

In some examples, if the UE initiates the contention free random access procedure (and/or responsive to the UE initiating the contention free random access procedure), the one or more (periodically) pre-allocated UL grants may be discarded (by the UE). Alternatively and/or additionally, if the UE initiates the contention free random access procedure (and/or responsive to the UE initiating the contention free random access procedure), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the contention free random access procedure (and/or responsive to the UE initiating the contention free random access procedure), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In a third embodiment, one or more new beam measurement results and/or a new beam measurement report may be triggered, generated and/or transmitted to a target cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may trigger and/or generate the one or more new beam measurement results and/or the new measurement report and/or the UE may transmit the one or more new beam measurement results and/or the new measurement report to the target cell. For example, UE may trigger and/or generate the one or more new beam measurement results and/or the new measurement report and/or transmit the one or more new beam measurement results and/or the new measurement report to the target cell responsive to the one or more DL signals not comprising a DL signal (and/or any DL signals) associated with a quality that is above a threshold (and/or associated with an RSRP that is above a threshold RSRP).

In some examples, the one or more new beam measurement results may not be the same as one or more measurement results included in a measurement report (e.g., such as the measurement report 1402 illustrated in FIG. 14, for example) transmitted prior to an HO decision (e.g., such as the HO decision 1404 illustrated in FIG. 14, for example) is made. Alternatively and/or additionally, the new measurement report may not be the same as the measurement report transmitted prior to the HO decision is made. In some examples, the one or more new beam measurement results and/or the new measurement report may comprise measurement information. For example, the measurement information may comprise information (e.g., quality information, RSRP information, etc.) associated with one or more beams. Alternatively and/or additionally, the measurement information may be generated after the HO decision is made (e.g., the measurement information may be generated based upon measurements determined after the HO decision is made). Alternatively and/or additionally, the measurement information may be generated after the measurement report is transmitted.

Alternatively and/or additionally, the one or more new beam measurement results and/or the new measurement report may be transmitted (to the target cell) via the one or more (periodic) pre-allocated UL grants. Alternatively and/or additionally, the one or more new beam measurement results and/or the new measurement report may be included in an RRC reconfiguration complete message (e.g., an HO complete message) (e.g., such as the RRC reconfiguration complete message 1418 illustrated in FIG. 14, for example), wherein the RRC reconfiguration complete message may be transmitted to the target cell. Alternatively and/or additionally, the one or more new beam measurement results and/or the new measurement report may be transmitted (to the target cell) prior to transmitting the RRC reconfiguration complete message (to the target cell).

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single DL signal (e.g., an SSB resource and/or a CSI-RS resource). Alternatively and/or additionally, a quality associated with the single DL signal may not be above (and/or may be below) a threshold and/or an RSRP associated with the single DL signal may not be above (and/or may be below) a threshold RSRP. Alternatively and/or additionally, responsive to the quality associated with the single DL signal not being above the threshold and/or responsive to the RSRP associated with the single DL signal not being above the threshold RSRP, the UE may trigger and/or generate the one or more new beam measurement results and/or the new measurement report and/or the UE may transmit the one or more new beam measurement results and/or the new measurement report to the target cell.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may trigger and/or generate the one or more new beam measurement results and/or the new measurement report and/or the UE may transmit the one or more new beam measurement results and/or the new measurement report to the target cell.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may trigger and/or generate the one or more new beam measurement results and/or the new measurement report and/or the UE may transmit the one or more new beam measurement results and/or the new measurement report to the target cell.

In a fourth embodiment, a message may be transmitted to a source cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may transmit the message to the source cell. For example, the UE may transmit the message to the source cell responsive to the one or more DL signals not comprising a DL signal (and/or any DL signals) associated with a quality that is above a threshold (and/or associated with an RSRP that is above a threshold RSRP). The message may be indicative of the one or more (candidate) DL signals not comprising a DL signal (and/or any DL signals) associated with a quality that is above the threshold (and/or associated with an RSRP that is above the threshold RSRP) (e.g., the message may be indicative of the one or more DL signals not comprising a qualified DL signal). Alternatively and/or additionally, the message may indicate that each (and/or every) DL signal of the one or more (candidate) DL signals is associated with a quality that is not above (and/or is below) the threshold (and/or is associated with an RSRP that is not above (and/or is below) the threshold RSRP). For example, the message may be used (and/or transmitted to the source cell) to inform the source cell that each (and/or every) DL signal of the one or more (candidate) DL signals is associated with a quality that is not above (and/or is below) the threshold (and/or is associated with an RSRP that is not above (and/or is below) the threshold RSRP). Alternatively and/or additionally, the source cell may determine that each (and/or every) DL signal of the one or more (candidate) DL signals is associated with a quality that is not above (and/or is below) the threshold (and/or is associated with an RSRP that is not above (and/or is below) the threshold RSRP) based upon the message.

Alternatively and/or additionally, the message may indicate that an RACH-less HO is not successful. For example, the message may be used (and/or transmitted to the source cell) to inform the source cell that the RACH-less HO is not successful. Alternatively and/or additionally, the source cell may determine that the RACH-less HO is not successful based upon the message.

Alternatively and/or additionally, the message may indicate that the one or more pre-allocated UL grants are not valid. For example, the message may be used (and/or transmitted to the source cell) to inform the source cell that the one or more pre-allocated UL grants are not valid. Alternatively and/or additionally, the source cell may determine that the one or more pre-allocated UL grants are not valid based upon the message.

Alternatively and/or additionally, when (e.g., prior to, while and/or after) the UE transmits the message to the source cell, the UE may stop (performing operations associated with) the RACH-less HO. For example, responsive to transmitting the message to the source cell, the UE may stop (performing operations associated with) the RACH-less HO. Alternatively and/or additionally, when (e.g., prior to, while and/or after) the UE transmits the message to the source cell, the UE may initiate an RRC connection re-establishment procedure. For example, responsive to transmitting the message to the source cell, the UE may initiate the RRC connection re-establishment procedure. Alternatively and/or additionally, when (e.g., prior to, while and/or after) the UE transmits the message to the source cell, the UE may trigger and/or generate one or more new beam measurement results and/or a new measurement report and/or the UE may transmit the one or more new beam measurement results and/or the new measurement report to the source cell. For example, responsive to transmitting the message to the source cell, the UE may trigger and/or generate the one or more new beam measurement results and/or the new measurement report and/or the UE may transmit the one or more new beam measurement results and/or the new measurement report to the source cell.

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single beam (e.g., an SSB resource and/or a CSI-RS resource) (and/or a single DL signal). Alternatively and/or additionally, a quality associated with the single beam (and/or the single DL signal) may not be above (and/or may be below) a threshold and/or an RSRP associated with the single beam (and/or the single DL signal) may not be above (and/or may be below) a threshold RSRP. Alternatively and/or additionally, responsive to the quality associated with the single beam (and/or the single DL signal) not being above the threshold and/or responsive to the RSRP associated with the single beam (and/or the single DL signal) not being above the threshold RSRP, the UE may transmit the message to the source cell.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may transmit the message to the source cell.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may transmit the message to the source cell.

In some examples, if the UE transmits the message to the source cell (and/or responsive to the UE transmitting the message to the source cell), the one or more (periodically) pre-allocated UL grants may be discarded (by the UE). Alternatively and/or additionally, if the UE transmits the message to the source cell (and/or responsive to the UE transmitting the message to the source cell), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE transmits the message to the source cell (and/or responsive to the UE transmitting the message to the source cell), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIB s, etc. Alternatively and/or additionally, the one or more parameters may not be discarded.

In a fifth embodiment, a beam failure recovery procedure (also known as a BFR procedure) may be initiated in a target cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may initiate the beam failure recovery procedure and/or a random access procedure for beam failure recovery in the target cell. For example, the UE may initiate the beam failure recovery procedure and/or the random access procedure for beam failure recovery in the target cell responsive to the one or more DL signals not comprising a DL signal (and/or any DL signals) associated with a quality that is above a threshold (and/or associated with an RSRP that is above a threshold RSRP).

Alternatively and/or additionally, the network may (need to) provide the UE with one or more RACH resources for beam failure recovery when configuring the UE to perform an RACH-less HO. Alternatively and/or additionally, the one or more RACH resources for beam failure recovery may be configured in RACH-ConfigDedicated and/or BeamFailureRecoveryConfig (e.g., RACH-ConfigDedicated and/or BeamFailureRecoveryConfig may be indicative of the one or more RACH resources for beam failure recovery).

Alternatively and/or additionally, the UE may initiate a contention free random access procedure for beam failure recovery in the target cell when (e.g., prior to, while and/or after) the UE is not able to perform the RACH-less HO. For example, the beam failure recovery procedure and/or the random access procedure for beam failure recovery in the target cell may comprise the contention free random access procedure for beam failure recovery in the target cell. Alternatively and/or additionally, the UE may initiate the contention free random access procedure for beam failure recovery in the target cell when (e.g., prior to, while and/or after) the UE doesn't select a DL signal (and/or any DL signal) from the one or more DL signals to derive a beam (because the one or more DL signals do comprise a DL signal (and/or any DL signals) associated with a quality that is above a threshold (and/or associated with an RSRP that is above a threshold RSRP)). Alternatively and/or additionally, the UE may initiate the contention free random access procedure for beam failure recovery in the target cell responsive to the UE not being able to select a DL signal (and/or any DL signal) from the one or more DL signals to derive a beam (because the one or more DL signals do comprise a DL signal (and/or any DL signals) associated with a quality that is above a threshold (and/or associated with an RSRP that is above a threshold RSRP)). Alternatively and/or additionally, when (e.g., prior to, while and/or after) and/or if the UE is not able to perform the contention free random access procedure for beam failure recovery in the target cell, the UE may initiate a contention based random access procedure for beam failure recovery in the target cell. For example, the beam failure recovery procedure and/or the random access procedure for beam failure recovery in the target cell may comprise the contention based random access procedure for beam failure recovery in the target cell.

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single DL signal (e.g., an SSB resource and/or a CSI-RS resource). Alternatively and/or additionally, a quality associated with the single DL signal may not be above (and/or may be below) a threshold and/or an RSRP associated with the single DL signal may not be above (and/or may be below) a threshold RSRP. Alternatively and/or additionally, responsive to the quality associated with the single DL signal not being above the threshold and/or responsive to the RSRP associated with the single DL signal not being above the threshold RSRP, the UE may initiate the beam failure recovery procedure and/or the random access procedure for beam failure recovery in the target cell.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the beam failure recovery procedure and/or the random access procedure for beam failure recovery in the target cell.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the beam failure recovery procedure and/or the random access procedure for beam failure recovery in the target cell.

In some examples, if the UE initiates the beam failure recovery procedure and/or the random access procedure for beam failure recovery in the target cell (and/or responsive to the UE initiating the beam failure recovery procedure and/or the random access procedure for beam failure recovery in the target cell), the one or more (periodically) pre-allocated UL grants may be discarded (by the UE). Alternatively and/or additionally, if the UE initiates the beam failure recovery procedure and/or the random access procedure for beam failure recovery in the target cell (and/or responsive to the UE initiating the beam failure recovery procedure and/or the random access procedure for beam failure recovery in the target cell), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the beam failure recovery procedure and/or the random access procedure for beam failure recovery in the target cell (and/or responsive to the UE initiating the beam failure recovery procedure and/or the random access procedure for beam failure recovery in the target cell), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In a sixth embodiment, an RRC connection re-establishment procedure may be initiated in a source cell. In some examples, a UE may receive one or more pre-allocated UL grants (e.g., the UE may receive the one or more pre-allocated UL grant within an RRC reconfiguration message, such as the second RRC reconfiguration message 1414 in FIG. 14, for example). Alternatively and/or additionally, when (e.g., prior to, while and/or after) the UE receives the one or more pre-allocated UL grants associated with one or more DL signals, the UE may not select a DL signal (and/or any DL signal) from the one or more DL signals to derive a beam. For example, the UE may not select a DL signal (and/or any DL signal) from the one or more DL signals to derive a beam because the one or more DL signals may not comprise a DL signal (and/or any DL signals) associated with a quality that is above a threshold (and/or associated with an RSRP that is above a threshold RSRP). Alternatively and/or additionally, each DL signal of the one or more DL signals may be associated with a quality that is below the threshold (and/or associated with an RSRP that is below the threshold RSRP).

In some examples, the one or more pre-allocated UL grants may correspond to (and/or may be) one or more periodic resources. For example, a pre-allocated UL grant may correspond to a plurality of subframes, wherein subframes of the plurality of subframes may be separated by an interval (e.g., the pre-allocated UL grant may occur in the plurality of subframes, sequentially).

In some examples, the UE may initiate the RRC connection re-establishment procedure. For example, the UE may initiate the RRC connection re-establishment procedure responsive to the one or more DL signals not comprising a DL signal (and/or any DL signals) associated with a quality that is above a threshold (and/or associated with an RSRP that is above a threshold RSRP). Alternatively and/or additionally, the UE may initiate the RRC connection re-establishment procedure responsive to an RACH-less HO procedure (and/or a different type of HO procedure) failing and/or being performed unsuccessfully. Alternatively and/or additionally, the UE may initiate the RRC connection re-establishment procedure responsive to an RRC reconfiguration failing and/or being performed unsuccessfully.

Alternatively and/or additionally, the UE may transmit an RRC re-establishment request in (and/or to) the source cell. For example, initiating and/or performing the RRC connection re-establishment procedure may comprise transmitting the RRC re-establishment request in (and/or to) the source cell.

In an example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with merely a single DL signal (e.g., an SSB resource and/or a CSI-RS resource). Alternatively and/or additionally, a quality associated with the single DL signal may not be above (and/or may be below) a threshold and/or an RSRP associated with the single DL signal may not be above (and/or may be below) a threshold RSRP. Alternatively and/or additionally, responsive to the quality associated with the single DL signal not being above the threshold and/or responsive to the RSRP associated with the single DL signal not being above the threshold RSRP, the UE may initiate the RRC connection re-establishment procedure in the source cell.

In another example, the UE may receive merely a single (periodically) pre-allocated UL grant (e.g., the one or more pre-allocated UL grants may comprise merely the single pre-allocated UL grant). Alternatively and/or additionally, the single pre-allocated UL grant may be associated with a plurality of DL signals (e.g., a plurality of SSB resources and/or a plurality of CSI-RS resources). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the RRC connection re-establishment procedure in the source cell.

In another example, the UE may receive a plurality of (periodically) pre-allocated UL grants (e.g., the one or more pre-allocated UL grants may comprise the plurality of pre-allocated UL grants). Alternatively and/or additionally, the plurality of pre-allocated UL grants may be associated with a plurality of DL signals (e.g., a plurality of SSB resources and/or a plurality of CSI-RS resources). For example, each pre-allocated UL grant of the plurality of pre-allocated UL grants may be associated with a single DL signal (of the plurality of DL signals) (and/or multiple DL signals of the plurality of DL signals). Alternatively and/or additionally, each DL signal of the plurality of DL signals may be associated with a quality that is not above (and/or is below) a threshold and/or each DL signal of the plurality of DL signals may be associated with an RSRP that is not above (and/or is below) a threshold RSRP. For example, it may be determined that each DL signal of the plurality of DL signals is associated with a quality that is not above (and/or is below) the threshold and/or that each DL signal of the plurality of DL signals is associated with an RSRP that is not above (and/or is below) the threshold RSRP by checking (and/or analyzing) the plurality of DL signals to determine whether the plurality of DL signals comprises a suitable DL signal associated with a quality above the threshold and/or an RSRP above the threshold RSRP. Alternatively and/or additionally, responsive to each DL signal of the plurality of DL signals being associated with a quality that is not above (and/or is below) the threshold and/or responsive to each DL signal of the plurality of DL signals being associated with an RSRP that is not above (and/or is below) the threshold RSRP, the UE may initiate the RRC connection re-establishment procedure in the source cell.

In some examples, if the UE initiates the RRC connection re-establishment procedure in the source cell (and/or responsive to the UE initiating the RRC connection re-establishment procedure in the source cell), the one or more (periodically) pre-allocated UL grants may be discarded (by the UE). Alternatively and/or additionally, if the UE initiates the RRC connection re-establishment procedure in the source cell (and/or responsive to the UE initiating the RRC connection re-establishment procedure in the source cell), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the RRC connection re-establishment procedure in the source cell (and/or responsive to the UE initiating the RRC connection re-establishment procedure in the source cell), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In some examples, each of the first embodiment, the second embodiment, the third embodiment, the fourth embodiment, the fifth embodiment and the sixth embodiment, may be implemented independently and/or separately. Alternatively and/or additionally, a combination of one or more of the first embodiment, the second embodiment, the third embodiment, the fourth embodiment, the fifth embodiment and/or the sixth embodiment may be implemented.

In some examples, when (e.g., prior to, while and/or after) a target cell transmits an HO ACK (e.g., such as the HO ACK 1410 illustrated in FIG. 14, for example), the target cell may determine whether an RACH-less HO for a UE can be performed successfully and/or whether to configure the RACH-less HO for the UE. Alternatively and/or additionally, the target cell may determine whether the RACH-less HO for the UE can be performed successfully and/or whether to configure the RACH-less HO for the UE based upon one or more beam measurement results comprised within a measurement report (e.g., such as the measurement report 1402 illustrated in FIG. 14, for example). For example, the one or more beam measurement results may be analyzed to determine whether one or more qualified beams (e.g., one or more beams associated with one or more qualities higher than a threshold and/or one or more RSRPs higher than a threshold RSRP) are available. In some examples, if it is determined that there are not (any available) qualified beams (and/or that there is less than a threshold quantity of available qualified beams) indicated by the one or more beam measurement results, the target cell may not configure the RACH-less HO for the UE. Alternatively and/or additionally, if it is determined that one or more values associated with the one or more beam measurement results are less than (and/or greater than) one or more threshold values, the target cell may not configure the RACH-less HO for the UE. Alternatively and/or additionally, the target cell may (merely) configure dedicated RACH resource for the UE (e.g., via an RRC reconfiguration message).

Alternatively and/or additionally, the target cell may determine whether to configure one or more pre-allocated UL grants for the UE and/or whether to provide the one or more pre-allocated UL grants to the UE based upon the one or more beam measurement results comprised within the measurement report. For example, if it is determined that there aren't any (available) qualified beams (and/or that there is less than a threshold quantity of qualified beams) indicated by the one or more beam measurement results, the target cell may not configure the one or more pre-allocated UL grants for the UE and/or may not provide the one or more pre-allocated UL grants to the UE. Alternatively and/or additionally, if it is determined that one or more values associated with the one or more beam measurement results are less than (and/or greater than) one or more threshold values, the target cell may not configure the one or more pre-allocated UL grants for the UE and/or may not provide the one or more pre-allocated UL grants to the UE.

In some examples, a UE may not be provided with (and/or configured with) one or more pre-allocated UL grants during an RACH-less HO procedure. For example, an RRC reconfiguration message (e.g., such as the second RRC reconfiguration message 1414 illustrated in FIG. 14, for example) may not comprise the one or more pre-allocated UL grants and/or the RRC reconfiguration message may not be indicative of the one or more pre-allocated UL grants. In some examples, if the RRC reconfiguration message does not comprise the one or more pre-allocated UL grants and/or is not indicative of the one or more pre-allocated UL grants, the UE may monitor a PDCCH of the target cell via one or more beams associated with one or more DL signals. For example, the RRC reconfiguration message may be indicative of the one or more beams and/or the one or more DL signals.

In an example in association with the system 1400 illustrated by FIG. 14, the second RRC reconfiguration message 1414 (e.g., the HO command) may not comprise the one or more pre-allocated UL grants and/or the second RRC reconfiguration message 1414 may not be indicative of the one or more pre-allocated UL grants. For example, the second RRC reconfiguration message 1414 of one or more beams and/or one or more DL signals for PDCCH monitoring (e.g., the one or more operations 1416 may comprise monitoring a PDCCH using the one or more beams associated with the one or more DL signals).

Figure 17:
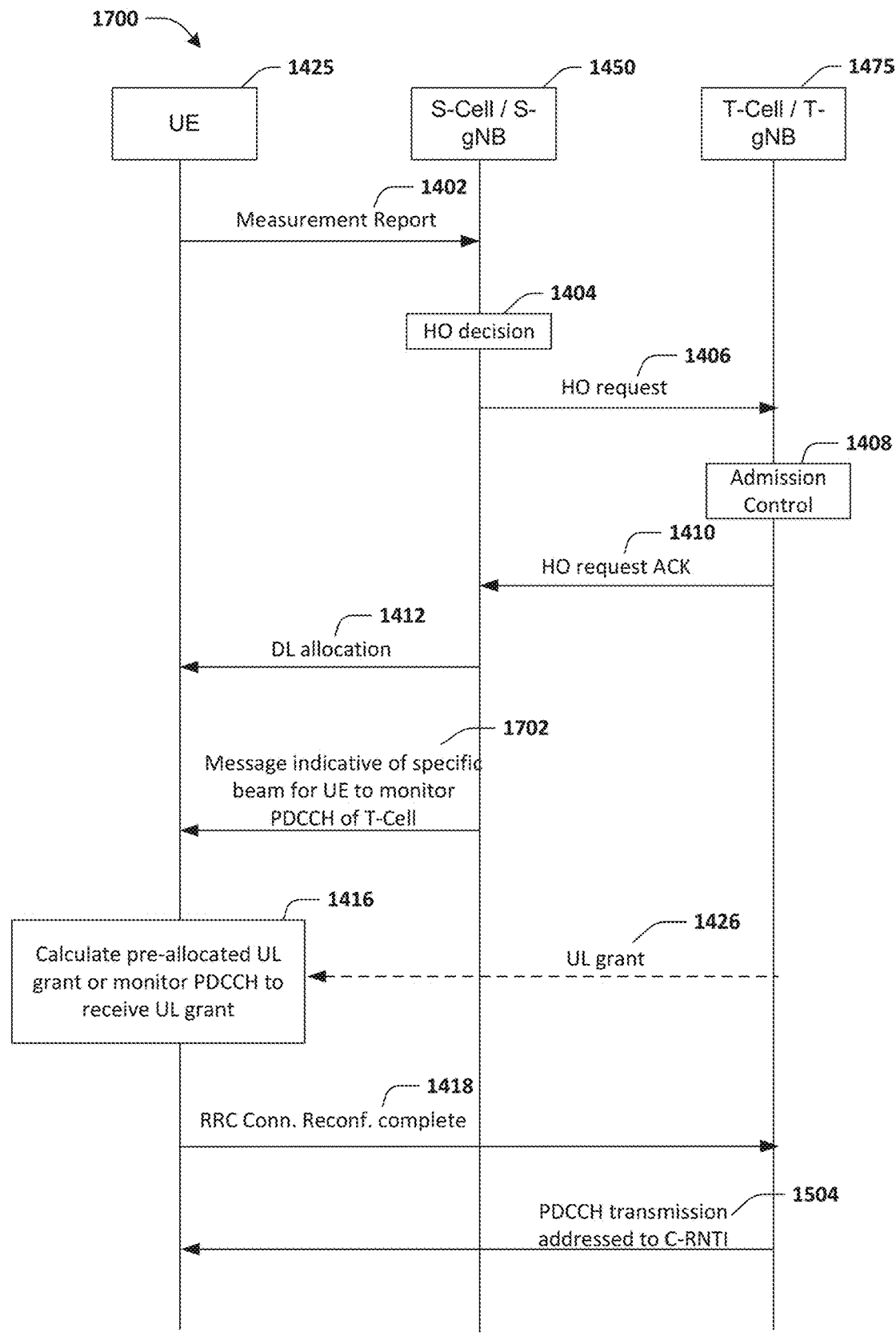
FIG. 17 illustrates examples of a system for performing an RACH-less handover procedure.

FIG. 17 illustrates examples of a system 1700 for performing the RACH-less HO procedure using the UE 1425, the S-Cell 1450 and/or the T-Cell 1475. For example, the UE 1425 may receive a message 1702 (e.g., the message 1702 may be an RRC reconfiguration message). The message 1702 may be the same as the second RRC reconfiguration message 1414 (e.g., the HO command). Alternatively and/or additionally, the message 1702 may be different than the second RRC reconfiguration message 1414. Alternatively and/or additionally, the message 1702 may not comprise the one or more pre-allocated UL grants and/or may not be indicative of the one or more pre-allocated UL grants. In some examples, the message 1702 may be indicative of one or more beams and/or one or more DL signals for PDCCH monitoring. For example, the one or more operations 1416 may comprise monitoring a PDCCH of the T-Cell 1475 via the one or more beams associated with the one or more DL signals (e.g., the one or more beams may be derived and/or determined based upon the one or more DL signals).

However, PDCCH monitoring associated with the one or more operations 1416 may not be successful. For example, the UE 2025 may monitor the PDCCH of the T-Cell 1475 for a period of time that may exceed a threshold duration of time (e.g., based upon a timer based control), and/or the PDCCH monitoring may not be successful within the period of time. Accordingly, the RRC reconfiguration complete message 1418 may not be successfully transmitted to the T-Cell 1475.

Alternatively and/or additionally, the one or more beams may be associated with one or more qualities, wherein each quality of the one or more qualities may not be above a threshold. Alternatively and/or additionally, the one or more beams may be associated with one or more RSRPs, wherein each RSRP of the one or more RSRPs may not be above a threshold RSRP. Accordingly, the RRC reconfiguration complete message 1418 may not be successfully transmitted to the T-Cell 1475.

Various techniques are presented in the present disclosure for situations where the UE 2025 may monitor the PDCCH of the T-Cell 1475, unsuccessfully, for a period of time exceeding the threshold duration of time and/or where the one or more beams for PDCCH monitoring are associated with one or more qualities that are not above the threshold.

In a seventh embodiment, a contention based random access procedure may be initiated in a target cell by a UE. For example, the UE may initiate the contention based random access procedure responsive to PDCCH monitoring (of a PDCCH) not being successful within a period of time. Alternatively and/or additionally, the UE may initiate the contention based random access procedure responsive to one or more beams indicated by an RRC reconfiguration message (and/or associated with one or more DL signals indicated by the RRC reconfiguration message) not comprising a beam (and/or any beam) associated with a quality that is above a threshold (and/or associated with an RSRP that is above a threshold RSRP). The UE may select a suitable beam associated with one or more common RACH resources during the contention based random access procedure (e.g., the one or more common RACH resources may be configured in RACH-ConfigCommon and/or RACH-ConfigCommon may be indicative of the one or more common RACH resources).

In an example, responsive to (and/or prior to) starting the PDCCH monitoring of the PDCCH using the one or more beams, the UE may start a timer. In some examples, if the PDCCH monitoring is performed unsuccessfully for a threshold duration of time (and/or if the timer expires and the PDCCH monitoring is unsuccessful), the UE may initiate the contention based random access procedure. In some examples, when (e.g., prior to, while and/or after) the UE initiates the contention based random access procedure, the UE may stop and/or reset the timer.

Alternatively and/or additionally, if the UE initiates the contention based random access procedure (and/or responsive to the UE initiating the contention based random access procedure), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the contention based random access procedure (and/or responsive to the UE initiating the contention based random access procedure), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In an eighth embodiment, a contention free random access procedure may be initiated in the target cell. For example, the UE may initiate the contention free random access procedure responsive to the PDCCH monitoring not being successful within the period of time. Alternatively and/or additionally, the UE may initiate the contention free random access procedure responsive to the one or more beams not comprising a beam (and/or any beam) associated with a quality that is above the threshold (and/or associated with an RSRP that is above the threshold RSRP). The UE may select a suitable DL signal associated with one or more dedicated RACH resources during the contention free random access procedure (e.g., the one or more dedicated RACH resources may be configured in the RRC configuration message (and/or a different RRC configuration message) and/or the RRC configuration message (and/or the different RRC configuration message) may be indicative of the one or more dedicated RACH resources). Alternatively and/or additionally, the one or more dedicated RACH resources may be configured in RACH-ConfigDedicated (e.g., RACH-ConfigDedicated may be indicative of the one or more dedicated RACH resources).

In an example, responsive to (and/or prior to) starting the PDCCH monitoring of the PDCCH using the one or more beams, the UE may start a timer. In some examples, if the PDCCH monitoring is performed unsuccessfully for a threshold duration of time (and/or if the timer expires and the PDCCH monitoring is unsuccessful), the UE may initiate the contention free random access procedure. In some examples, when (e.g., prior to, while and/or after) the UE initiates the contention free random access procedure, the UE may stop and/or reset the timer.

Alternatively and/or additionally, if the UE initiates the contention free random access procedure (and/or responsive to the UE initiating the contention free random access procedure), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the contention free random access procedure (and/or responsive to the UE initiating the contention free random access procedure), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIB s, etc. Alternatively and/or additionally, the one or more parameters may not be discarded.

In a ninth embodiment, a message may be transmitted to a source cell. For example, the UE may transmit the message to the source cell responsive to the PDCCH monitoring not being successful within the period of time. Alternatively and/or additionally, the UE may transmit the message to the source cell responsive to the one or more beams not comprising a beam (and/or any beam) associated with a quality that is above a threshold (and/or associated with an RSRP that is above a threshold RSRP). The message may be indicative of the one or more (candidate) beams not comprising a beam (and/or any beams) associated with a quality that is above the threshold (and/or associated with an RSRP that is above the threshold RSRP) (e.g., the message may be indicative of the one or more beams not comprising a qualified beam). Alternatively and/or additionally, the message may indicate that each (and/or every) beam of the one or more (candidate) beams is associated with a quality that is not above (and/or is below) the threshold (and/or is associated with an RSRP that is not above (and/or is below) the threshold RSRP). For example, the message may be used (and/or transmitted to the source cell) to inform the source cell that each (and/or every) beam of the one or more (candidate) beams is associated with a quality that is not above (and/or is below) the threshold (and/or is associated with an RSRP that is not above (and/or is below) the threshold RSRP). Alternatively and/or additionally, the source cell may determine that each (and/or every) beam of the one or more (candidate) beams is associated with a quality that is not above (and/or is below) the threshold (and/or is associated with an RSRP that is not above (and/or is below) the threshold RSRP) based upon the message.

Alternatively and/or additionally, the message may indicate that the RACH-less HO is not successful. For example, the message may be used (and/or transmitted to the source cell) to inform the source cell that the RACH-less HO is not successful. Alternatively and/or additionally, the source cell may determine that the RACH-less HO is not successful based upon the message.

Alternatively and/or additionally, the message may indicate that the one or more (candidate) beams are not valid (and/or that the one or more (candidate) beams are not qualified). For example, the message may be used (and/or transmitted to the source cell) to inform the source cell that the one or more (candidate) beams are not valid (and/or that the one or more (candidate) beams are not qualified). Alternatively and/or additionally, the source cell may determine that the one or more (candidate) beams are not valid (and/or that the one or more (candidate) beams are not qualified) based upon the message.

Alternatively and/or additionally, when (e.g., prior to, while and/or after) the UE transmits the message to the source cell, the UE may stop (performing operations associated with) the RACH-less HO. For example, responsive to transmitting the message to the source cell, the UE may stop (performing operations associated with) the RACH-less HO. Alternatively and/or additionally, when (e.g., prior to, while and/or after) the UE transmits the message to the source cell, the UE may initiate an RRC connection re-establishment procedure. For example, responsive to transmitting the message to the source cell, the UE may initiate the RRC connection re-establishment procedure. Alternatively and/or additionally, when (e.g., prior to, while and/or after) the UE transmits the message to the source cell, the UE may trigger and/or generate one or more new beam measurement results and/or a new measurement report and/or the UE may transmit the one or more new beam measurement results and/or the new measurement report to the source cell. For example, responsive to transmitting the message to the source cell, the UE may trigger and/or generate the one or more new beam measurement results and/or the new measurement report and/or the UE may transmit the one or more new beam measurement results and/or the new measurement report to the source cell.

In an example, responsive to (and/or prior to) starting the PDCCH monitoring of the PDCCH using the one or more beams, the UE may start a timer. In some examples, if the PDCCH monitoring is performed unsuccessfully for a threshold duration of time (and/or if the timer expires and the PDCCH monitoring is unsuccessful), the UE may transmit the message to the source cell. In some examples, when (e.g., prior to, while and/or after) the UE transmits the message to the source cell, the UE may stop and/or reset the timer.

Alternatively and/or additionally, if the UE transmits the message to the source cell (and/or responsive to the UE transmitting the message to the source cell), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE transmits the message to the source cell (and/or responsive to the UE transmitting the message to the source cell), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In a tenth embodiment, a beam failure recovery procedure may be initiated in the target cell. Alternatively and/or additionally, the UE may initiate the beam failure recovery procedure and/or a random access procedure for beam failure recovery in the target cell. For example, the UE may initiate the beam failure recovery procedure and/or the random access procedure for beam failure recovery in the target cell responsive to the PDCCH monitoring not being successful within the period of time. Alternatively and/or additionally, the UE may initiate the beam failure recovery procedure and/or the random access procedure for beam failure recovery in the target cell responsive to the one or more beams not comprising a beam (and/or any beam) associated with a quality that is above the threshold (and/or associated with an RSRP that is above the threshold RSRP).

Alternatively and/or additionally, the network may (need to) provide the UE with one or more RACH resources for beam failure recovery when configuring the UE to perform the RACH-less HO. Alternatively and/or additionally, the one or more RACH resources for beam failure recovery may be configured in RACH-ConfigDedicated and/or BeamFailureRecoveryConfig (e.g., RACH-ConfigDedicated and/or BeamFailureRecoveryConfig may be indicative of the one or more RACH resources for beam failure recovery).

Alternatively and/or additionally, the UE may initiate a contention free random access procedure for beam failure recovery in the target cell when (e.g., prior to, while and/or after) the UE is not able to perform the RACH-less HO. For example, the beam failure recovery procedure and/or the random access procedure for beam failure recovery in the target cell may comprise the contention free random access procedure for beam failure recovery in the target cell. Alternatively and/or additionally, the UE may initiate the contention free random access procedure for beam failure recovery in the target cell responsive to the PDCCH monitoring not being successful within the period of time. Alternatively and/or additionally, the UE may initiate the contention free random access procedure for beam failure recovery in the target cell responsive to the one or more beams not comprising a beam (and/or any beam) associated with a quality that is above the threshold (and/or associated with an RSRP that is above the threshold RSRP). Alternatively and/or additionally, when (e.g., prior to, while and/or after) and/or if the UE is not able to perform the contention free random access procedure for beam failure recovery in the target cell, the UE may initiate a contention based random access procedure for beam failure recovery in the target cell. For example, the beam failure recovery procedure and/or the random access procedure for beam failure recovery in the target cell may comprise the contention based random access procedure for beam failure recovery in the target cell.

In an example, responsive to (and/or prior to) starting the PDCCH monitoring of the PDCCH using the one or more beams, the UE may start a timer. In some examples, if the PDCCH monitoring is performed unsuccessfully for a threshold duration of time (and/or if the timer expires and the PDCCH monitoring is unsuccessful), the UE may initiate the beam failure recovery procedure and/or the random access procedure for beam failure recovery. In some examples, when (e.g., prior to, while and/or after) the UE initiates the beam failure recovery procedure and/or the random access procedure for beam failure recovery, the UE may stop and/or reset the timer.

Alternatively and/or additionally, if the UE initiates the beam failure recovery procedure and/or the random access procedure for beam failure recovery (and/or responsive to the UE initiating the beam failure recovery procedure and/or the random access procedure for beam failure recovery), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the beam failure recovery procedure and/or the random access procedure for beam failure recovery (and/or responsive to the UE initiating the beam failure recovery procedure and/or the random access procedure for beam failure recovery), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNBs, security algorithm identifiers, a dedicated RACH preamble, one or more target eNB SIB s, etc. Alternatively and/or additionally, the one or more parameters may not be discarded.

In an eleventh embodiment, an RRC connection re-establishment procedure may be initiated in the source cell. For example, the UE may initiate the RRC connection re-establishment procedure responsive to the PDCCH monitoring not being successful within the period of time. Alternatively and/or additionally, the UE may initiate the RRC connection re-establishment procedure responsive to the one or more beams not comprising a beam (and/or any beam) associated with a quality that is above the threshold (and/or associated with an RSRP that is above the threshold RSRP).

Alternatively and/or additionally, the UE may initiate the RRC connection re-establishment procedure responsive to the RACH-less HO procedure (and/or a different type of HO procedure) failing and/or being performed unsuccessfully. Alternatively and/or additionally, the UE may initiate the RRC connection re-establishment procedure responsive to an RRC reconfiguration failing and/or being performed unsuccessfully.

Alternatively and/or additionally, the UE may transmit an RRC re-establishment request in (and/or to) the source cell. For example, initiating and/or performing the RRC connection re-establishment procedure may comprise transmitting the RRC re-establishment request in (and/or to) the source cell.

In an example, responsive to (and/or prior to) starting the PDCCH monitoring of the PDCCH using the one or more beams, the UE may start a timer. In some examples, if the PDCCH monitoring is performed unsuccessfully for a threshold duration of time (and/or if the timer expires and the PDCCH monitoring is unsuccessful), the UE may initiate the RRC connection re-establishment procedure. In some examples, when (e.g., prior to, while and/or after) the UE initiates the RRC connection re-establishment procedure, the UE may stop and/or reset the timer.

Alternatively and/or additionally, if the UE initiates the RRC connection re-establishment procedure (and/or responsive to the UE initiating the RRC connection re-establishment procedure), a TA associated with the RRC reconfiguration message may be discarded (by the UE). For example, the RRC reconfiguration message may be indicative of the TA (e.g., the RRC reconfiguration may comprise an indication of the TA). Alternatively and/or additionally, if the UE initiates the RRC connection re-establishment procedure (and/or responsive to the UE initiating the RRC connection re-establishment procedure), one or more parameters may be discarded (by the UE). For example, the one or more parameters may be one or more HO parameters associated with the RRC reconfiguration message (e.g., the RRC reconfiguration may be indicative of the one or more parameters). For example, the one or more parameters may comprise one or more of a new C-RNTI, one or more target gNB security algorithm identifiers, a dedicated RACH preamble, one or more target gNB SIBs, etc. Alternatively and/or additionally, the one or more parameters may not be discarded.

In some examples, each of the seventh embodiment, the eighth embodiment, the ninth embodiment, the tenth embodiment and the eleventh embodiment, may be implemented independently and/or separately. Alternatively and/or additionally, a combination of one or more of the seventh embodiment, the eighth embodiment, the ninth embodiment, the tenth embodiment and/or the eleventh embodiment may be implemented. Alternatively and/or additionally, a combination of one or more of the first embodiment, the second embodiment, the third embodiment, the fourth embodiment, the fifth embodiment, the sixth embodiment, the seventh embodiment, the eighth embodiment, the ninth embodiment, the tenth embodiment and/or the eleventh embodiment may be implemented.

In some examples (e.g. in association with the seventh embodiment, the eighth embodiment, the ninth embodiment, the tenth embodiment and/or the eleventh embodiment), during an RACH-less HO, a UE may not be provided with (and/or may not be configured with) one or more pre-allocated UL grants (e.g., the UE may receive an RRC reconfiguration message, such as the second RRC reconfiguration message 1414 in FIG. 14, that does not comprise the one or more pre-allocated UL grants and/or is not indicative of the one or more pre-allocated UL grants). Alternatively and/or additionally, the UE may be provided with (and/or configured with) one or more DL signals and/or one or more beams (e.g., the RRC reconfiguration message may be indicative of the one or more DL signals and/or the one or more beams). The one or more beams may be derived from (and/or determined based upon) the one or more DL signals. In some examples, the UE may monitor a PDCCH of the target cell, using the one or more beams, for a period of time that may exceed a threshold duration of time (e.g., based upon a timer based control), and/or PDCCH monitoring may not be successful within the period of time. However, the one or more beams may be associated with one or more qualities (and/or one or one or more RSRPs) that are not above a threshold (and/or a threshold RSRP). Alternatively and/or additionally, each beam of the one or more beams may be associated with a quality that is not above the threshold (and/or associated with an RSRP that is not above the threshold RSRP).

In some examples, a measurement report (e.g., such as the measurement report 1402 illustrated in FIG. 14, for example) and/or one or more beam measurement results may be transmitted to a network (and/or a target cell) before an HO decision (e.g., such as the HO decision 1404 illustrated in FIG. 14, for example). In some examples, the one or more beam measurement results may be comprised within the measurement report. Alternatively and/or additionally, the one or more beam measurement results and/or the measurement report may comprise measurement information. For example, the measurement information may comprise information (e.g., quality information, RSRP information, etc.) associated with one or more beams. Alternatively and/or additionally, the measurement information may comprise information (e.g., quality information, RSRP information, etc.) associated with one or more DL signals, associated with the one or more beams.

In some examples, one or more conditions of the one or more beams may be verified when (e.g., prior to, while and/or after) an RACH-less HO (and/or a different type of HO) is completed. Alternatively and/or additionally, if the one or more beams (associated with the one or more DL signals), included in and/or indicated by the measurement report and/or the one or more beam measurement results, do not comprise a qualified beam (and/or any qualified beam) associated with a quality that is above a threshold (and/or associated with an RSRP that is above a threshold RSRP), one or more signals (for data transmission and/or data reception) may fail to be (successfully) transmitted and/or received. Alternatively and/or additionally, if the one or more beams (associated with the one or more DL signals) do not comprise a beam (and/or any beam) associated with a quality that is above a second threshold that is greater than the threshold (and/or associated with an RSRP that is above a second threshold RSRP that is greater than the threshold RSRP), one or more signals (for data transmission and/or data reception) may fail to be (successfully) transmitted and/or received.

In some examples, in order to maintain sufficient beam quality for data transmission and/or data reception and/or in order to use one or more qualified beams for data transmission and/or data reception, the UE may trigger and/or generate one or more new (e.g., latest) beam measurement results and/or a new (e.g., latest) measurement report. For example, the one or more new beam measurement results and/or the new measurement report may be transmitted to the network (and/or the target cell) (e.g., the network may be updated with the one or more new beam measurement results and/or the new measurement report).

In some examples, the UE may trigger and/or generate the one or more new beam measurement results and/or the new measurement report and/or the UE may transmit the one or more new beam measurement results and/or the new measurement report to the network (and/or the target cell) while performing the RACH-less HO. In some examples, the UE may trigger and/or generate the one or more new beam measurement results and/or the new measurement report and/or the UE may transmit the one or more new beam measurement results and/or the new measurement report to the network (and/or the target cell) when (e.g., prior to, while and/or after) receiving an RRC reconfiguration message (e.g., such as the second RRC reconfiguration message 1414 in FIG. 14, for example).

Alternatively and/or additionally, the one or more new beam measurement results and/or the new measurement report may be included in an RRC reconfiguration complete message (e.g., an HO complete message) (e.g., such as the RRC reconfiguration complete message 1418 illustrated in FIG. 14, for example), wherein the RRC reconfiguration complete message may be transmitted to the network (and/or the target cell).

Alternatively and/or additionally, the one or more new beam measurement results and/or the new measurement report may be included in a signal for transmitting the RRC reconfiguration complete message, wherein the signal may be transmitted to the network (and/or the target cell). Alternatively and/or additionally, the one or more new beam measurement results and/or the new measurement report may be transmitted (to the network (and/or the target cell))

prior to transmitting the RRC reconfiguration complete message (to the network (and/or the target cell)). Alternatively and/or additionally, the signal may be transmitted using one or more pre-allocated UL grants (e.g., the RRC reconfiguration message may be indicative of the one or more pre-allocated UL grants). Alternatively and/or additionally, the signal may be transmitted via one or more UL grants received via PDCCH monitoring during the RACH-less HO (e.g., such as while performing the one or more operations 1416, as illustrated in FIG. 14, for example).

Alternatively and/or additionally, the network may pre-allocate a UL grant for transmitting the new measurement report and/or the one or more new beam measurement results. Alternatively and/or additionally, the UL grant may not be the same as the one or more UL grants and/or the one or more pre-allocated UL grants for transmitting the RRC reconfiguration complete message.

Alternatively and/or additionally, the new measurement report and/or the one or more new beam measurement results may be transmitted to the target cell. Alternatively and/or additionally, the new measurement report may comprise beam information (e.g., one or more beam identifiers, one or more DL signal identifiers, one or more SSB identifiers, one or more CSI-RS identifiers, a TCI state indication (for PDCCH reception for a CORESET of the target cell), a candidate list of beams (e.g., a list of TCI-StateID fields, such as tci-StatesPDCCH, etc.)).

Alternatively and/or additionally, a beam (as used herein) may refer to and/or may be associated with SSB resources and/or CSI-RS resources. Alternatively and/or additionally, a beam (as used herein) may refer to and/or may be a DL beam and/or a UL beam. Alternatively and/or additionally, a beam (as used herein) may refer to and/or may be a TX beam and/or an RX beam. Alternatively and/or additionally, a beam (as used herein) may refer to and/or may be a network beam (e.g., NW beam) and/or a UE beam.

Alternatively and/or additionally, a source cell (as used herein) may be replaced with a source gNB. For example, one or more techniques presented herein that are described as applying to a source cell may (also) be applied to a source gNB.

Alternatively and/or additionally, a target cell (as used herein) may be replaced with a target gNB. For example, one or more techniques presented herein that are described as applying to a target cell may (also) be applied to a target gNB.

Alternatively and/or additionally, a source cell (as used herein) may be replaced with a source eNB. For example, one or more techniques presented herein that are described as applying to a source cell may (also) be applied to a source eNB.

Alternatively and/or additionally, a target cell (as used herein) may be replaced with a target eNB. For example, one or more techniques presented herein that are described as applying to a target cell may (also) be applied to a target eNB.

Alternatively and/or additionally, a qualified beam may be a beam where a quality of the beam (e.g., SS-RSRP and/or CSI-RSRP) is above a threshold (e.g., rsrp-ThresholdSSB and/or csirs-Threshold). Alternatively and/or additionally, the qualified beam may be selected using a MAC layer and/or a PHY layer.

Alternatively and/or additionally, a qualified DL signal may be a DL signal where a quality of the DL signal (e.g., SS-RSRP and/or CSI-RSRP) is above a threshold (e.g., rsrp-ThresholdSSB and/or csirs-Threshold). Alternatively and/or additionally, the qualified DL signal may be selected using a MAC layer and/or a PHY layer.

Figure 18:
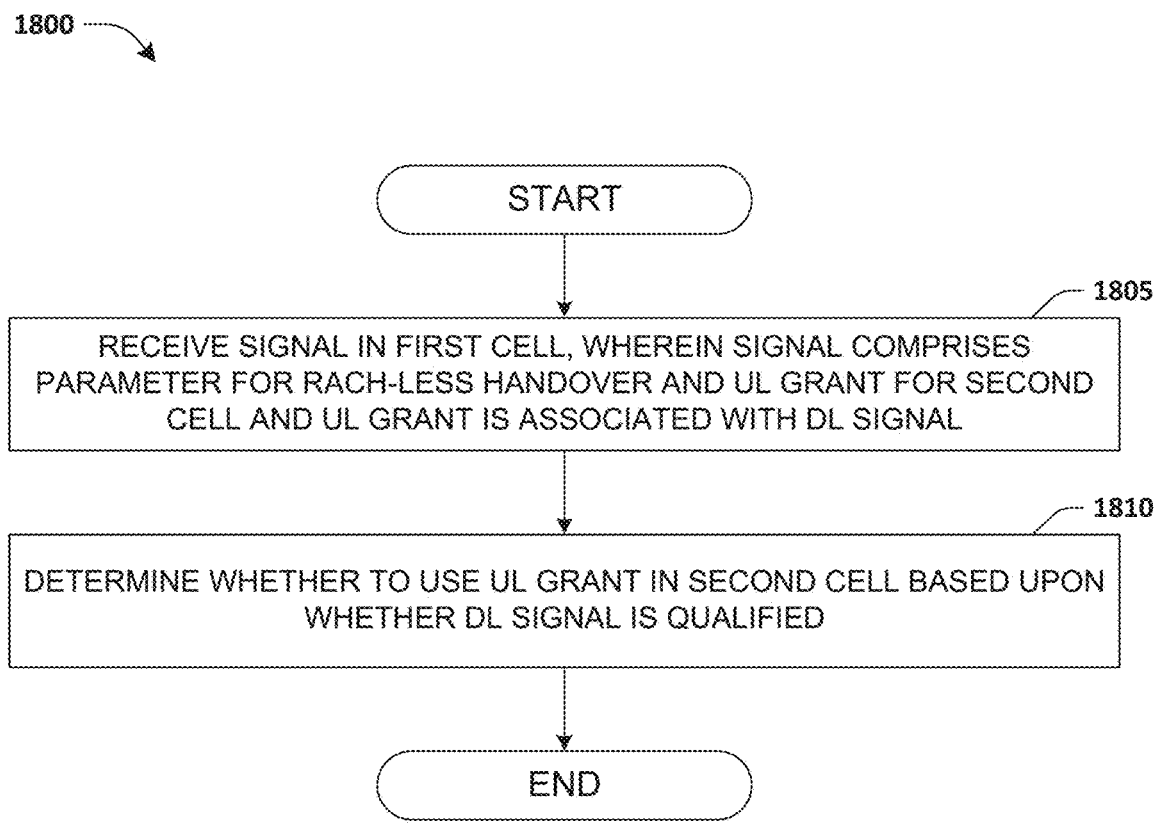
FIG. 18 is a flow chart according to one exemplary embodiment.

FIG. 18 is a flow chart 1800 according to one exemplary embodiment from the perspective of a UE. In step 1805, a signal may be received in a first cell. The signal may comprise a parameter for RACH-less handover and/or a UL grant for a second cell. The UL grant may be associated with a DL signal. In step 1810, it may be determined whether to use the UL grant in the second cell based upon whether the DL signal is qualified.

In the context of the embodiment illustrated in FIG. 18 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Figure 19:
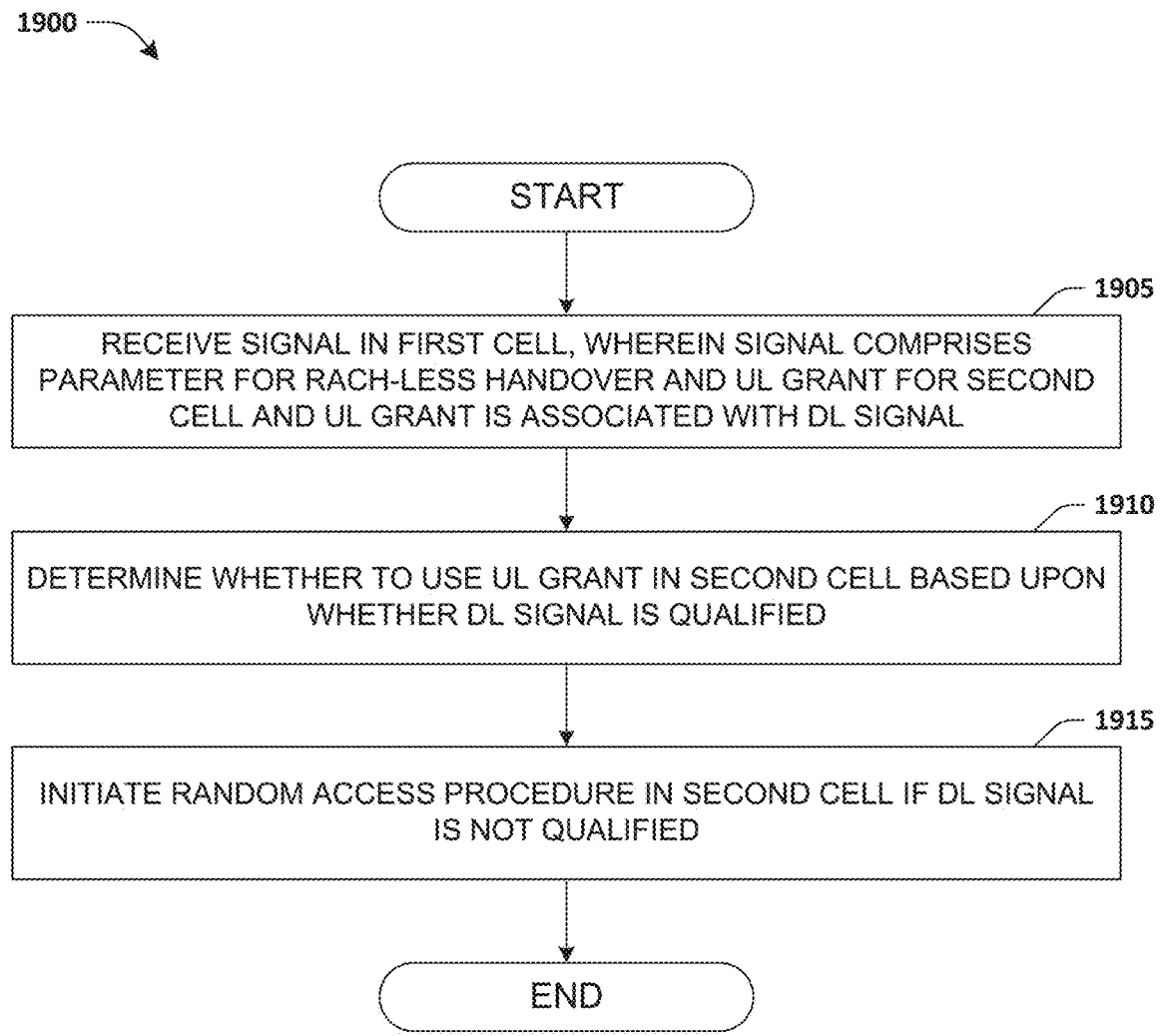
FIG. 19 is a flow chart according to one exemplary embodiment.

FIG. 19 is a flow chart 1900 according to one exemplary embodiment from the perspective of a UE. In step 1905, a signal may be received in a first cell. The signal may comprise a parameter for RACH-less handover and/or a UL grant for a second cell. The UL grant may be associated with a DL signal. In step 1910, it may be determined whether to use the UL grant in the second cell based upon whether the DL signal is qualified. In step 1915, a random access procedure may be initiated in the second cell if the DL signal is not qualified.

In the context of the embodiment illustrated in FIG. 19 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Alternatively and/or additionally, the random access procedure may be a contention free random access procedure.

Alternatively and/or additionally, the random access procedure may be a contention based random access procedure.

Alternatively and/or additionally, the random access procedure may be a random access procedure for beam failure recovery.

Alternatively and/or additionally, an RACH resource for the random access procedure may be configured via the signal. For example, the signal may be indicative of the RACH resource.

Alternatively and/or additionally, an RACH resource for the random access procedure may be configured via system information. For example, the system information may be indicative of the RACH resource.

Figure 20:
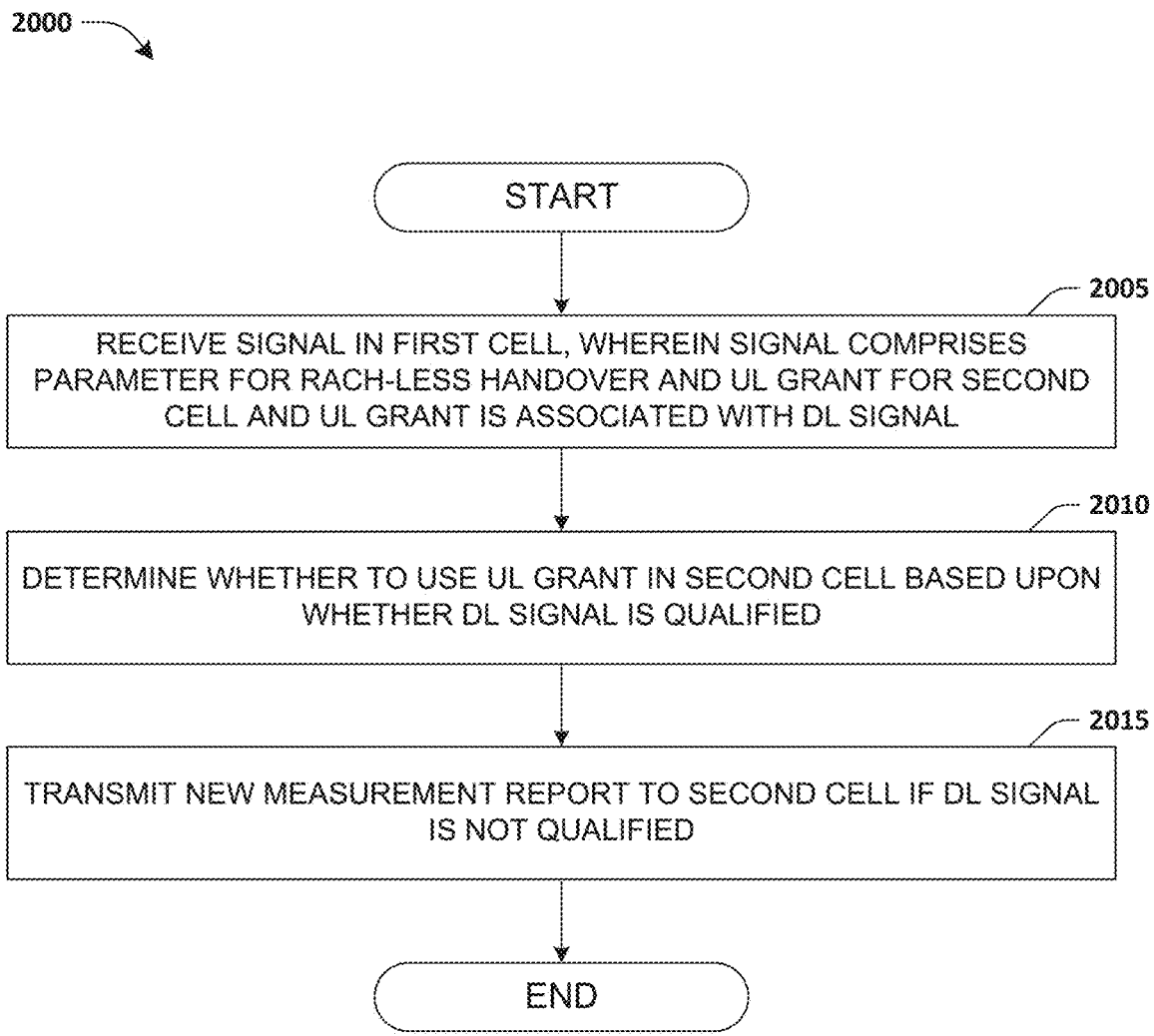
FIG. 20 is a flow chart according to one exemplary embodiment.

FIG. 20 is a flow chart 2000 according to one exemplary embodiment from the perspective of a UE. In step 2005, a signal may be received in a first cell. The signal may comprise a parameter for RACH-less handover and/or a UL grant for a second cell. The UL grant may be associated with a DL signal. In step 2010, it may be determined whether to use the UL grant in the second cell based upon whether the DL signal is qualified. In step 2015, a new measurement report may be transmitted to the second cell if the DL signal is not qualified.

In the context of the embodiment illustrated in FIG. 20 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Alternatively and/or additionally, the new measurement report may comprise one or more beam measurement results.

Alternatively and/or additionally, the new measurement report may be triggered and/or generated when (e.g., prior to, while and/or after) the UE receives the signal. Alternatively and/or additionally, the new measurement report may be triggered and/or generated responsive to the UE receiving the signal.

Figure 21:
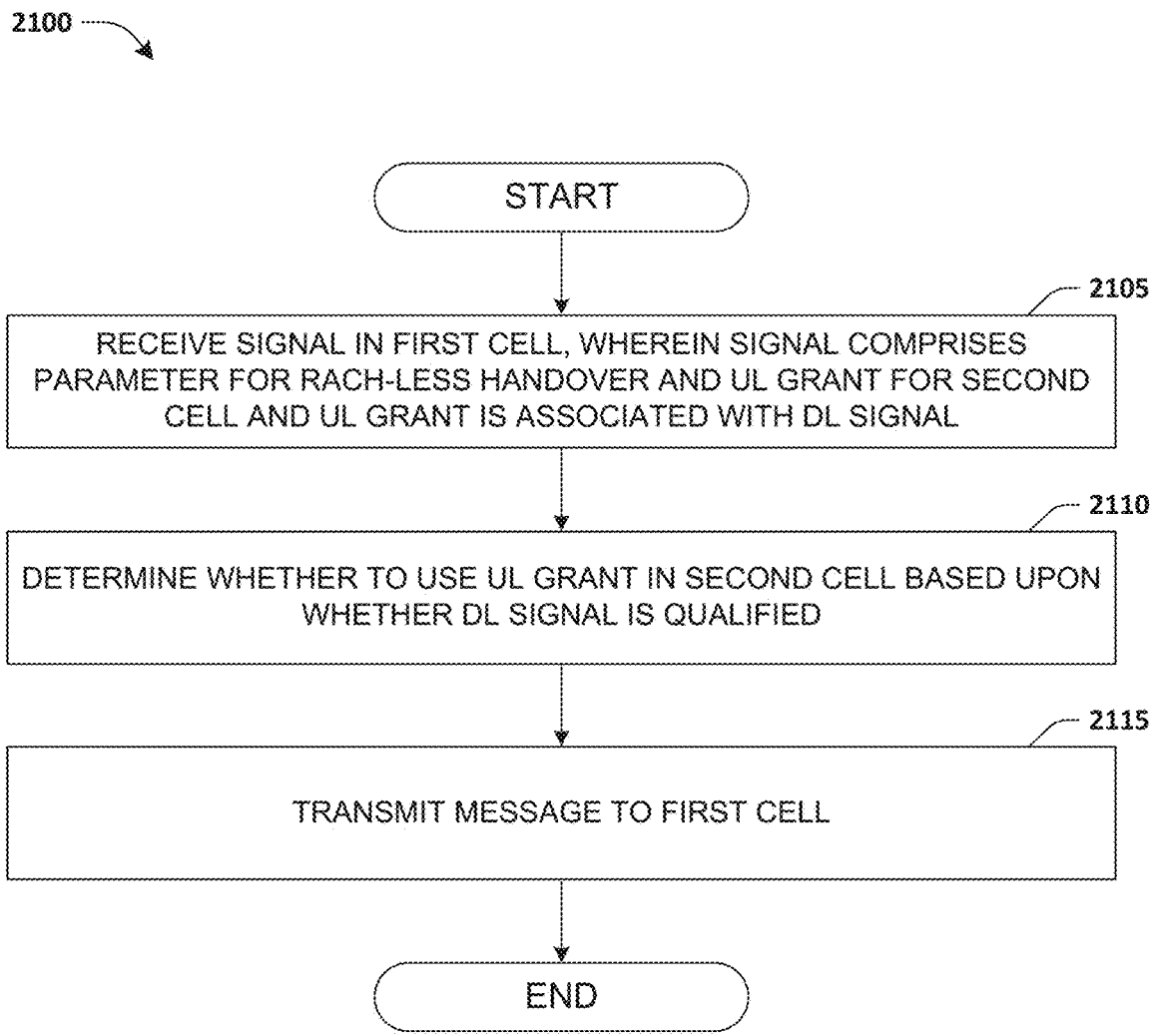
FIG. 21 is a flow chart according to one exemplary embodiment.

FIG. 21 is a flow chart 2100 according to one exemplary embodiment from the perspective of a UE. In step 2105, a signal may be received in a first cell. The signal may comprise a parameter for RACH-less handover and/or a UL grant for a second cell. The UL grant may be associated with a DL signal. In step 2110, it may be determined whether to use the UL grant in the second cell based upon whether the DL signal is qualified. In step 2115, a message may be transmitted to the first cell.

In the context of the embodiment illustrated in FIG. 21 and discussed above, the message may be transmitted to the first cell if the DL signal is not qualified.

Alternatively and/or additionally, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Alternatively and/or additionally, the message may indicate that the DL signal is not qualified. For example, the message may be used to inform the first cell that the DL signal is not qualified.

Alternatively and/or additionally, the message may indicate that a handover procedure failed (and/or that the handover procedure is not successful). Alternatively and/or additionally, the message may be used to inform the first cell that the handover procedure failed (and/or that the handover procedure is not successful).

Alternatively and/or additionally, the message may indicate that the UL grant is not valid. For example, the message may be used to inform the first cell that the UL grant is not valid.

Figure 22:
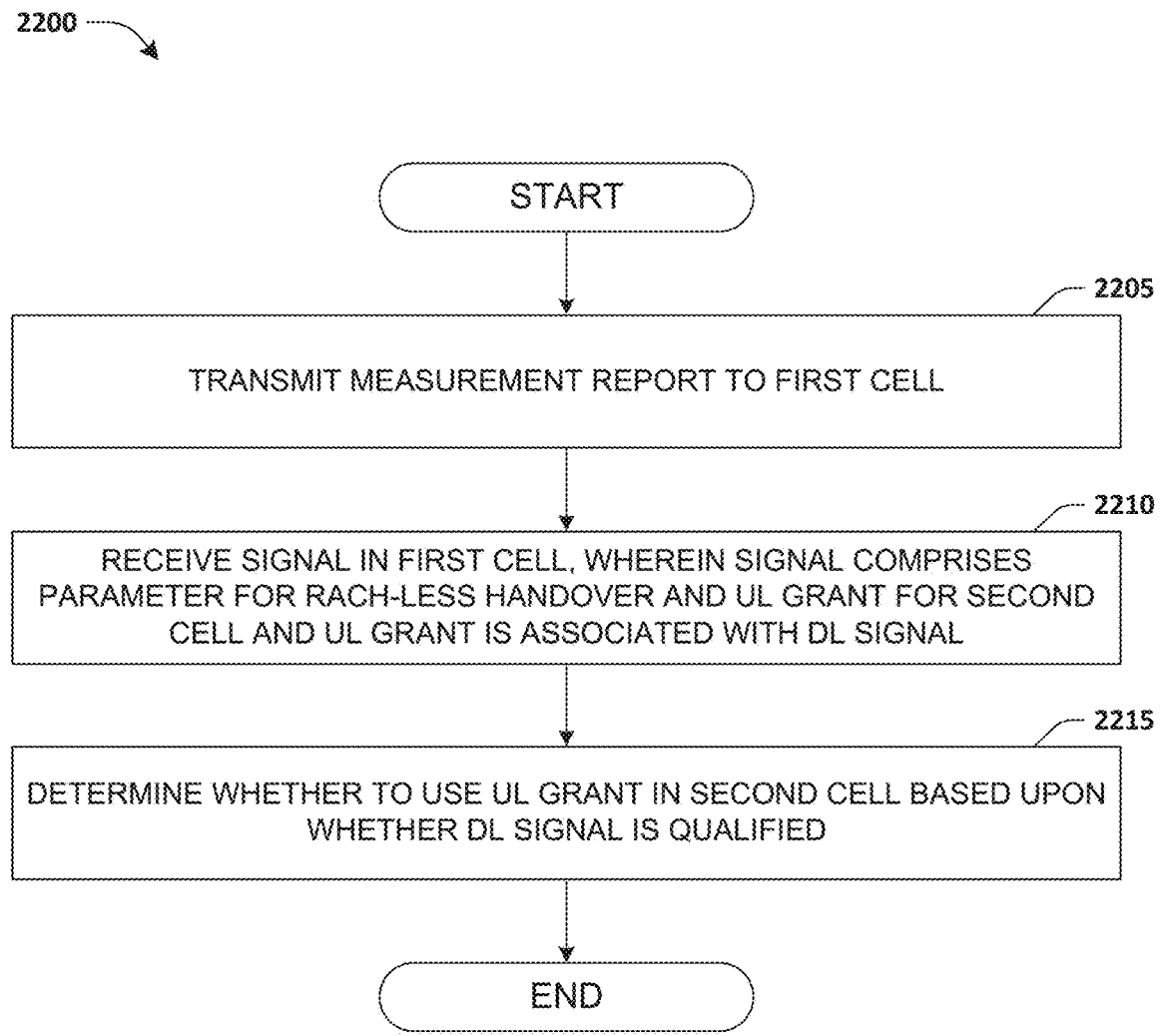
FIG. 22 is a flow chart according to one exemplary embodiment.

FIG. 22 is a flow chart 2200 according to one exemplary embodiment from the perspective of a UE. In step 2205, a measurement report may be transmitted to a first cell. In step 2210, a signal may be received in the first cell. The signal may comprise a parameter for RACH-less handover and/or a UL grant for a second cell. The UL grant may be associated with a DL signal. In step 2215, it may be determined whether to use the UL grant in the second cell based upon whether the DL signal is qualified.

In the context of the embodiment illustrated in FIG. 22 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Alternatively and/or additionally, the measurement report may be transmitted to the first cell prior to receiving the signal in the first cell.

Figure 23:
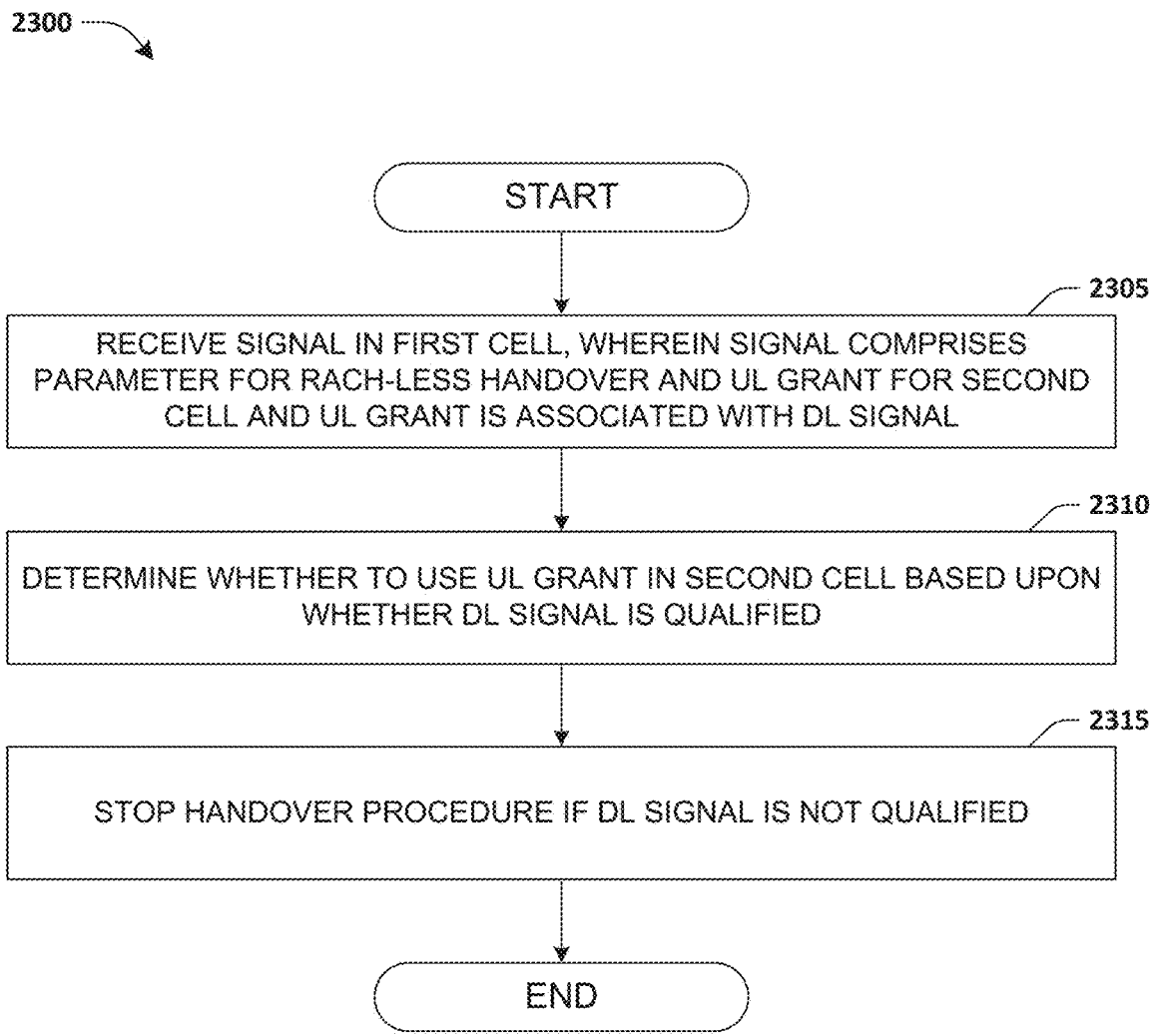
FIG. 23 is a flow chart according to one exemplary embodiment.

FIG. 23 is a flow chart 2300 according to one exemplary embodiment from the perspective of a UE. In step 2305, a signal may be received in a first cell. The signal may comprise a parameter for RACH-less handover and/or a UL grant for a second cell. The UL grant may be associated with a DL signal. In step 2310, it may be determined whether to use the UL grant in the second cell based upon whether the DL signal is qualified. In step 2315, a handover procedure may be stopped if the DL signal is not qualified.

In the context of the embodiment illustrated in FIG. 23 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Figure 24:
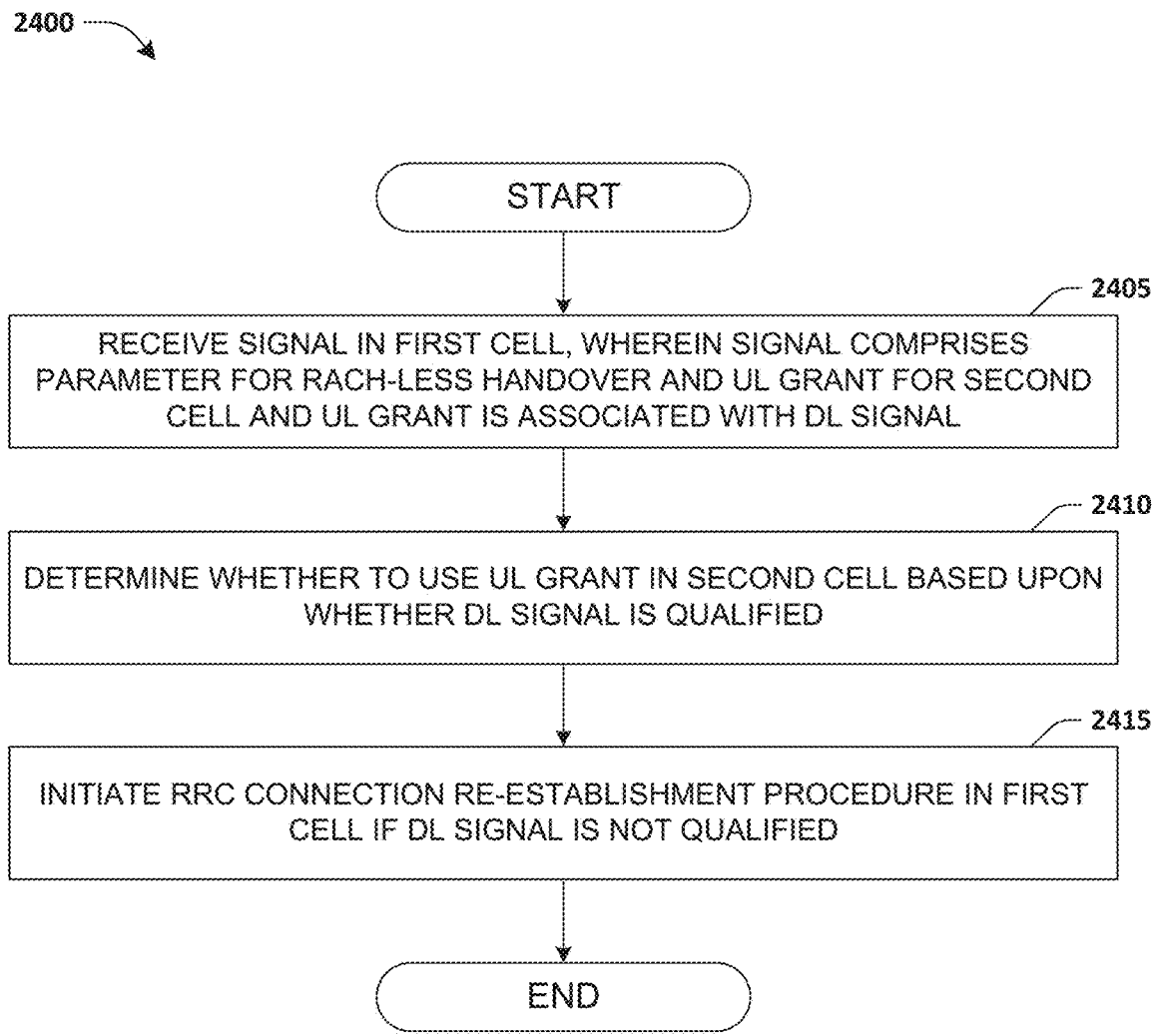
FIG. 24 is a flow chart according to one exemplary embodiment.

FIG. 24 is a flow chart 2400 according to one exemplary embodiment from the perspective of a UE. In step 2405, a signal may be received in a first cell. The signal may comprise a parameter for RACH-less handover and/or a UL grant for a second cell. The UL grant may be associated with a DL signal. In step 2410, it may be determined whether to use the UL grant in the second cell based upon whether the DL signal is qualified. In step 2415, an RRC connection re-establishment procedure may be initiated in the first cell if the DL signal is not qualified.

In the context of the embodiment illustrated in FIG. 24 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Figure 25:
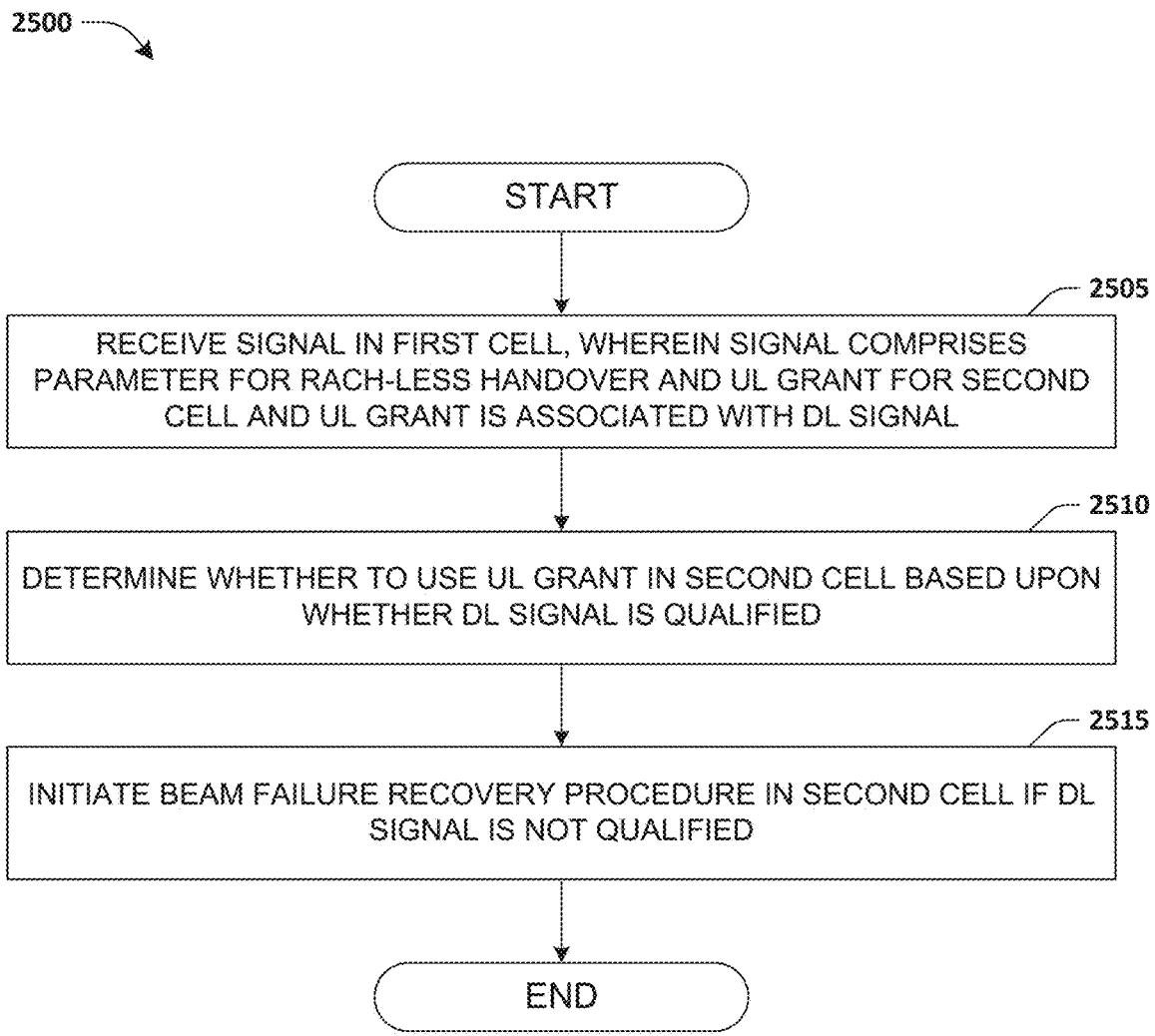
FIG. 25 is a flow chart according to one exemplary embodiment.

FIG. 25 is a flow chart 2500 according to one exemplary embodiment from the perspective of a UE. In step 2505, a signal may be received in a first cell. The signal may comprise a parameter for RACH-less handover and/or a UL grant for a second cell. The UL grant may be associated with a DL signal. In step 2510, it may be determined whether to use the UL grant in the second cell based upon whether the DL signal is qualified. In step 2515, a beam failure recovery procedure may be initiated in the second cell if the DL signal is not qualified.

In the context of the embodiment illustrated in FIG. 25 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Figure 26:
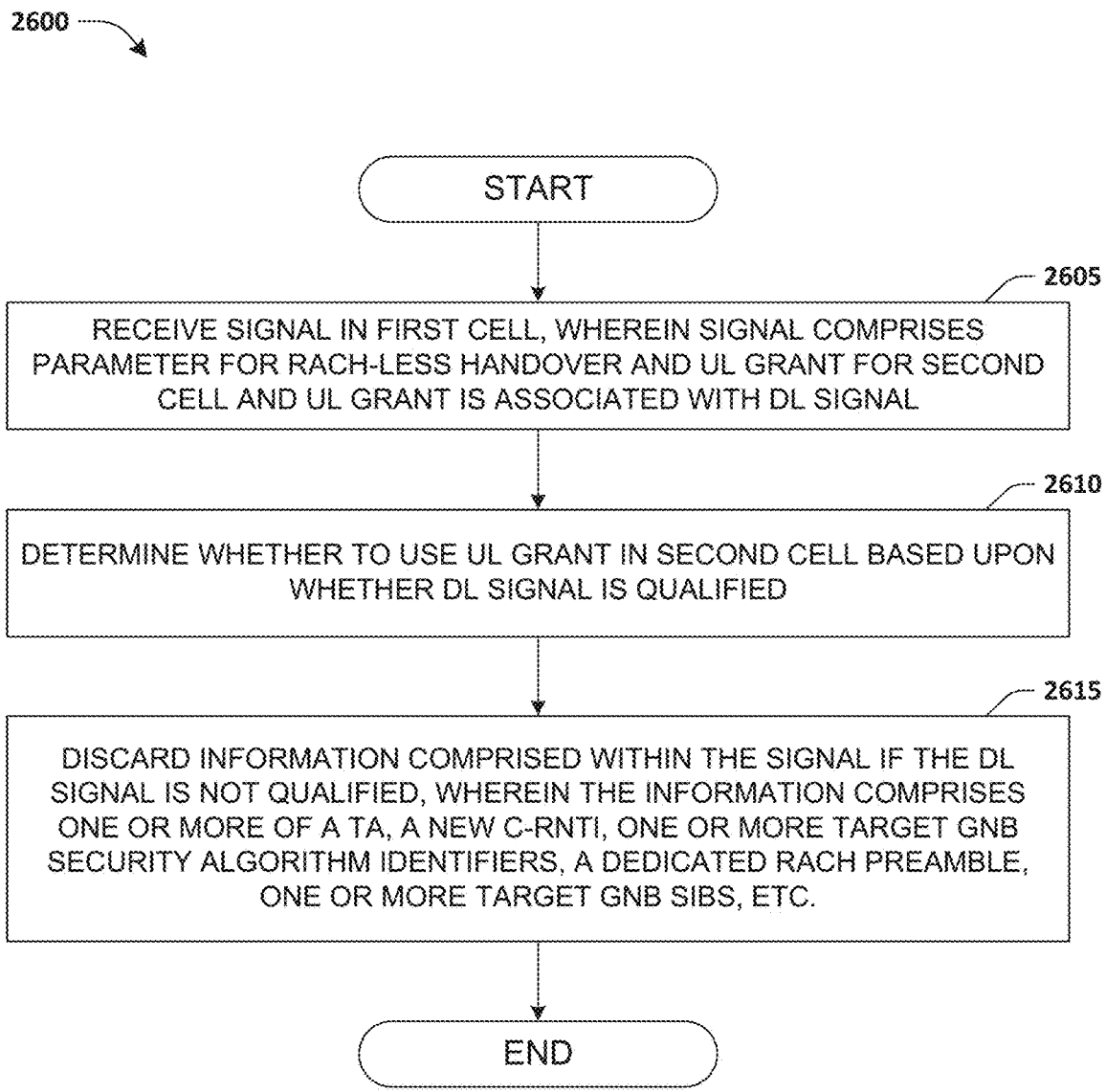
FIG. 26 is a flow chart according to one exemplary embodiment.

FIG. 26 is a flow chart 2600 according to one exemplary embodiment from the perspective of a UE. In step 2605, a signal may be received in a first cell. The signal may comprise a parameter for RACH-less handover and/or a UL grant for a second cell. The UL grant may be associated with a DL signal. In step 2610, it may be determined whether to use the UL grant in the second cell based upon whether the DL signal is qualified. In step 2615, information comprised within the signal may be discarded if the DL signal is not qualified. The information may comprise one or more of a TA, a new C-RNTI, one or more target gNB security algorithm identifiers, a dedicated RACH preamble, one or more target gNB SIB s, etc.

In the context of the embodiment illustrated in FIG. 26 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP.

Figure 27:
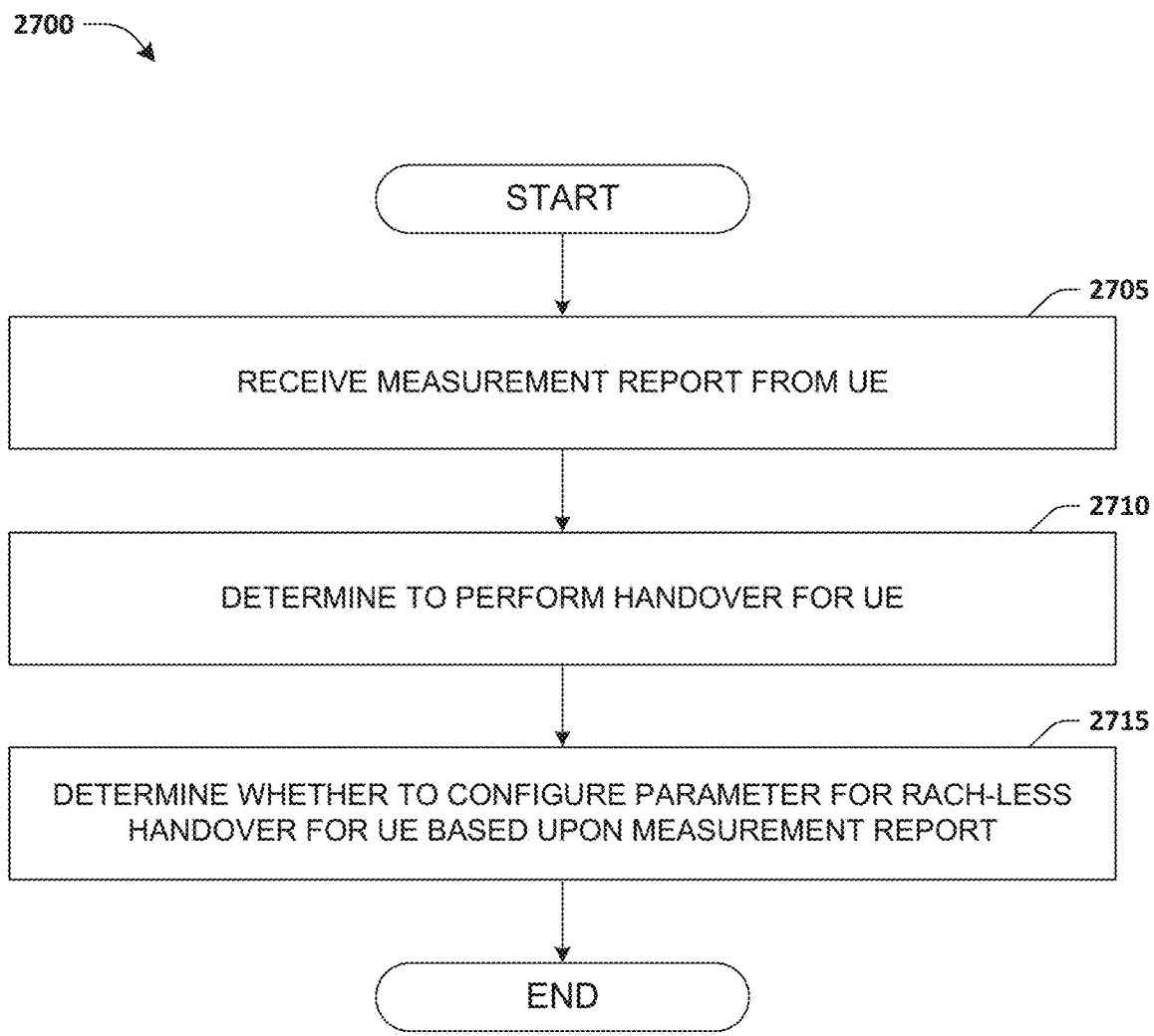
FIG. 27 is a flow chart according to one exemplary embodiment.

FIG. 27 is a flow chart 2700 according to one exemplary embodiment from the perspective of a network node. In step 2705, a measurement report may be received from a UE. In step 2710, it may be determined (and/or decided) to perform a handover for the UE. In step 2715, it may be determined whether to configure a parameter for RACH-less handover for the UE based upon the measurement report.

Figure 28:
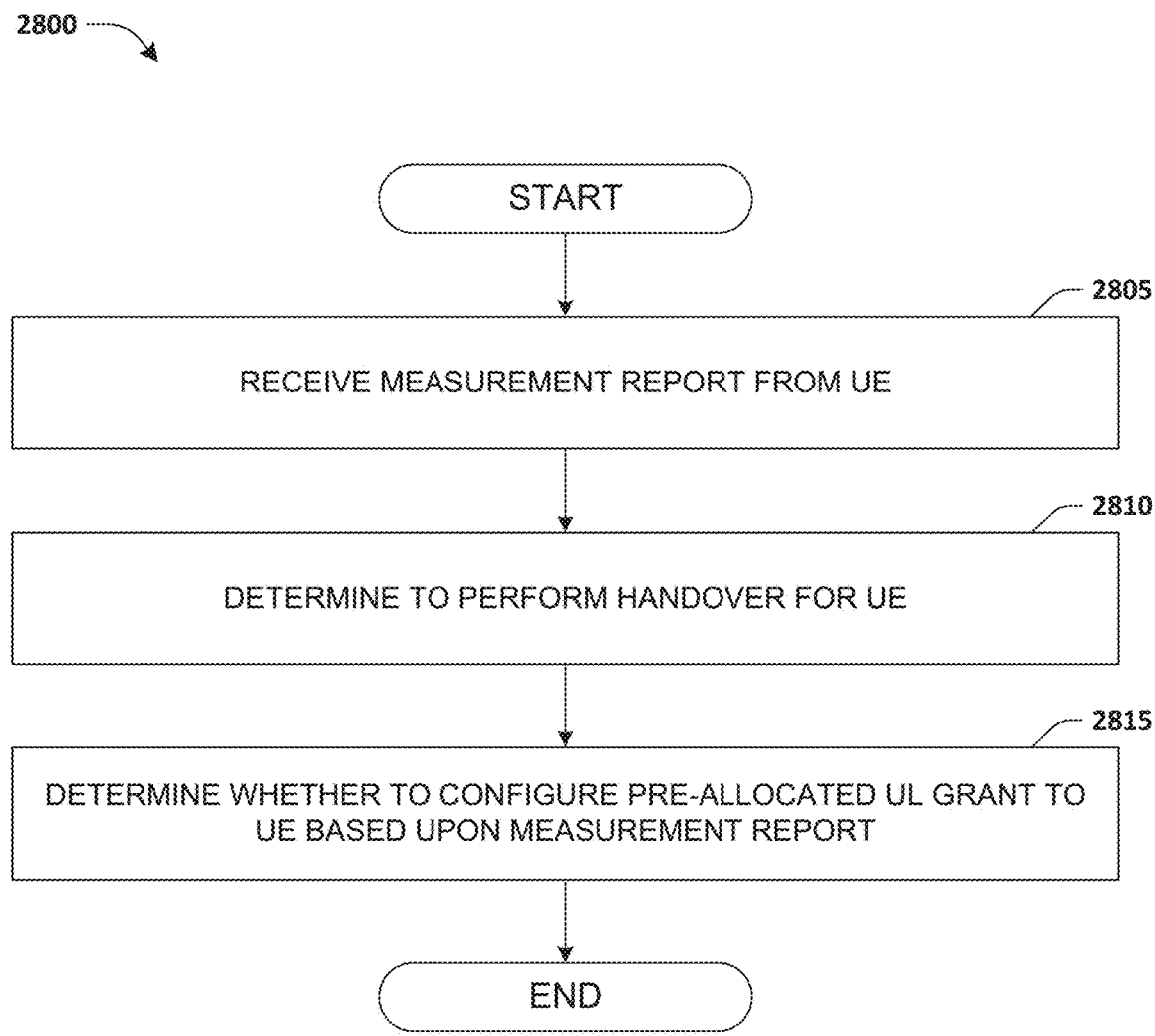
FIG. 28 is a flow chart according to one exemplary embodiment.

FIG. 28 is a flow chart 2800 according to one exemplary embodiment from the perspective of a network node. In step 2805, a measurement report may be received from a UE. In step 2810, it may be determined (and/or decided) to perform a handover for the UE. In step 2815, it may be determined whether to configure a pre-allocated UL grant to the UE based upon the measurement report.

In the context of one or more of the embodiments illustrated in FIGS. 18-28, and discussed above, in one embodiment, the handover procedure may be an RACH-less handover procedure.

In the context of one or more of the embodiments illustrated in FIGS. 18-28, and discussed above, in one embodiment, the DL signal may be (and/or may comprise) one or more DL signals. Alternatively and/or additionally, the DL signal is not qualified if each DL signal of the one or more DL signals is associated with a quality that is not above a threshold.

In the context of one or more of the embodiments illustrated in FIGS. 18-28, and discussed above, in one embodiment, the DL signal may not be qualified if the DL signal fails (and/or is failed).

In the context of one or more of the embodiments illustrated in FIGS. 18-28, and discussed above, in one embodiment, the DL signal may be (and/or may comprise) an SSB. Alternatively and/or additionally, the DL signal may be (and/or may comprise) a CSI-RS. Alternatively and/or additionally, the DL signal may refer to a beam.

In the context of one or more of the embodiments illustrated in FIGS. 18-28, and discussed above, in one embodiment, the UL grant may be a pre-allocated UL grant. Alternatively and/or additionally, the UL grant may be periodic (e.g., the UL grant may be a periodic UL grant).

In the context of one or more of the embodiments illustrated in FIGS. 18-28, and discussed above, in one embodiment, the signal may comprise an association between the UL grant and the DL signal. Alternatively and/or additionally, the signal may be indicative of the association between the UL grant and the DL signal.

Figure 29:
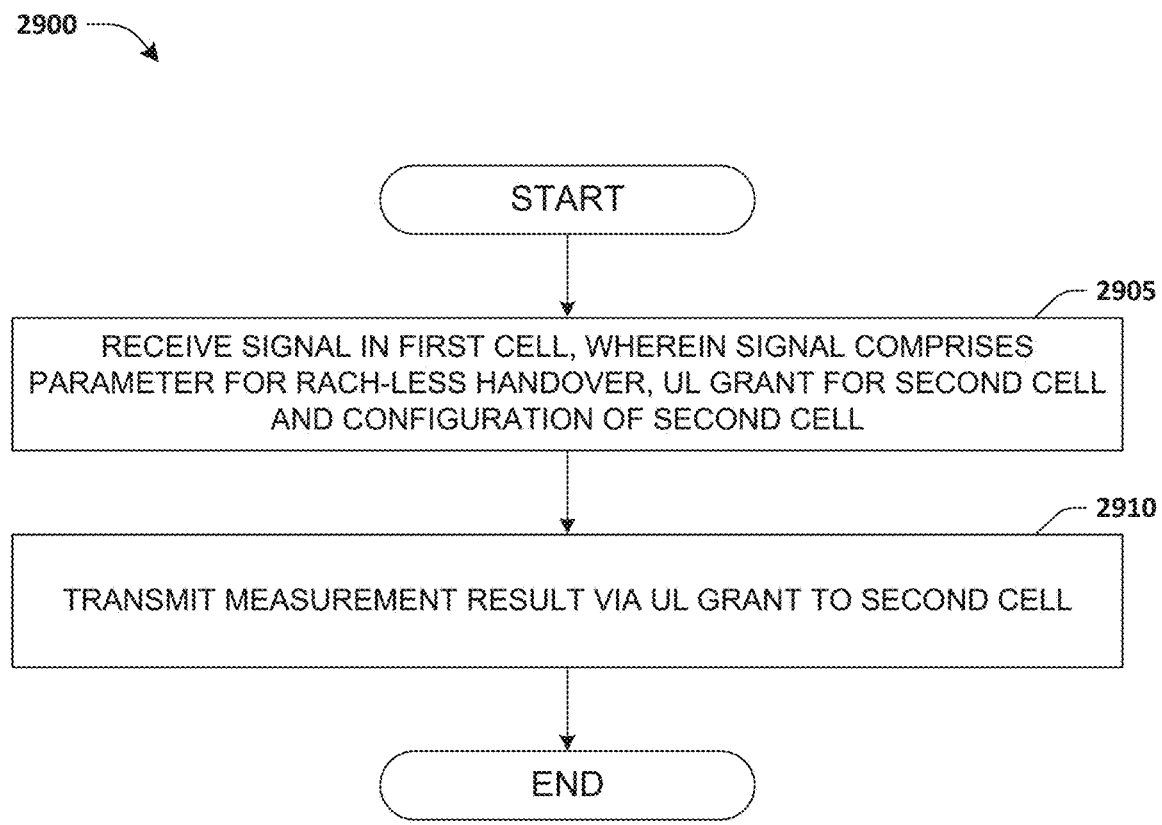
FIG. 29 is a flow chart according to one exemplary embodiment.

FIG. 29 is a flow chart 2900 according to one exemplary embodiment from the perspective of a UE. In step 2905, a signal may be received in a first cell. The signal may comprise a parameter for RACH-less handover, a UL grant for a second cell and/or a configuration of the second cell. In step 2910, a measurement result may be transmitted via the UL grant to the second cell.

In the context of the embodiment illustrated in FIG. 29 and discussed above, the UL grant may be a pre-allocated UL grant. Alternatively and/or additionally, the UL grant may be periodic (e.g., the UL grant may be a periodic UL grant).

Figure 30:
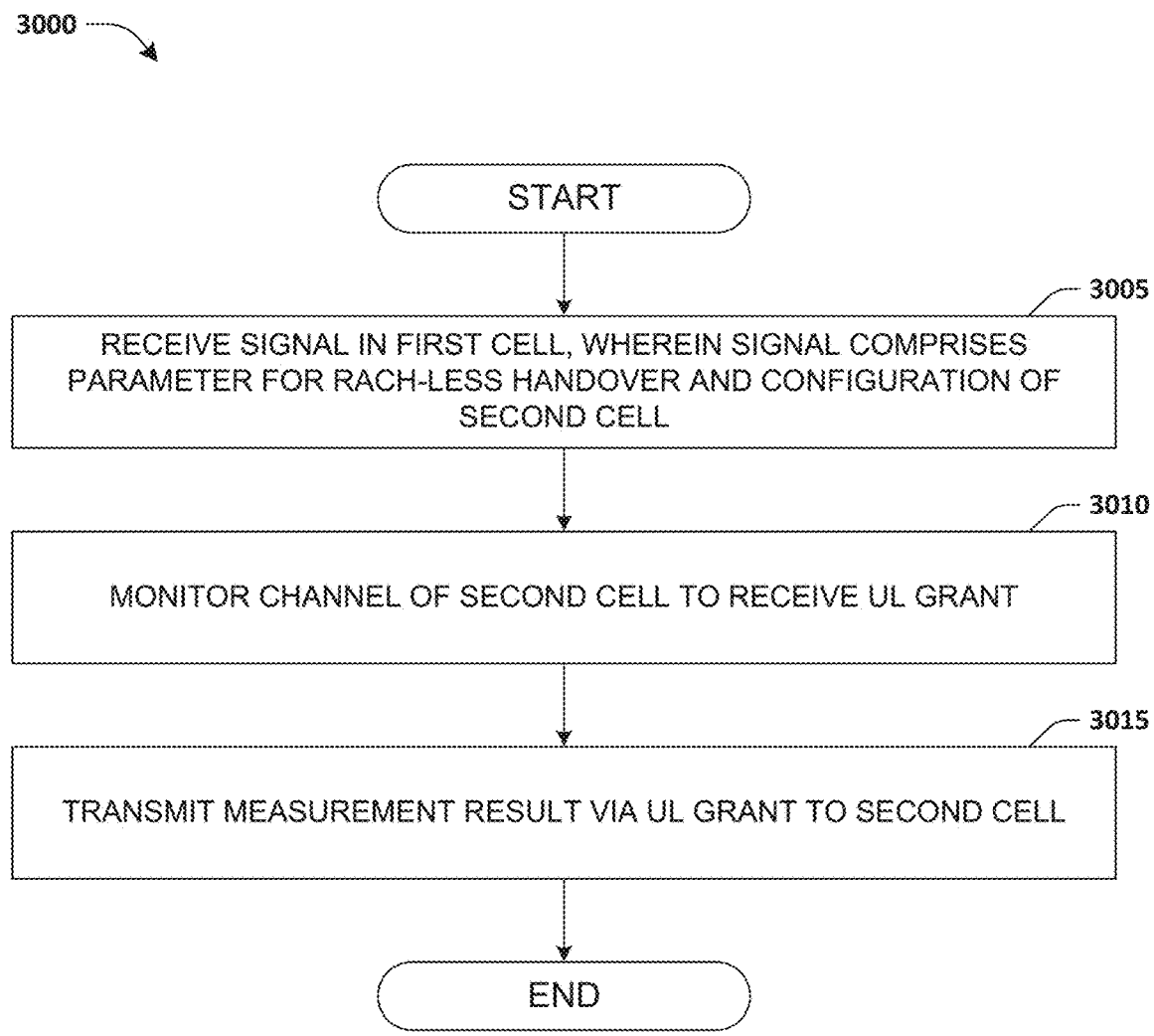
FIG. 30 is a flow chart according to one exemplary embodiment.

FIG. 30 is a flow chart 3000 according to one exemplary embodiment from the perspective of a UE. In step 3005, a signal may be received in a first cell. The signal may comprise a parameter for RACH-less handover and/or a configuration of a second cell. In step 3010, a channel of the second cell may be monitored to receive a UL grant. In step 3015, a measurement result may be transmitted via the UL grant to the second cell.

In the context of the embodiment illustrated in FIG. 30 and discussed above, the configuration of the second cell may be indicative of the UE monitoring the channel of the second cell. Alternatively and/or additionally, the configuration of the second cell may be indicative of the channel of the second cell. Alternatively and/or additionally, the configuration of the second cell (and/or the signal) may comprise an instruction to monitor the channel of the second cell.

Figure 31:
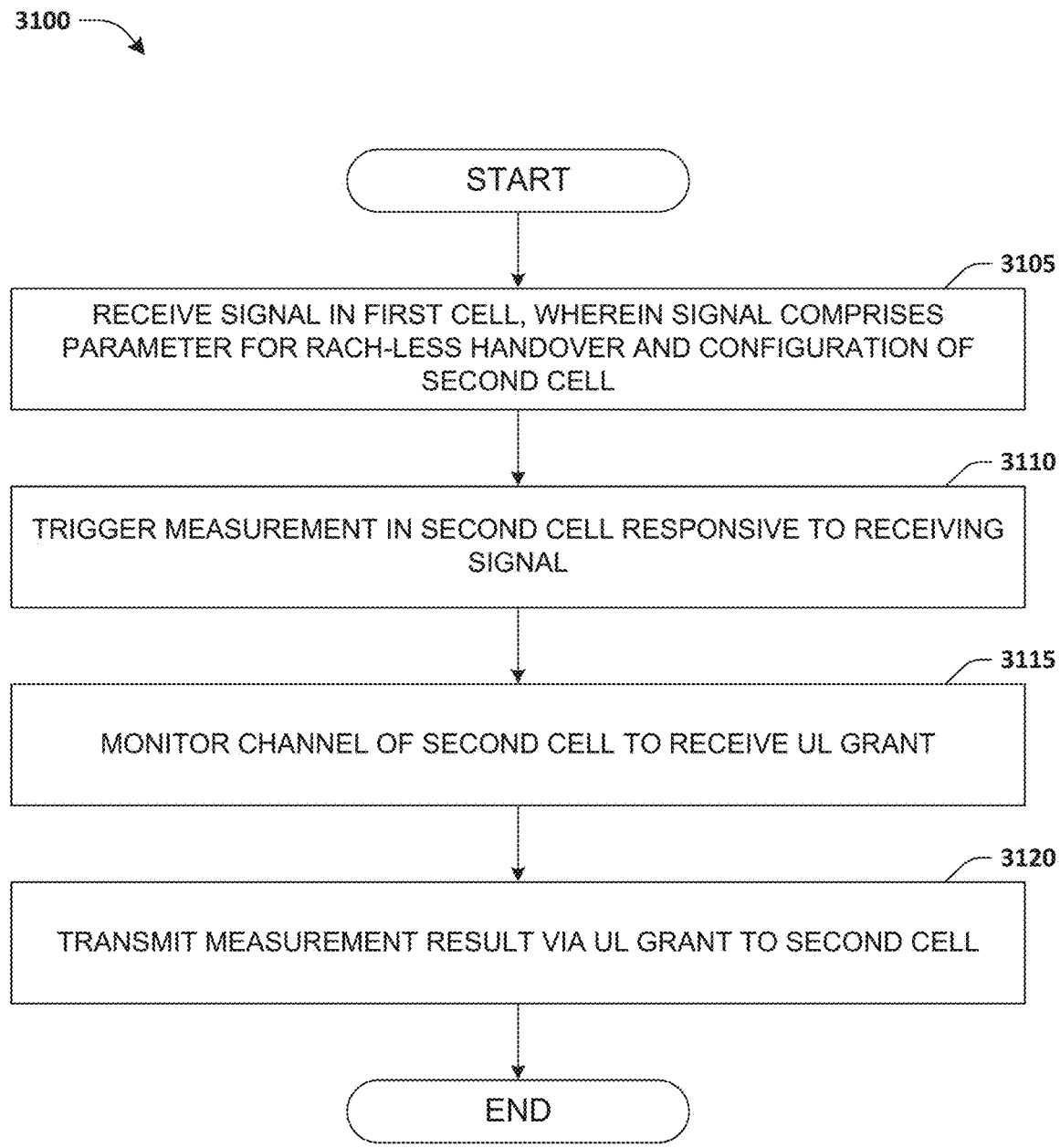
FIG. 31 is a flow chart according to one exemplary embodiment.

FIG. 31 is a flow chart 3100 according to one exemplary embodiment from the perspective of a UE. In step 3105, a signal may be received in a first cell. The signal may comprise a parameter for RACH-less handover and/or a configuration of a second cell. In step 3110, a measurement in the second cell may be triggered responsive to receiving the signal (and/or when the signal is received). In step 3115, a channel of the second cell may be monitored to receive a UL grant. In step 3120, a measurement result may be transmitted via the UL grant to the second cell.

In the context of the embodiment illustrated in FIG. 31 and discussed above, the measurement may correspond to measuring a quality of a DL signal. For example, the measurement may be performed by measuring the quality of the DL signal.

In the context of the embodiments illustrated in FIGS. 29-31, and discussed above, in one embodiment, the measurement result may be a beam measurement result. Alternatively and/or additionally, the measurement result may be included in a measurement report. Alternatively and/or additionally, the measurement result may be included in an RRC reconfiguration complete message.

Figure 32:
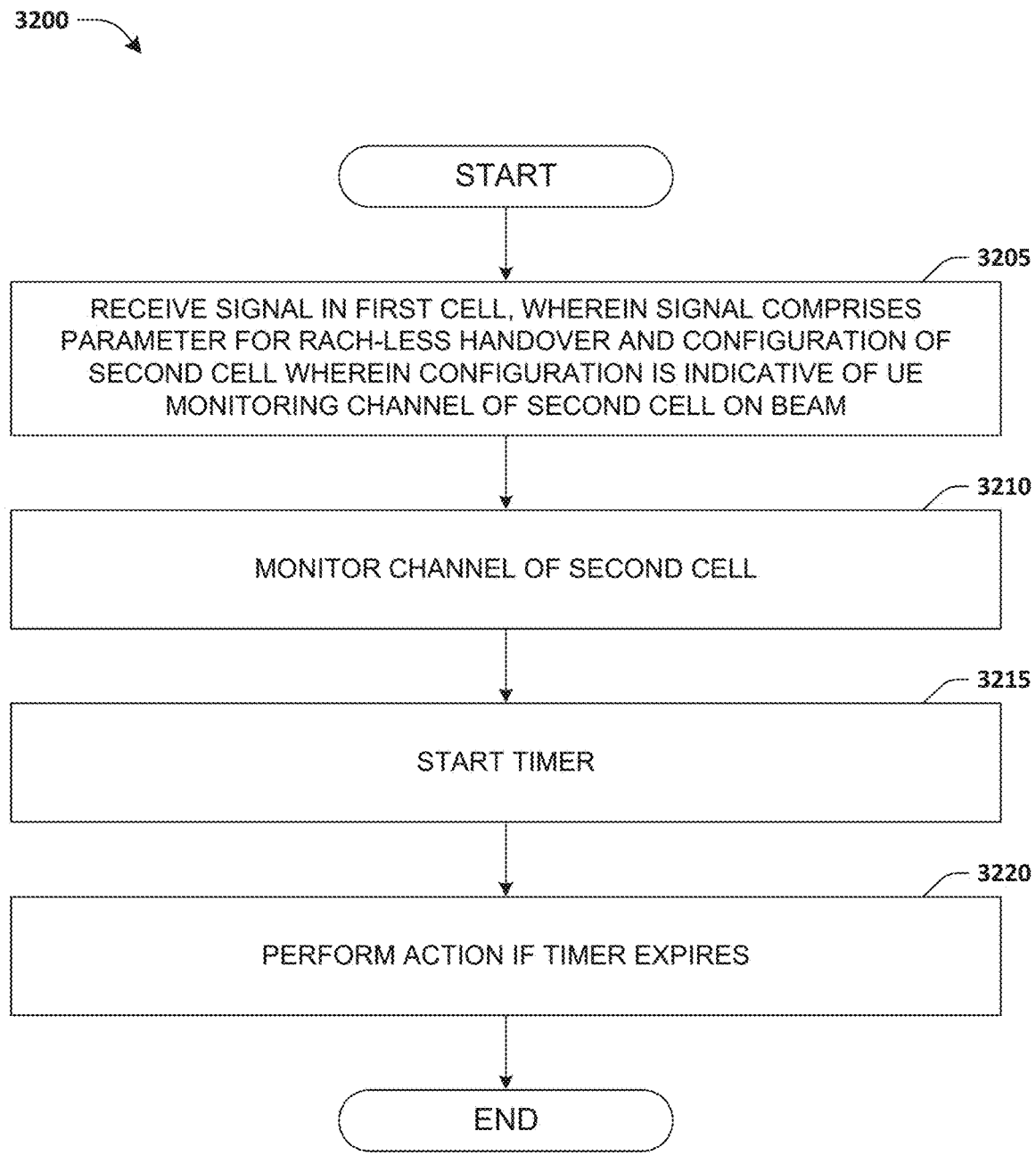
FIG. 32 is a flow chart according to one exemplary embodiment.

FIG. 32 is a flow chart 3200 according to one exemplary embodiment from the perspective of a UE. In step 3205, a signal may be received in a first cell. The signal may comprise a parameter for RACH-less handover and/or a configuration of a second cell. The configuration (of the second cell) may be indicative of the UE monitoring a channel of the second cell on a beam. In step 3210, the channel on the beam may be monitored. In step 3215, a timer may be started. In step 3220, an action may be performed if the timer expires (and/or if the timer is expired).

Figure 33:
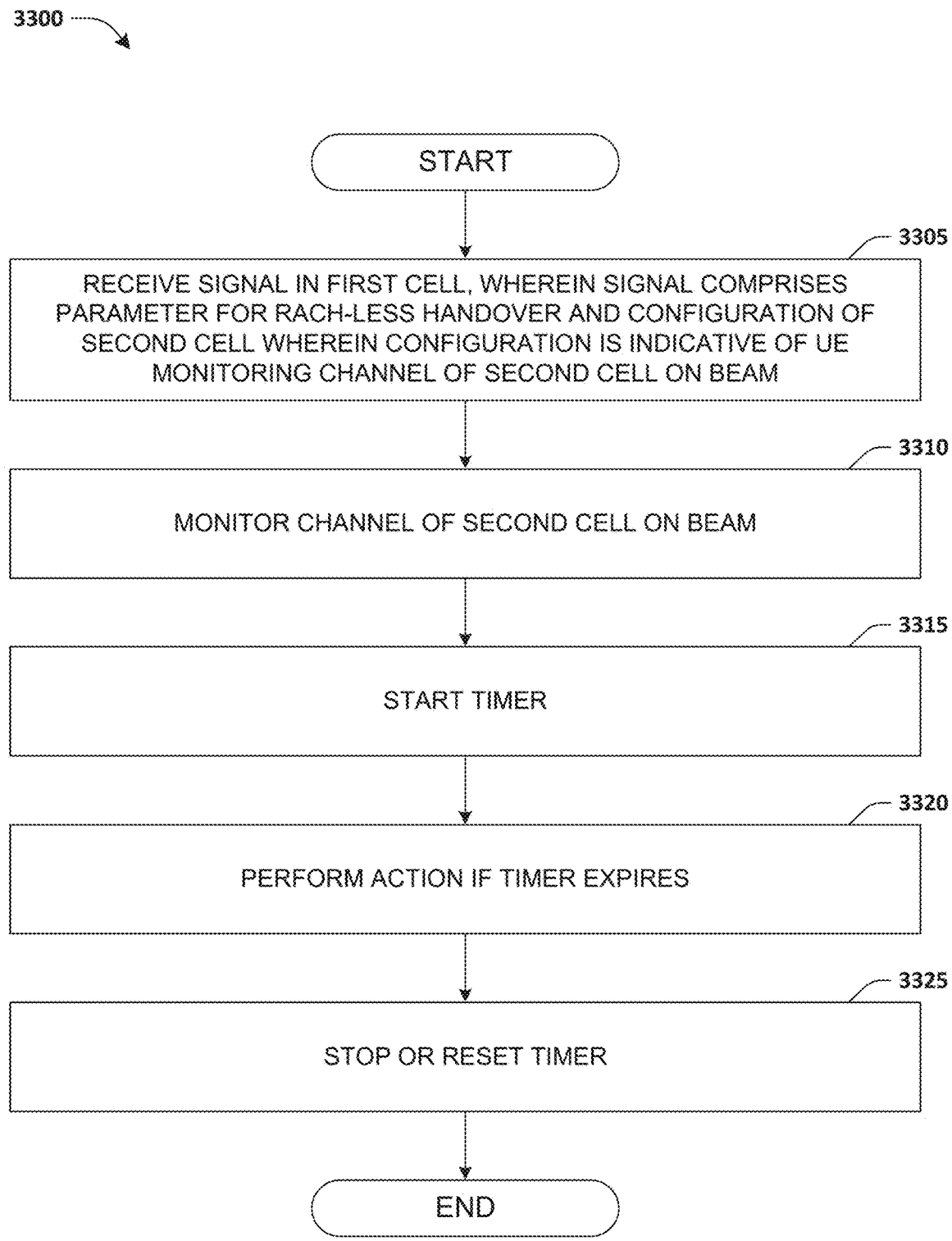
FIG. 33 is a flow chart according to one exemplary embodiment.

FIG. 33 is a flow chart 3300 according to one exemplary embodiment from the perspective of a UE. In step 3305, a signal may be received in a first cell. The signal may comprise a parameter for RACH-less handover and/or a configuration of a second cell. The configuration (of the second cell) may be indicative of the UE monitoring a channel of the second cell on a beam. In step 3310, the channel on the beam may be monitored. In step 3315, a timer may be started. In step 3320, an action may be performed if the timer expires (and/or if the timer is expired). In step 3325, the timer may be stopped and/or reset.

In the context of the embodiments illustrated in FIGS. 32 and 33, and discussed above, in one embodiment, the timer may be related to PDCCH monitoring.

Figure 34:
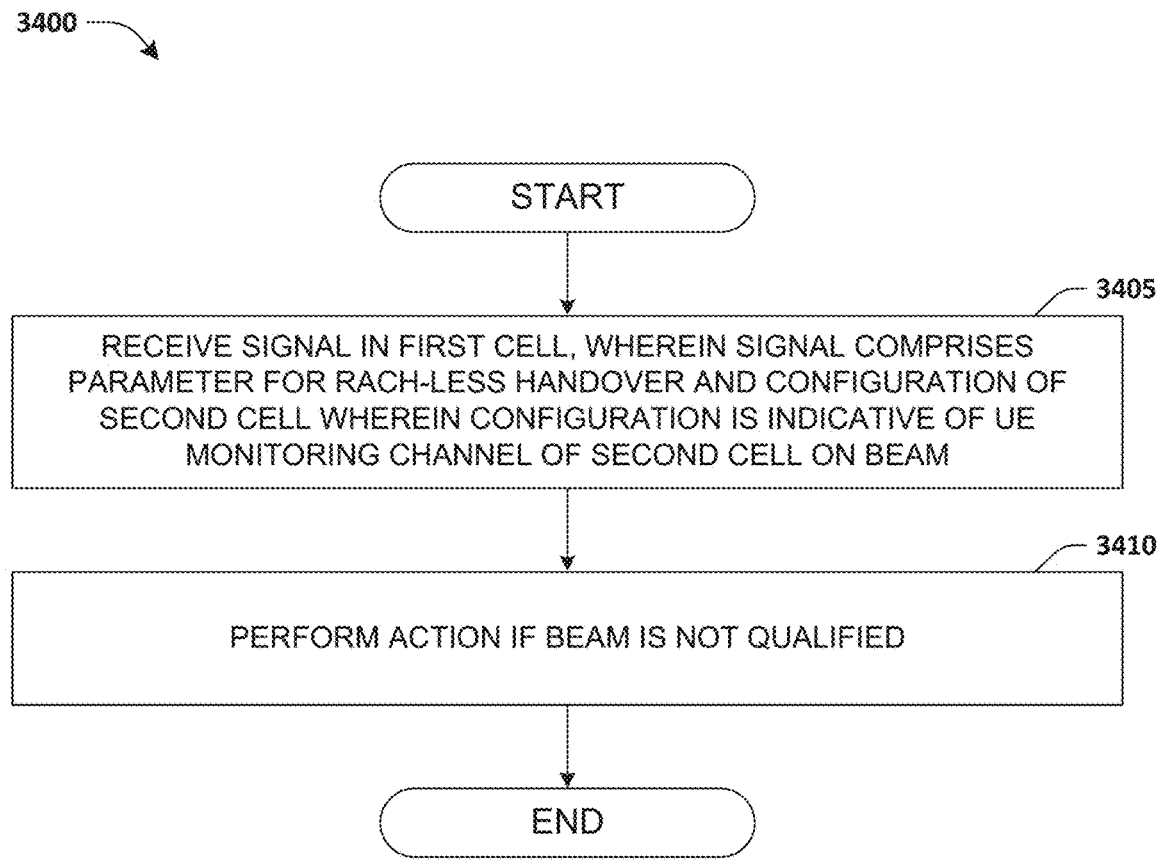
FIG. 34 is a flow chart according to one exemplary embodiment.

FIG. 34 is a flow chart 3400 according to one exemplary embodiment from the perspective of a UE. In step 3405, a signal may be received in a first cell. The signal may comprise a parameter for RACH-less handover and/or a configuration of a second cell. The configuration (of the second cell) may be indicative of the UE monitoring a channel of the second cell on a beam. In step 3410, an action may be performed if the beam is not qualified.

In the context of the embodiment illustrated in FIG. 34 and discussed above, the beam may be (determined to be) qualified if a quality associated with the beam is above a threshold and/or if an RSRP associated with the beam is above a threshold RSRP. Alternatively and/or additionally, the beam may be (determined to be) unqualified and/or may be (determined to be) not qualified if the quality associated with the beam is lower than the threshold and/or if the RSRP associated with the beam is lower than the threshold RSRP. Alternatively and/or additionally, the beam may not be qualified if the beam fails (and/or is failed).

Alternatively and/or additionally, the beam may be (and/or may comprise) one or more beams. Alternatively and/or additionally, the beam is not qualified if each beam of the one or more beams is not qualified. Alternatively and/or additionally, the beam is not qualified if each beam of the one or more beams is associated with a quality that is not above a threshold.

In the context of the embodiments illustrated in FIGS. 32-34, and discussed above, in one embodiment, the action may comprise initiating a random access procedure in the second cell. Alternatively and/or additionally, the random access procedure may be a contention free random access procedure. Alternatively and/or additionally, the random access procedure may be a contention based random access procedure. Alternatively and/or additionally, the random access procedure may be a random access procedure for beam failure recovery.

Alternatively and/or additionally, an RACH resource for the random access procedure may be configured via the signal. For example, the signal may be indicative of the RACH resource. Alternatively and/or additionally, an RACH resource for the random access procedure may be configured via system information. For example, the system information may be indicative of the RACH resource.

In the context of the embodiments illustrated in FIGS. 32-34, and discussed above, in one embodiment, the action may comprise transmitting a message to the first cell.

Alternatively and/or additionally, the message may indicate that the beam is not qualified. For example, the message may be used to inform the first cell that the beam is not qualified.

Alternatively and/or additionally, the message may indicate that a handover procedure failed (and/or that the handover procedure is not successful). Alternatively and/or additionally, the message may be used to inform the first cell that the handover procedure failed (and/or that the handover procedure is not successful).

In the context of the embodiments illustrated in FIGS. 32-34, and discussed above, in one embodiment, the action may comprise initiating an RRC connection re-establishment procedure in the first cell.

In the context of the embodiments illustrated in FIGS. 32-34, and discussed above, in one embodiment, the action may comprise initiating a beam failure recovery procedure in the second cell.

Figure 35:
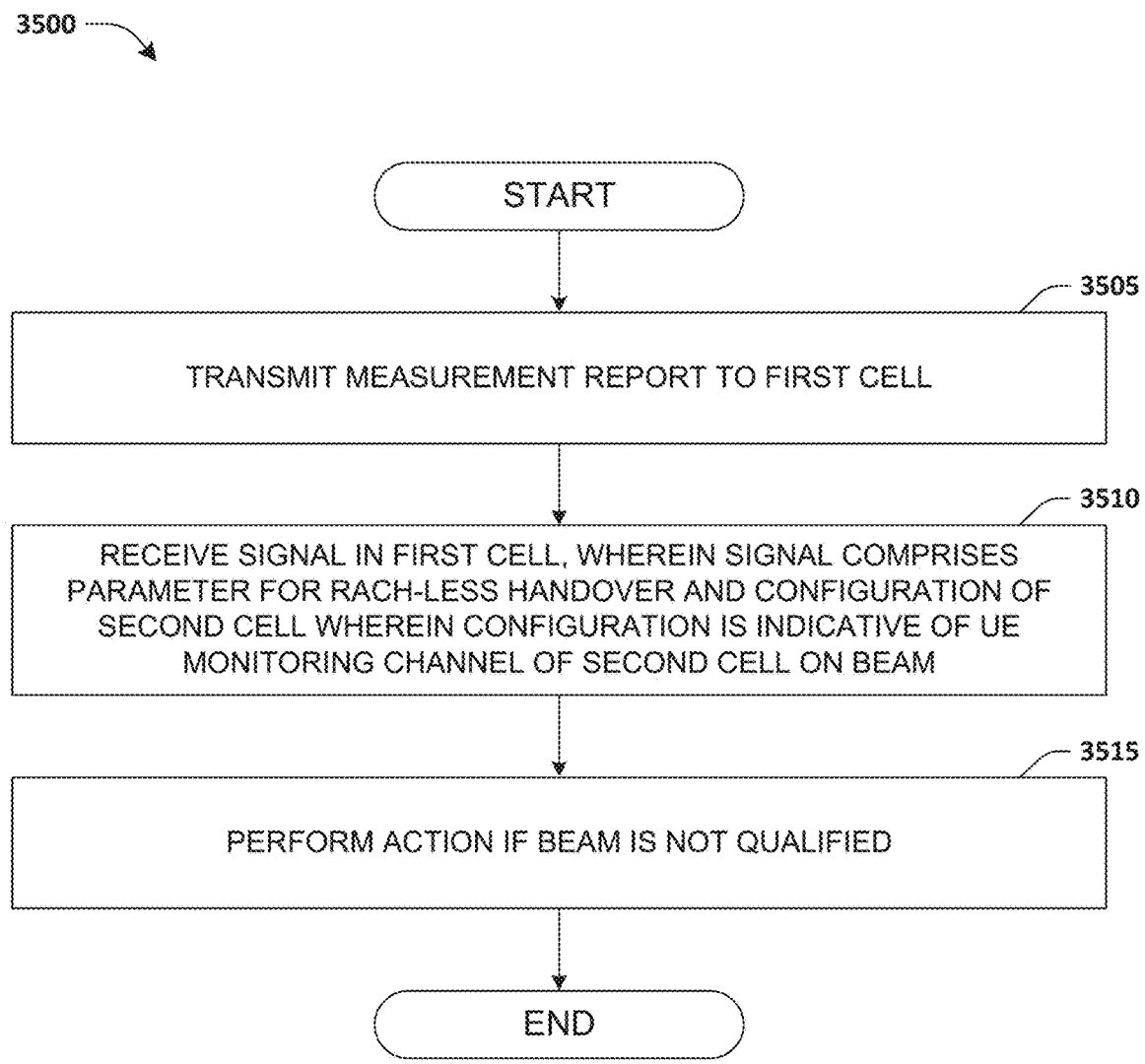
FIG. 35 is a flow chart according to one exemplary embodiment.

FIG. 35 is a flow chart 3500 according to one exemplary embodiment from the perspective of a UE. In step 3505, a measurement report may be transmitted to a first cell. In step 3510, a signal may be received in the first cell. The signal may comprise a parameter for RACH-less handover and/or a configuration of a second cell. The configuration (of the second cell) may be indicative of the UE monitoring a channel of the second cell on a beam. In step 3515, an action may be performed if the beam is not qualified.

In the context of the embodiment illustrated in FIG. 35 and discussed above, the beam may be (determined to be) qualified if a quality associated with the beam is above a threshold and/or if an RSRP associated with the beam is above a threshold RSRP. Alternatively and/or additionally, the beam may be (determined to be) unqualified and/or may be (determined to be) not qualified if the quality associated with the beam is lower than the threshold and/or if the RSRP associated with the beam is lower than the threshold RSRP. Alternatively and/or additionally, the beam may not be qualified if the beam fails (and/or is failed).

Figure 36:
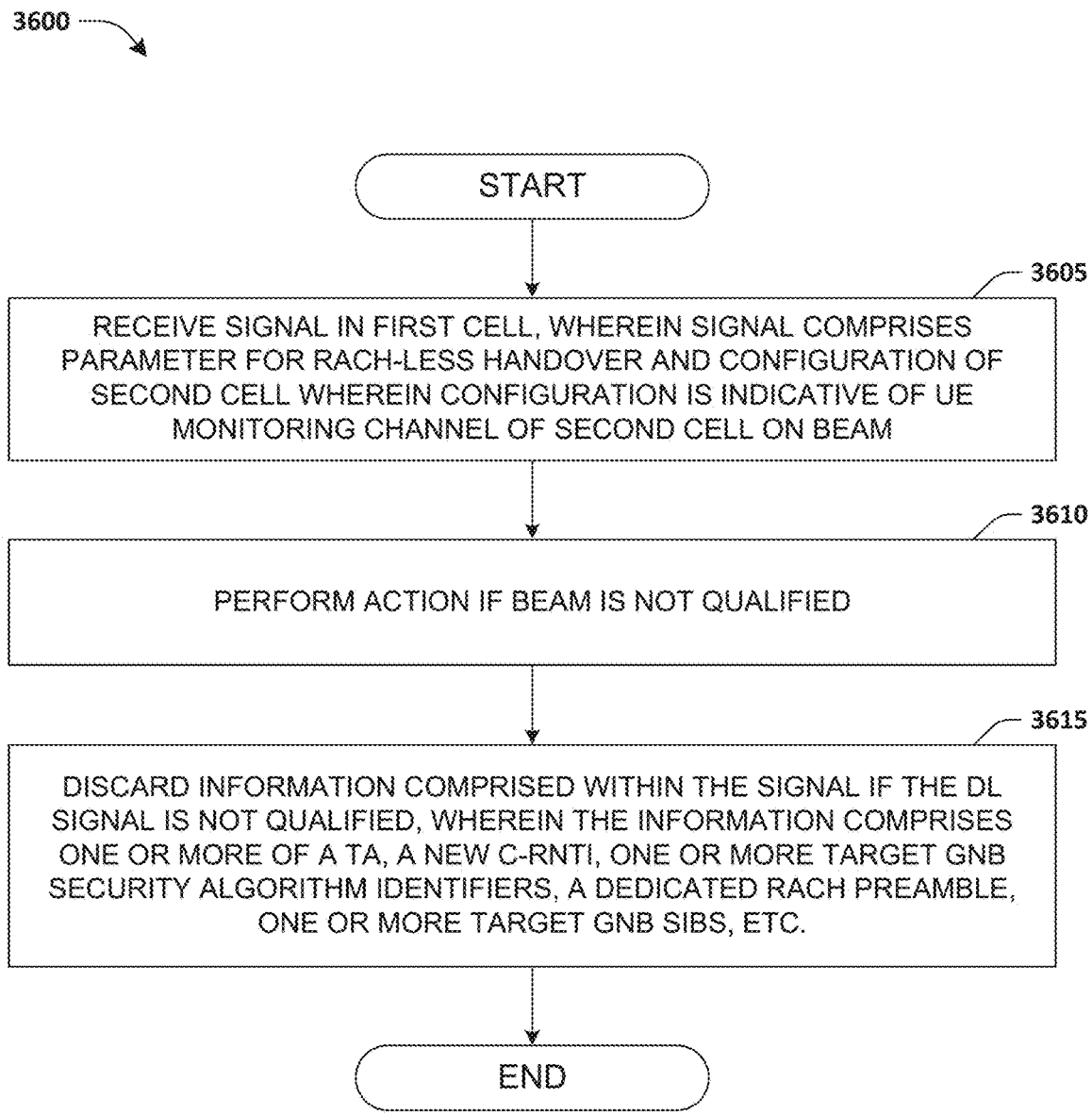
FIG. 36 is a flow chart according to one exemplary embodiment.

FIG. 36 is a flow chart 3600 according to one exemplary embodiment from the perspective of a UE. In step 3605, a signal may be received in a first cell. The signal may comprise a parameter for RACH-less handover and/or a configuration of a second cell. The configuration (of the second cell) may be indicative of the UE monitoring a channel of the second cell on a beam. In step 3610, an action may be performed if the beam is not qualified. In step 3615, information comprised within the signal may be discarded if the DL signal is not qualified. The information may comprise one or more of a TA, a new C-RNTI, one or more target gNB security algorithm identifiers, a dedicated RACH preamble, one or more target gNB SIBs, etc.

In the context of the embodiment illustrated in FIG. 36 and discussed above, the beam may be (determined to be) qualified if a quality associated with the beam is above a threshold and/or if an RSRP associated with the beam is above a threshold RSRP. Alternatively and/or additionally, the beam may be (determined to be) unqualified and/or may be (determined to be) not qualified if the quality associated with the beam is lower than the threshold and/or if the RSRP associated with the beam is lower than the threshold RSRP. Alternatively and/or additionally, the beam may not be qualified if the beam fails (and/or is failed).

In the context of one or more of the embodiments illustrated in FIGS. 29-36, and discussed above, in one embodiment, the beam may be associated with a DL signal of the second cell.

In the context of one or more of the embodiments illustrated in FIGS. 29-36, and discussed above, in one embodiment, the beam may be (and/or may comprise) one or more beams.

In the context of one or more of the embodiments illustrated in FIGS. 29-36, and discussed above, in one embodiment, the beam may be (and/or may comprise) an SSB. Alternatively and/or additionally, the beam may be (and/or may comprise) a CSI-RS.

In the context of one or more of the embodiments illustrated in FIGS. 29-36, and discussed above, in one embodiment, the signal may comprise an association between the UL grant and the beam. Alternatively and/or additionally, the signal may be indicative of the association between the UL grant and the beam.

In the context of one or more of the embodiments illustrated in FIGS. 18-36, and discussed above, in one embodiment, the measurement report may comprise a beam measurement result.

In the context of one or more of the embodiments illustrated in FIGS. 18-36, and discussed above, in one embodiment, the signal may be an RRC reconfiguration message. Alternatively and/or additionally, the signal may comprise mobility control information. Alternatively and/or additionally, the signal may comprise one or more beam identifiers, one or more DL signal identifiers, one or more SSB identifiers, one or more CSI-RS identifiers, a TCI state indication and/or a candidate list of beams.

In the context of one or more of the embodiments illustrated in FIGS. 18-36, and discussed above, in one embodiment, the UE may be performing an RACH-less handover procedure.

In the context of one or more of the embodiments illustrated in FIGS. 18-36, and discussed above, in one embodiment, the parameter may be RACH-less, RACH-skip and/or RACH-skipSCG.

In the context of one or more of the embodiments illustrated in FIGS. 18-36, and discussed above, in one embodiment, the first cell may be a PCell, an SpCell and/or an SCell.

In the context of one or more of the embodiments illustrated in FIGS. 18-36, and discussed above, in one embodiment, the second cell may be a PCell, an SpCell and/or an SCell.

In the context of one or more of the embodiments illustrated in FIGS. 18-36, and discussed above, in one embodiment, the first cell may be a source cell, a source eNB and/or a source gNB.

In the context of one or more of the embodiments illustrated in FIGS. 18-36, and discussed above, in one embodiment, the second cell may be a target cell, a target eNB and/or a target gNB.

Figure 37:
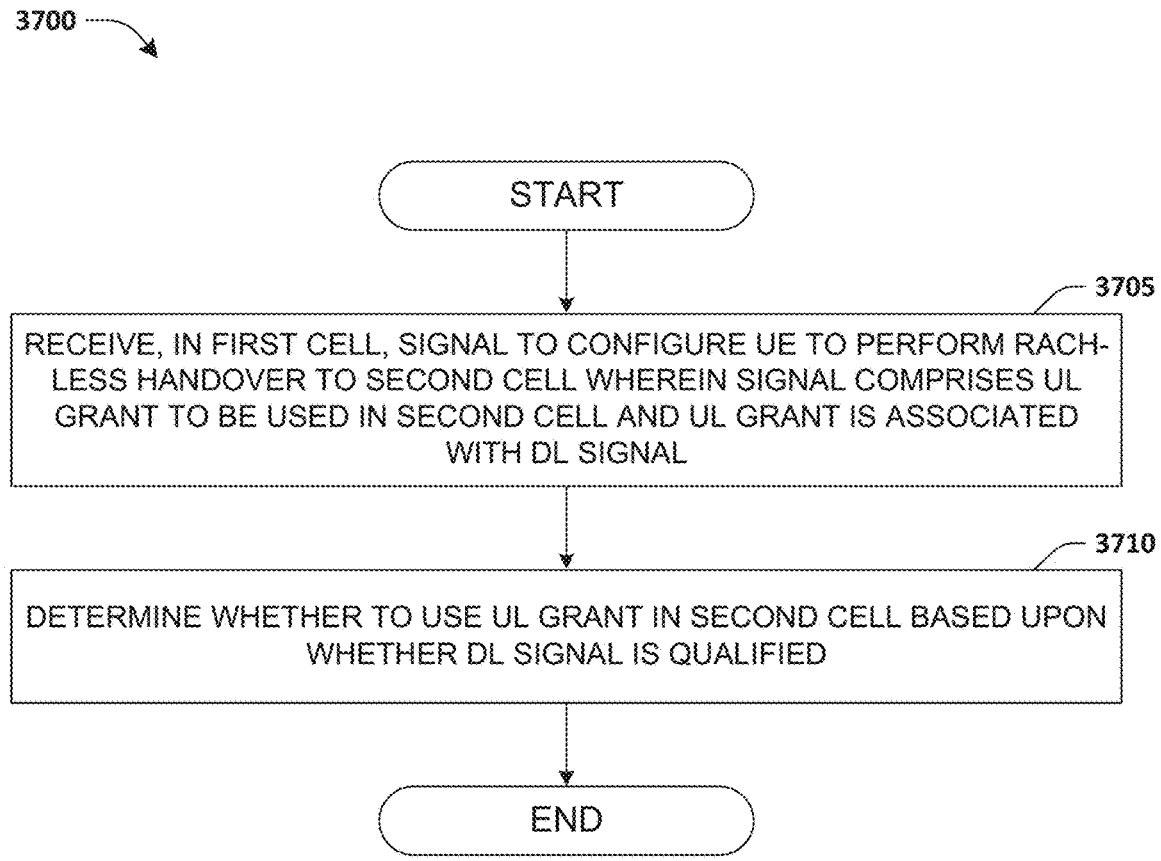
FIG. 37 is a flow chart according to one exemplary embodiment.

FIG. 37 is a flow chart 3700 according to one exemplary embodiment from the perspective of a UE. In step 3705, a signal to configure the UE to perform an RACH-less handover to a second cell may be received in a first cell. The signal may comprise a UL grant to be used in the second cell. The UL grant may be associated with a DL signal. In step 3710, whether to use the UL grant in the second cell may be determined based upon whether the DL signal is qualified.

Referring back to FIGS. 3 and 4, in one exemplary embodiment of a UE, the device 300 includes a program code 312 stored in the memory 310. The CPU 308 may execute program code 312 to enable the network node (i) to receive, in a first cell, a signal to configure the UE to perform an RACH-less handover to a second cell, wherein the signal comprises a UL grant to be used in the second cell and/or the UL grant is associated with a DL signal, and (ii) to determine whether to use the UL grant in the second cell based upon whether the DL signal is qualified. Furthermore, the CPU 308 can execute the program code 312 to perform some and/or all of the above-described actions and steps and/or others described herein.

In the context of the embodiment illustrated in FIG. 37 and discussed above, the DL signal may be (determined to be) qualified if a quality associated with the DL signal is above a threshold and/or if an RSRP associated with the DL signal is above a threshold RSRP. Alternatively and/or additionally, the DL signal may be (determined to be) unqualified and/or may be (determined to be) not qualified if the quality associated with the DL signal is lower than the threshold and/or if the RSRP associated with the DL signal is lower than the threshold RSRP. Alternatively and/or additionally, the DL signal may not be qualified if the DL signal fails (and/or is failed).

Alternatively and/or additionally, a random access procedure may be initiated in the second cell if the DL signal is not qualified. Alternatively and/or additionally, the random access procedure may be a contention free random access procedure. Alternatively and/or additionally, the random access procedure may be a contention based random access procedure. Alternatively and/or additionally, the random access procedure may be a random access procedure for beam failure recovery. Alternatively and/or additionally, an RACH resource for the random access procedure may be configured via the signal. For example, the signal may be indicative of the RACH resource. Alternatively and/or additionally, the RACH resource may be configured via system information. For example, the system information may be indicative of the RACH resource.

Alternatively and/or additionally, the UL grant may be discarded and/or skipped if the DL signal is not qualified.

Alternatively and/or additionally, a complete message (e.g., an RRC reconfiguration complete message) may be transmitted in the second cell (and/or to the second cell), in response to the signal, via the UL grant if the DL signal is qualified.

Alternatively and/or additionally, the DL signal may be (and/or may comprise) an SSB and/or a CSI-RS.

Figure 38:
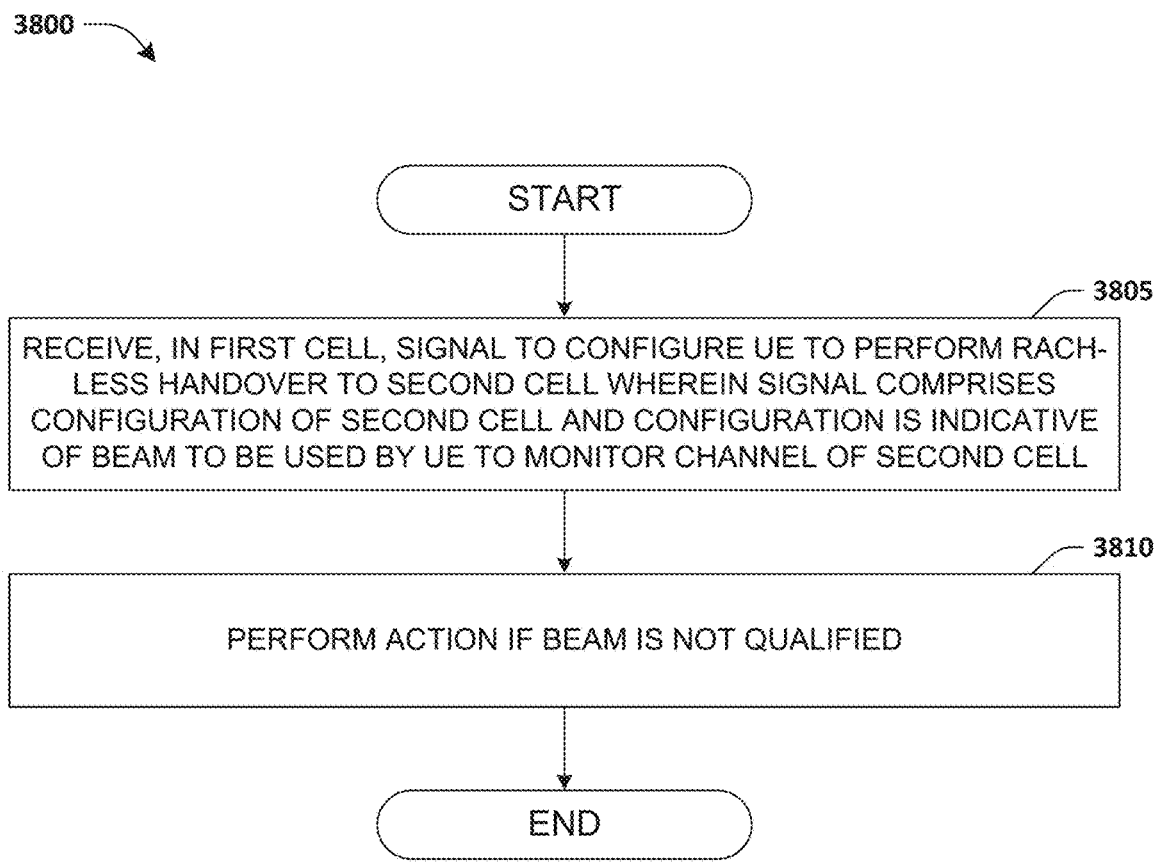
FIG. 38 is a flow chart according to one exemplary embodiment.

FIG. 38 is a flow chart 3800 according to one exemplary embodiment from the perspective of a UE. In step 3805, a signal to configure the UE to perform an RACH-less handover to a second cell may be received in a first cell. The signal may comprise a configuration of the second cell and/or the configuration may be indicative of a beam to be used by the UE to monitor a channel of the second cell. In step 3810, an action may be performed if the beam is not qualified.

Referring back to FIGS. 3 and 4, in one exemplary embodiment of a UE, the device 300 includes a program code 312 stored in the memory 310. The CPU 308 may execute program code 312 to enable the network node (i) to receive, in a first cell, a signal to configure the UE to perform an RACH-less handover to a second cell, wherein the signal comprises a configuration of the second cell and/or the configuration is indicative of a beam to be used by the UE to monitor a channel of the second cell, and (ii) to perform an action if the beam is not qualified. Furthermore, the CPU 308 can execute the program code 312 to perform some and/or all of the above-described actions and steps and/or others described herein.

In the context of the embodiment illustrated in FIG. 38 and discussed above, the beam may be (determined to be) qualified if a quality associated with the beam is above a threshold and/or if an RSRP associated with the beam is above a threshold RSRP. Alternatively and/or additionally, the beam may be (determined to be) unqualified and/or may be (determined to be) not qualified if the quality associated with the beam is lower than the threshold and/or if the RSRP associated with the beam is lower than the threshold RSRP. Alternatively and/or additionally, the beam may not be qualified if the beam fails (and/or is failed).

Alternatively and/or additionally, the action may comprise initiating a random access procedure in the second cell. Alternatively and/or additionally, the action may comprise initiating a contention free random access procedure in the second cell. Alternatively and/or additionally, the action may comprise initiating a random access procedure for beam failure recovery in the second cell.

Alternatively and/or additionally, the action may comprise transmitting a message to the first cell, wherein the message is indicative of the beam not being qualified. Alternatively and/or additionally, the message may be used to inform the first cell that the beam is not qualified.

Alternatively and/or additionally, the message may be indicate that a handover procedure (e.g., the RACH-less handover) failed (and/or that the handover procedure is not successful). Alternatively and/or additionally, the message may be used to inform the first cell that the handover procedure failed (and/or that the handover procedure is not successful).

Alternatively and/or additionally, the action may comprise initiating an RRC connection re-establishment procedure in the first cell.

Alternatively and/or additionally, the action may comprise initiating a beam failure recovery procedure in the second cell.

Figure 39:
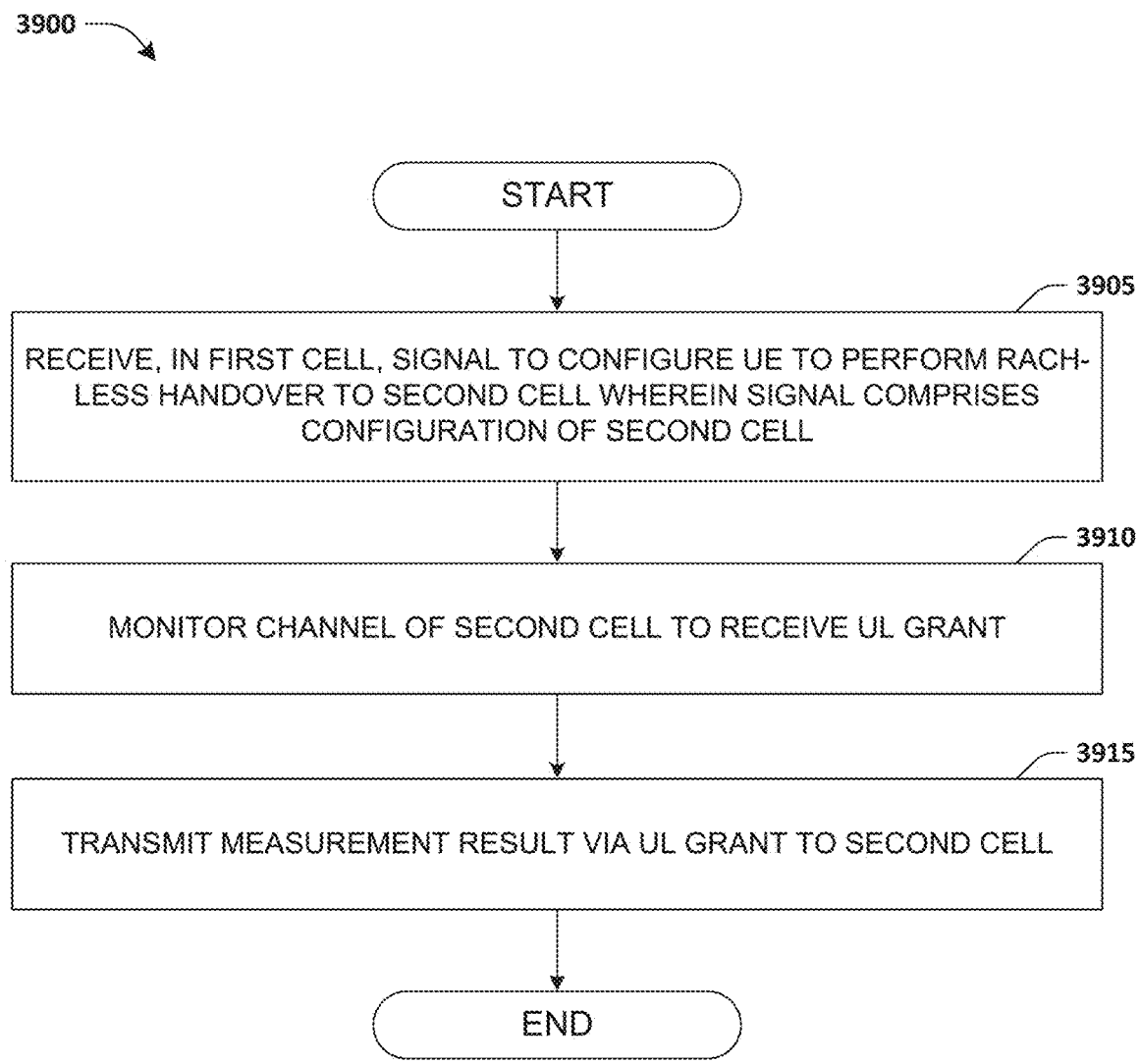
FIG. 39 is a flow chart according to one exemplary embodiment.

FIG. 39 is a flow chart 3900 according to one exemplary embodiment from the perspective of a UE. In step 3905, a signal to configure the UE to perform an RACH-less handover to a second cell may be received in a first cell. The signal may comprise a configuration of the second cell. In step 3910, a channel of the second cell may be monitored to receive a UL grant. In step 3915, a measurement result may be transmitted to the second cell via the UL grant.

Referring back to FIGS. 3 and 4, in one exemplary embodiment of a UE, the device 300 includes a program code 312 stored in the memory 310. The CPU 308 may execute program code 312 to enable the network node (i) to receive, in a first cell, a signal to configure the UE to perform an RACH-less handover to a second cell, wherein the signal comprises a configuration of the second cell, (ii) to monitor a channel of the second cell to receive a UL grant, and (iii) to transmit a measurement result to the second cell via the UL grant. Furthermore, the CPU 308 can execute the program code 312 to perform some and/or all of the above-described actions and steps and/or others described herein.

In the context of the embodiment illustrated in FIG. 39 and discussed above, the measurement result may be included in an RRC reconfiguration complete message transmitted to the second cell. For example, the measurement result may be transmitted to the second cell by including the measurement result in the RRC reconfiguration complete message and/or by transmitting the RRC reconfiguration complete message to the second cell via the UL grant. Alternatively and/or additionally, the measurement result may correspond to a measurement of a quality associated with a DL signal associated with the UL grant.

A communication device may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 18-39. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
receiving, in a first cell, a signal to configure the UE to perform a Random Access Channel-less (RACH-less) handover to a second cell, wherein the signal comprises:
an uplink (UL) grant to be used in the second cell; and
an association between the UL grant and at least one downlink (DL) signal; and
determining, based upon a quality of the at least one DL signal, whether to (i) use the UL grant, comprised in the signal received in the first cell to configure the UE to perform the RACH-less handover, in the second cell to which the UE is to perform the RACH-less handover or (ii) initiate a random access procedure in the second cell, wherein the determining whether to use the UL grant in the second cell or initiate the random access procedure in the second cell is based upon whether the quality of the at least one DL signal, which is indicated in the signal received in the first cell and is associated with the UL grant comprised in the signal received in the first cell, exceeds a threshold quality, wherein the random access procedure is initiated in the second cell if none of the at least one DL signal is associated with a quality that exceeds the threshold quality, wherein the UL grant is used in the second cell to which the UE is to perform the RACH-less handover if the quality of the at least one DL signal does exceed the threshold quality, wherein the threshold quality is at least one of a threshold Synchronization Signal (SS)-Reference Received Signal Power (RSRP) or a threshold Channel State Information (CSI)-RSRP.

2. The method of claim 1, wherein the random access procedure is a contention based random access procedure.

3. The method of claim 1, wherein the random access procedure is a contention free random access procedure.

4. The method of claim 1,
wherein:
the signal comprises a configuration of the second cell; and
the configuration, in the signal received in the first cell, is indicative of a beam to be used by the UE to monitor a channel of the second cell.

5. The method of claim 1, wherein the random access procedure is a random access procedure for beam failure recovery.

6. The method of claim 1, wherein a RACH resource for the random access procedure is configured via the signal.

7. The method of claim 1, comprising:
discarding or skipping the UL grant if none of the at least one DL signal is associated with a quality that exceeds the threshold quality.

8. The method of claim 1, comprising:
transmitting, in the second cell, a complete message in response to the signal via the UL grant if the quality of the at least one DL signal exceeds the threshold quality.

9. The method of claim 1, wherein the signal comprises at least one identifier of the at least one DL signal.

10. The method of claim 1, wherein a RACH resource for the random access procedure is configured via system information.

11. A method of a User Equipment (UE), comprising:
receiving, in a first cell, a signal to configure the UE to perform a Random Access Channel-less (RACH-less) handover to a second cell, wherein:
the signal comprises a configuration of the second cell; and
the configuration, in the signal received in the first cell, is indicative of a beam to be used by the UE to monitor a channel of the second cell; and
performing, based upon a quality of the beam, an action, comprising initiating a random access procedure in the second cell the configuration of which is included in the signal received in the first cell, if at least one of the quality of the beam that is indicated by the configuration in the signal received in the first cell does not exceed a threshold quality or the beam is determined to not be qualified using at least one of a Medium Access Control (MAC) layer or a Physical (PHY) layer, wherein the configuration is used in the second cell if at least one of the quality of the beam does exceed the threshold quality or the beam is determined to be qualified using at least one of the MAC layer or the PHY layer, wherein the threshold quality is at least one of a threshold Synchronization Signal (SS)-Reference Received Signal Power (RSRP) or a threshold Channel State Information (CSI)-RSRP.

12. The method of claim 11, wherein the random access procedure is a contention based random access procedure.

13. The method of claim 11, wherein the random access procedure is a contention free random access procedure.

14. The method of claim 11, wherein the random access procedure is a random access procedure for beam failure recovery.

15. The method of claim 11, comprising:
transmitting a message to the first cell, wherein the message is indicative of the beam not being qualified.

16. The method of claim 11, comprising:
initiating a Radio Resource Control (RRC) connection re-establishment procedure in the first cell.

17. The method of claim 11, comprising:
initiating a beam failure recovery procedure in the second cell.

18. The method of claim 11, wherein the beam is not qualified if the quality associated with the beam is not above the threshold quality.

19. A User Equipment (UE) comprising:
a processor; and
a memory coupled to the processor;
wherein the processor is configured to execute a program code stored in the memory to:
receive, in a first cell, a signal to configure the UE to perform a Random Access Channel-less (RACH-less) handover to a second cell, wherein the signal comprises:
an uplink (UL) grant to be used in the second cell; and
an association between the UL grant and a downlink (DL) signal; and
determine, based upon a quality of the DL signal, whether to (i) use the UL grant, comprised in the signal received in the first cell to configure the UE to perform the RACH-less handover, in the second cell to which the UE is to perform the RACH-less handover or (ii) initiate a random access procedure in the second cell, wherein the determining whether to use the UL grant in the second cell or initiate the random access procedure in the second cell is based upon whether the quality of the DL signal, which is indicated in the signal received in the first cell and is associated with the UL grant comprised in the signal received in the first cell, exceeds a threshold quality and the DL signal is selected as being qualified using at least one of a Medium Access Control (MAC) layer or a Physical (PHY) layer, wherein the random access procedure is initiated in the second cell if the quality of the DL signal does not exceed the threshold quality and the DL signal is not selected as being qualified, wherein the UL grant is used in the second cell to which the UE is to perform the RACH-less handover if the quality of the DL signal does exceed the threshold quality and the DL signal is selected as being qualified, wherein the threshold quality is at least one of a threshold Synchronization Signal (SS)-Reference Received Signal Power (RSRP) or a threshold Channel State Information (CSI)-RSRP.

20. The UE of claim 19, wherein the processor is configured to execute the program code stored in the memory to at least one of:
discard or skip the UL grant if the DL signal is not qualified; or
transmit, in the second cell, a complete message in response to the signal via the UL grant if the DL signal is qualified.

* * * * *